US012540065B2

(12) United States Patent
Tinker et al.

(10) Patent No.: US 12,540,065 B2
(45) Date of Patent: Feb. 3, 2026

(54) INTEGRITY MONITORING SYSTEM FOR A BOOM ASSEMBLY

(71) Applicant: Crown Equipment Corporation, New Bremen, OH (US)

(72) Inventors: John Tinker, Greenville, NC (US); Clinton Reges, Greenville, NC (US); Derek Vermeulen, La Grange, NC (US); Nicholas Coston, Pikeville, NC (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/733,363

(22) Filed: Jun. 4, 2024

(65) Prior Publication Data

US 2024/0409384 A1    Dec. 12, 2024

Related U.S. Application Data

(60) Provisional application No. 63/578,672, filed on Aug. 25, 2023, provisional application No. 63/578,769, filed on Aug. 25, 2023, provisional application No. 63/506,894, filed on Jun. 8, 2023.

(51) Int. Cl.
*G01M 5/00* (2006.01)
*B66F 9/075* (2006.01)
*B66F 17/00* (2006.01)

(52) U.S. Cl.
CPC ........ *B66F 17/003* (2013.01); *B66F 9/07504* (2013.01); *B66F 9/0755* (2013.01); *G01M 5/0025* (2013.01); *G01M 5/0041* (2013.01)

(58) Field of Classification Search
None
See application file for complete search history.

(56) References Cited

U.S. PATENT DOCUMENTS

| 1,335,302 | A | 3/1920 | Stout |
|---|---|---|---|
| 3,912,404 | A | 10/1975 | Katt |
| 4,236,843 | A | 12/1980 | Chisholm |
| 4,619,219 | A | 10/1986 | Millard |
| 5,205,236 | A | 4/1993 | Hughes |
| 5,214,886 | A | 6/1993 | Hugron |
| 5,487,522 | A | 1/1996 | Hook |
| 5,820,097 | A | 10/1998 | Spooner |

(Continued)

FOREIGN PATENT DOCUMENTS

| CA | 2690790 C | 6/2013 |
|---|---|---|
| CA | 3014117 A1 | 2/2020 |

(Continued)

OTHER PUBLICATIONS https://optimizedorderpicking.com/en/; 2024; SAT Technologies.

(Continued)

*Primary Examiner* — James M McPherson
(74) *Attorney, Agent, or Firm* — Stevens & Showalter LLP

(57) ABSTRACT

A boom assembly is provided comprising: an upper boom portion, a base mount, and an adapter coupling the base mount to the upper boom portion. The upper boom portion may be aligned with the base mount when the boom assembly is in a normal operating position. Further provided is an integrity monitoring system comprising at least one sensor associated with the boom assembly.

22 Claims, 56 Drawing Sheets

(56) References Cited

U.S. PATENT DOCUMENTS

| | | |
|---|---|---|
| 5,884,432 A | 3/1999 | DeLillo |
| 6,059,201 A | 5/2000 | Weddle |
| 6,195,605 B1 | 2/2001 | Tabler et al. |
| 6,216,413 B1 | 4/2001 | Lapointe |
| 6,267,529 B1 | 7/2001 | Mudryk et al. |
| 7,473,051 B2 | 1/2009 | Audet |
| 8,002,493 B2 | 8/2011 | Audet |
| 8,434,921 B2 | 5/2013 | Sherwin |
| 8,506,142 B2 | 8/2013 | Macke |
| 9,268,201 B1 | 2/2016 | Montgomery |
| 9,410,659 B2 | 8/2016 | Troy et al. |
| 9,509,889 B2 | 11/2016 | Reid |
| 9,527,385 B2 | 12/2016 | Lee |
| 10,061,184 B2 | 8/2018 | Harden |
| 10,340,095 B2 | 7/2019 | Haake et al. |
| 10,510,262 B1 | 12/2019 | Kim |
| 11,167,713 B2 | 11/2021 | Robertson |
| 11,225,404 B2 | 1/2022 | Harshbarger et al. |
| 11,459,713 B2 | 10/2022 | Evans et al. |
| 11,560,678 B2 | 1/2023 | Llobet |
| 12,358,763 B2 * | 7/2025 | Schoonmaker ......... G01S 17/06 |
| 2005/0036833 A1 | 2/2005 | Hotchkin |
| 2005/0196235 A1 | 9/2005 | Strick |
| 2006/0220872 A1 | 10/2006 | Brown et al. |
| 2013/0144488 A1 | 6/2013 | Schofield et al. |
| 2020/0068805 A1 * | 3/2020 | Hanson ................ A01D 87/122 |
| 2020/0324700 A1 | 10/2020 | Asfaw |
| 2022/0176893 A1 | 6/2022 | Pape |
| 2024/0335851 A1 * | 10/2024 | Ruppert .................. B05B 12/08 |

FOREIGN PATENT DOCUMENTS

| | | |
|---|---|---|
| CN | 206511882 U | 9/2017 |
| CN | 107601359 A | 1/2018 |
| CN | 208716759 U | 4/2019 |
| CN | 215160702 U | 12/2021 |
| CN | 216892130 U | 7/2022 |
| CN | 116442915 A | 7/2023 |
| DE | 2355069 A1 | 5/1975 |
| DE | 19720084 A1 | 11/1998 |
| DE | 19745923 A1 | 4/1999 |
| EP | 2987760 B1 | 4/2019 |
| EP | 3617007 A1 | 3/2020 |
| EP | 3670428 A1 | 6/2020 |
| FR | 2748462 A1 | 11/1997 |
| GB | 417422 A | 10/1934 |
| GB | 2058890 A | 4/1981 |
| JP | 3027223 U | 8/1996 |
| JP | 3369128 B2 | 1/2003 |
| KR | 101103716 B1 | 1/2012 |
| KR | 101600292 B1 | 3/2016 |
| KR | 102012705 B1 | 8/2019 |
| WO | 2004069568 A1 | 8/2004 |

OTHER PUBLICATIONS

Reges, Clinton; Related U.S. Appl. No. 18/733,093; entitled Boom Assembly Having an Adapter; filed Jun. 4, 2024; United States Patent and Trademark Office; Alexandria, Virginia.

Reges, Clinton; Related U.S. Appl. No. 18/733,161; entitled Boom Assembly Having an Adapter; filed Jun. 4, 2024; United States Patent and Trademark Office; Alexandria, Virginia.

Serafeim, Athanasios; Extended European Search Report dated Feb. 25, 2025; European Application No. 24199096.9; European Patent Office; Munich, Germany.

Serafeim, Athanasios; First Examination Report dated Dec. 16, 2025; European Application No. 24199096.9; European Patent Office; Munich, Germany.

* cited by examiner

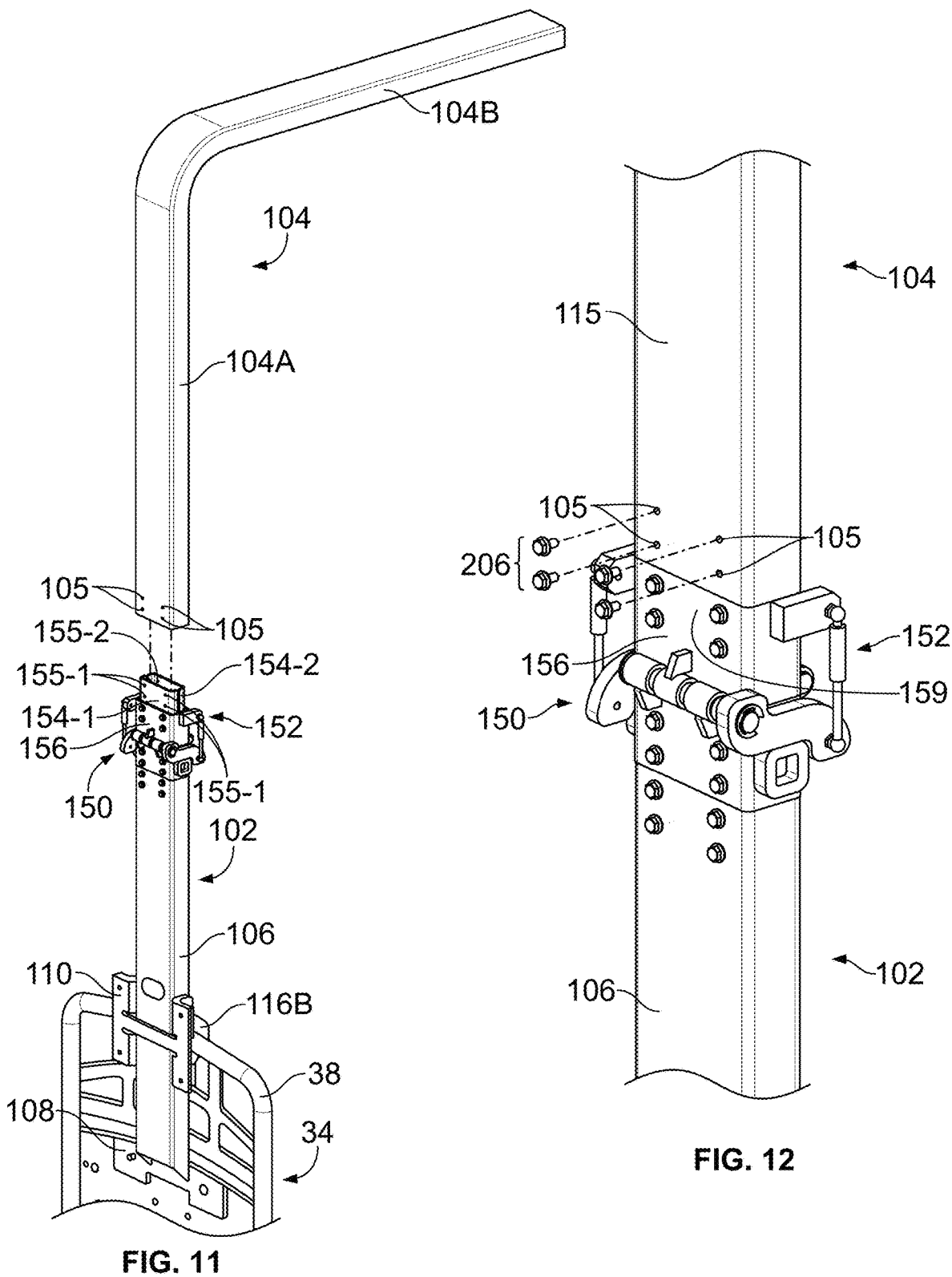

INTEGRITY MONITORING SYSTEM FOR A BOOM ASSEMBLY

RELATED APPLICATIONS

This application claims the benefit of U.S. Provisional Application No. 63/506,894, filed Jun. 8, 2023; U.S. Provisional Application No. 63/578,672, filed Aug. 25, 2023; and U.S. Provisional Application No. 63/578,769, filed Aug. 25, 2023, the disclosures of which are herein incorporated by reference in their entirety.

TECHNICAL FIELD

The present disclosure relates to an integrity monitoring system for a boom assembly and more specifically to an integrity monitoring system for a boom assembly having a yielding adapter that allows for controlled failure of the boom assembly.

BACKGROUND

A boom assembly may be used to position an accessory such as a camera at a desired vertical and/or horizontal position.

SUMMARY

In accordance with a first aspect of the present disclosure, a boom assembly is provided and comprises: an upper boom portion, a base mount, and an adapter coupling the base mount to the upper boom portion. The upper boom portion may be aligned with the base mount when the boom assembly is in a normal operating position. Further provided is an integrity monitoring system comprising at least one sensor associated with the boom assembly, wherein the adapter is configured to (i) maintain the boom assembly in the normal operating position when the upper boom portion is subjected to one or more external forces insufficient to cause the adapter to yield; and (ii) yield when the upper boom portion is subjected to one or more external forces sufficient to cause the adapter to yield such that the upper boom portion moves to a deformed angular position relative to the base mount. The at least one sensor may be configured to detect a parameter related to the upper boom portion to indicate that the upper boom portion has deflected such that the upper boom portion is no longer aligned with the base mount. The sensor may detect an acceleration of the upper boom portion, wherein the acceleration of the upper boom portion exceeding a corresponding predetermined threshold is indicative of the upper boom portion no longer being aligned with the base mount. The predetermined threshold may be calculated to correspond to yielding of the adapter which occurs at the predetermined threshold. The sensor may detect an angular velocity of the upper boom portion, wherein the angular velocity of the upper boom portion exceeding a corresponding predetermined threshold is indicative of the upper boom portion no longer being aligned with the base mount. The sensor may comprise a strain gauge that detects a strain level in the adapter, wherein the strain level in the adapter exceeding a corresponding predetermined threshold is indicative of the upper boom portion no longer being aligned with the base mount. The sensor may detect a change in a position of the upper boom portion relative to a predetermined reference, wherein the change in position exceeding a corresponding predetermined threshold is indicative of the upper boom portion no longer being aligned with the base mount. The at least one sensor may be configured to generate at least one signal based on sensing the parameter. The boom assembly may further comprise at least one controller configured to: receive the at least one signal; and determine, based on the at least one signal, that the upper boom portion is subjected to one or more external forces sufficient to cause the adapter to yield. The at least one controller may be further configured to generate an alert in response to determining that the upper boom portion is subjected to one or more external forces sufficient to cause the adapter to yield.

In accordance with a second aspect, a materials handling vehicle is provided comprising: a power unit; a load handling assembly extending from the power unit and comprising a pair of forks; an operator's station comprising an operator's backrest and an operator's platform; a boom assembly associated with the materials handling vehicle; and an integrity monitoring system comprising at least one sensor mounted to at least one of the boom assembly, the power unit, the load handling assembly, or the operator's station. The boom assembly may comprise a base mount, an upper boom portion, and an adapter coupling the base mount to the upper boom portion. The upper boom portion may be aligned with the base mount when the boom assembly is in a normal operating position, wherein the adapter is configured to (i) maintain the boom assembly in the normal operating position when the upper boom portion is subjected to one or more external forces insufficient to cause the adapter to yield; and (ii) yield when the upper boom portion is subjected to one or more external forces sufficient to cause the adapter to yield such that the upper boom portion moves to a deformed position relative to the base mount. The at least one sensor may be configured to detect a parameter related to the upper boom portion to indicate that the upper boom portion has deflected such that the upper boom portion is no longer aligned with the base mount. The at least one sensor may be configured to generate at least one signal based on sensing a corresponding parameter. The materials handling vehicle may further comprise at least one controller configured to: receive the at least one signal; and determine, based on the at least one signal, that the upper boom portion is subjected to one or more external forces sufficient to cause the adapter to yield. The materials handling vehicle may further comprise a brake, a steer motor, a traction motor, and a lift motor, and wherein in response to determining that the upper boom portion is subjected to one or more external forces sufficient to cause the adapter to yield, the at least one controller is configured to generate an error code that activates the brake and/or alters operation of at least one of the steer motor, the traction motor, or the lift motor. In response to determining that the upper boom portion is subjected to one or more external forces sufficient to cause the adapter to yield, the at least one controller may be configured to: generate an error code; and transmit a signal that causes a user interface to display an indication of the error code. The sensor may detect an acceleration of the upper boom portion, wherein the acceleration of the upper boom portion exceeding a corresponding predetermined threshold is indicative of the upper boom portion no longer being aligned with the base mount. The predetermined threshold may be calculated to correspond to yielding of the adapter which occurs at the predetermined threshold. The sensor may detect an angular velocity of the upper boom portion, wherein the angular velocity of the upper boom portion exceeding a corresponding predetermined threshold is indicative of the upper boom portion no longer being aligned with the base mount. The sensor may comprise a strain gauge that detects a strain level in the adapter, wherein the strain level in the adapter exceeding a corresponding predetermined threshold is indicative of the upper boom portion no longer being aligned with the base mount. The sensor may detect a change in a position of the upper boom portion relative to a predetermined reference, wherein the change in position exceeding a corresponding predetermined threshold is indicative of the upper boom portion no longer being aligned with the base mount.

In accordance with a third aspect, a method of controlling a materials handling vehicle is provided, wherein the materials handling vehicle comprises: a power unit, a load handling assembly, an operator's station, a boom assembly, and an integrity monitoring system. The boom assembly may comprise a base mount, an upper boom portion, and an adapter coupling the base mount to the upper boom portion. The upper boom portion may be aligned with the base mount when the boom assembly is in a normal operating position and the adapter may be configured to (i) maintain the boom assembly in the normal operating position when the upper boom portion is subjected to one or more external forces insufficient to cause the adapter to yield; and (ii) yield when the upper boom portion is subjected to one or more external forces sufficient to cause the adapter to yield such that the upper boom portion moves to a deformed position relative to the base mount. The integrity monitoring system may comprise at least one controller and at least one sensor mounted to one or more of the boom assembly, the power unit, the load handling assembly, or the operator's station. The method may comprise: receiving, by the at least one controller, at least one signal from the at least one sensor; and determining, by the at least one controller, based on the at least one signal, that the upper boom portion has moved to the deformed position relative to the base mount. In response to determining that the upper boom portion has moved to the deformed position relative to the base mount, generating, by the at least one controller, an error code; and transmitting, by the at least one controller, a signal that causes a user interface of the materials handling vehicle to display an indication of the error code. The materials handling vehicle may further comprise a brake, a steer motor, a traction motor, and a lift motor. The method may further comprise: in response to determining that the upper boom portion has moved to the deformed position relative to the base mount, generating, by the at least one controller, an error code; and based on the error code, activating the brake and/or altering operation of at least one of the steer motor, the traction motor, or the lift motor. The method may further comprise: restarting the materials handling vehicle; operating the material handling vehicle in limp mode, wherein a speed of the materials handling vehicle is limited; moving the materials handling vehicle in limp mode from a first location to a second location; replacing at least a portion of one or more of the base mount, the upper boom portion, the adapter, or the at least one sensor; clearing the error code; restarting the materials handling vehicle; and resuming normal operation of the materials handling vehicle. The method may further comprise: replacing at least a portion of one or more of the base mount, the upper boom portion, the adapter, or the at least one sensor; clearing the error code; restarting the materials handling vehicle; and resuming normal operation of the materials handling vehicle.

BRIEF DESCRIPTION OF DRAWINGS

FIGS. 9-12 are partially exploded views of portions of a boom assembly and the adapter illustrated in FIGS. 7 and 8.

DETAILED DESCRIPTION

Figure 1A:
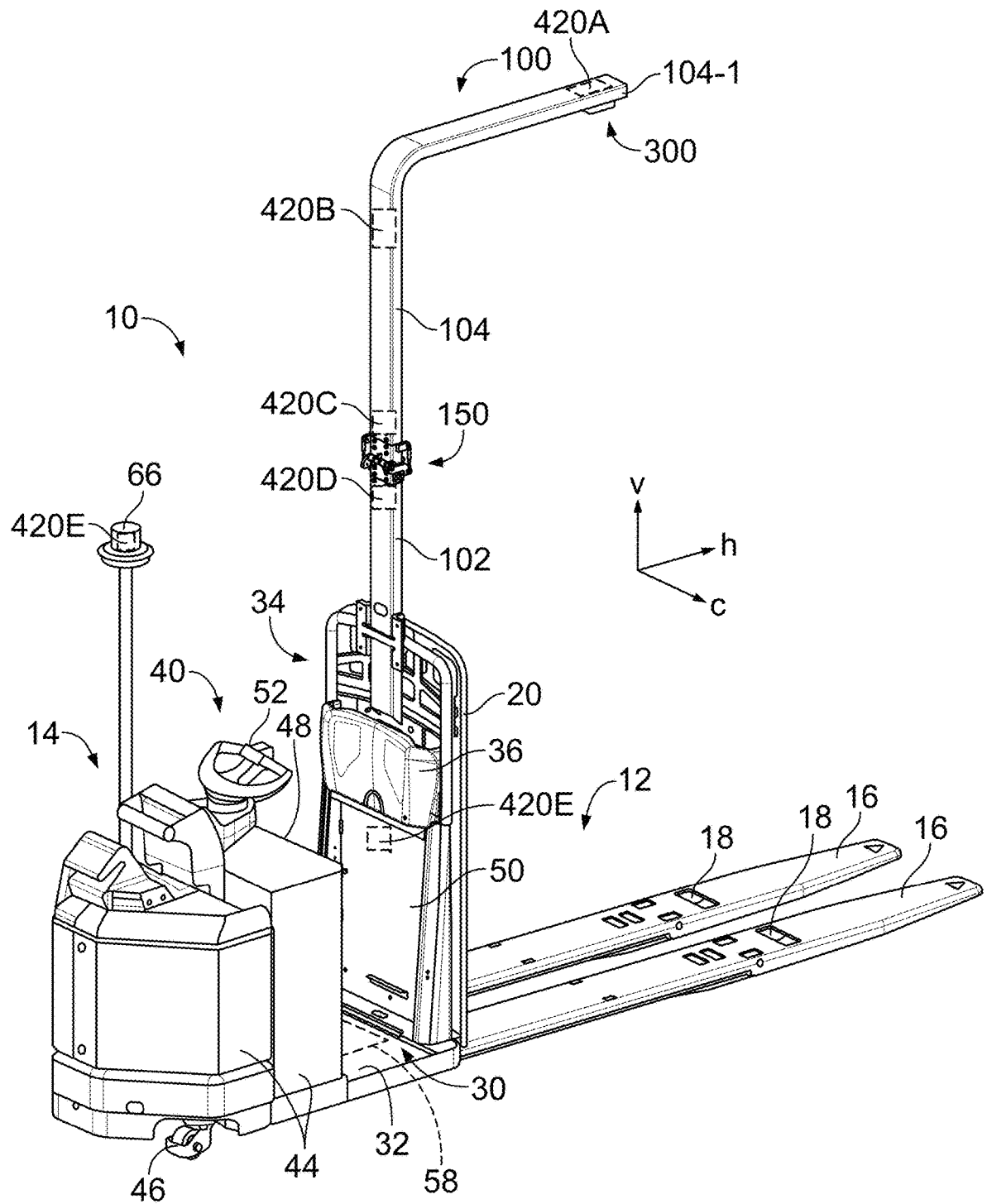
FIGS. 1A and 1B are perspective views of materials handling vehicles comprising a boom assembly, an adapter, and an integrity monitoring system in accordance with the present disclosure.
Figure 39:
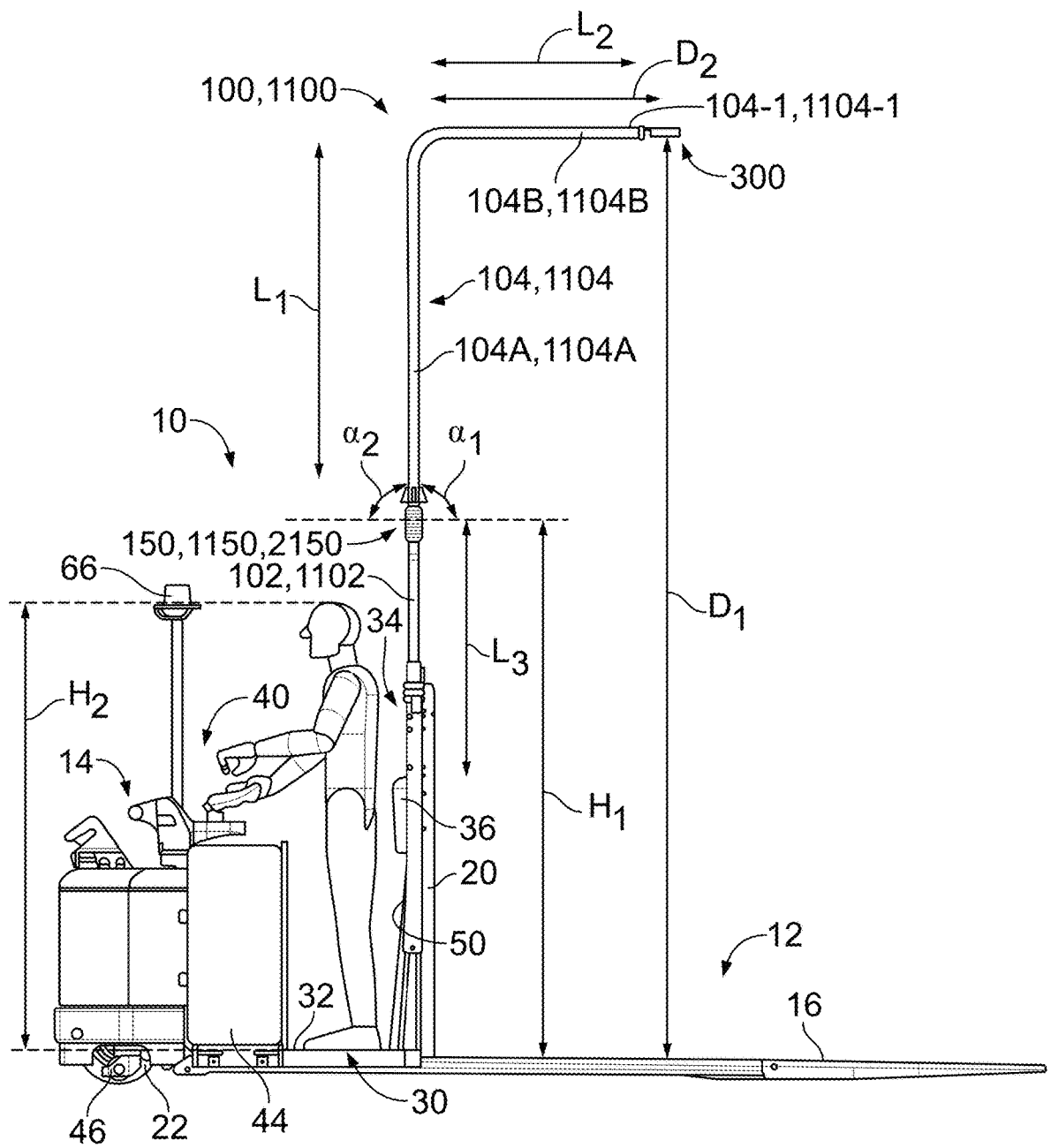
FIGS. 39-41 are side views of a materials handling vehicle comprising a boom assembly with an adapter in accordance with the present disclosure.

A materials handling vehicle constructed in accordance with the present disclosure is shown in FIGS. 1A, 1, and 39. The materials handling vehicle is depicted as a low level order picking truck 10 that includes a load handling assembly 12 extending from a power unit 14. The load handling assembly 12 includes a pair of forks 16, each fork 16 having a load supporting wheel assembly 18. The load handling assembly 12 may include other load handling features in addition to, or in lieu of, the illustrated arrangement of the forks 16, such as scissors-type elevating forks, outriggers, or separate height adjustable forks. Still further, the load handling assembly 12 may include load handling features such as a mast, a load platform, collection cage, or other support structure carried by the forks 16 or otherwise provided for handling a load supported and carried by the truck 10 or pushed or pulled by the truck 10, i.e., such as by a tugger vehicle. A compartment 44 may contain a battery, control electronics, and motor(s) (not shown), such as a traction motor/brake assembly, steer motor, and/or lift motor for the forks 16. The traction motor/brake assembly may be coupled to a steerable drive wheel 22 for driving and braking the drive wheel 22. First and second caster wheels (only the first caster wheel 46 is illustrated) are coupled to opposing sides of the power unit 14.

The illustrated power unit 14 comprises a step-through operator's station 30 defined by an operator's backrest 34, a side wall 48 of the compartment 44, and a floorboard or operator's platform 32. The operator may stand on the operator's platform 32 to drive the truck 10 (see FIG. 39), and/or the operator's platform 32 may provide a position from which the operator may operate the various included features of the truck 10. When the operator is standing on the operator's platform 32, a control area 40 provides for driving the truck 10 and for controlling the features of the load handling assembly 12.

With reference to FIGS. 1A and 1, as shown for purposes of illustration, and not by way of limitation, the control area 40 comprises a handle 52 for steering the truck 10, which may include controls such as grips, butterfly switches, thumbwheels, rocker switches, a hand wheel, a steering tiller, etc., for controlling the acceleration/braking and travel direction of the truck 10. For example, as shown, a control such as a switch grip (not labeled) may be provided on the handle 52, which is spring biased to a center neutral position. Rotating the switch grip forward and upward will cause the truck 10 to move forward, e.g., power unit first, at an acceleration proportional to the amount of rotation of the switch grip until the truck 10 reaches a predefined maximum speed, at which point the truck 10 is no longer permitted to accelerate to a higher speed. For example, if the switch grip is very quickly rotated 50% of a maximum angle of rotation capable for the grip, the truck 10 will accelerate at approximately 50% of the maximum acceleration capable for the truck 10 until the truck 10 reaches 50% of the maximum speed capable for the truck 10. It is also contemplated that acceleration may be determined using an acceleration map stored in memory where the rotation angle of the grip is used as an input into and has a corresponding acceleration value in the acceleration map. The acceleration values in the acceleration map corresponding to the grip rotation angles may be proportional to the grip rotation angles or vary in any desired manner. There may also be a velocity map stored in memory where the rotation angle of the grip is used as an input into and has a corresponding maximum velocity value stored in the velocity map. For example, when the grip is rotated 50% of the maximum angle capable for the grip, the truck 10 will accelerate at a corresponding acceleration value stored in the acceleration map to a maximum velocity value stored in the velocity map corresponding to the grip angle of 50% of the maximum angle. Similarly, rotating the switch grip downward and toward the rear of the truck 10 will cause the truck 10 to move in reverse, e.g., forks first, at an acceleration proportional to the amount of rotation of the switch grip until the truck 10 reaches a predefined maximum speed, at which point the truck 10 is no longer permitted to accelerate to a higher speed.

One or more proximity or presence sensors 58 may be provided to detect the presence of an operator on the truck 10. For example, presence sensor(s) 58 may be located on, above, or under a floor of the operator's platform 32, or otherwise provided about the operator's station 30. In the exemplary truck 10 of FIGS. 1A and 1B, the presence sensor(s) 58 is/are shown in dashed lines indicating that it/they is/are positioned under the floor of the operator's platform 32. Under this arrangement, the presence sensor(s) 58 may comprise load sensors, switches, etc. As an alternative (not shown), the presence sensor(s) 58 may be implemented above the floor of the operator's platform 32, such as by using ultrasonic, capacitive, or other suitable sensing technology. The presence sensor 58 generates an operator status signal indicating that either an operator is standing on the operator's platform 32 in the operator's station 30 or no operator is standing on the operator's platform 32 in the operator's station 30. A change in the operator status signal indicates that an operator has either entered or exited the operator's station 30.

With continued reference to FIGS. 1A, 1, and 39, an antenna 66 extends vertically from the power unit 14 and is provided for receiving control signals from a corresponding wireless remote control device (not shown). It is also contemplated that the antenna 66 may be provided within the compartment 44 of the power unit 14 or elsewhere on the truck 10. The remote control device may comprise a transmitter that is worn or otherwise maintained by the operator. The remote control device is manually operable by an operator, e.g., by pressing a button or other control, to cause the remote control device to wirelessly transmit at least a first type of signal designating a travel request to the truck 10. The travel request is a command that requests the corresponding truck 10 to travel by a predetermined amount.

The truck 10 may also comprise one or more obstacle sensors (not shown), which are provided about the truck 10, e.g., towards a front end of the power unit 14 and/or to the sides of the power unit 14. The obstacle sensor(s) may include at least one contactless obstacle sensor on the truck 10 and may be operable to define at least one detection zone. The obstacle sensor(s) may comprise any suitable proximity detection technology, such as one or more ultrasonic sensors, optical recognition devices, infrared sensors, laser scanner sensors, etc., which may be capable of detecting the presence of objects/obstacles or may be capable of generating signals that can be analyzed to detect the presence of objects/obstacles within the predefined detection zone(s) of the power unit 14.

In practice, the truck 10 may be implemented in other formats, styles and features, such as an end control pallet truck that includes a steering tiller arm that is coupled to a tiller handle for steering the truck. Still further, the truck, remote control system, and/or components thereof, including the remote control device, may comprise any additional and/or alternative features or implementations, examples of which are disclosed in any one or more of the following commonly owned patents/published patent applications: U.S. Pat. No. 9,082,293, issued Jul. 14, 2015 entitled "SYSTEMS AND METHODS OF REMOTELY CONTROLLING A MATERIALS HANDLING VEHICLE"; U.S. Pat. No. 8,072,309, issued Dec. 6, 2011 entitled "SYSTEMS AND METHODS OF REMOTELY CONTROLLING A MATERIALS HANDLING VEHICLE"; U.S. Pat. No. 9,207,673, issued Dec. 8, 2015, entitled "FINGER-MOUNTED APPARATUS FOR REMOTELY CONTROLLING A MATERIALS HANDLING VEHICLE"; and/or U.S. Pat. No. 9,645,968, issued May 9, 2017, entitled "MULTIPLE ZONE SENSING FOR MATERIALS HANDLING VEHICLES"; the entire disclosures of which are each hereby incorporated by reference herein.

Figure 1B:
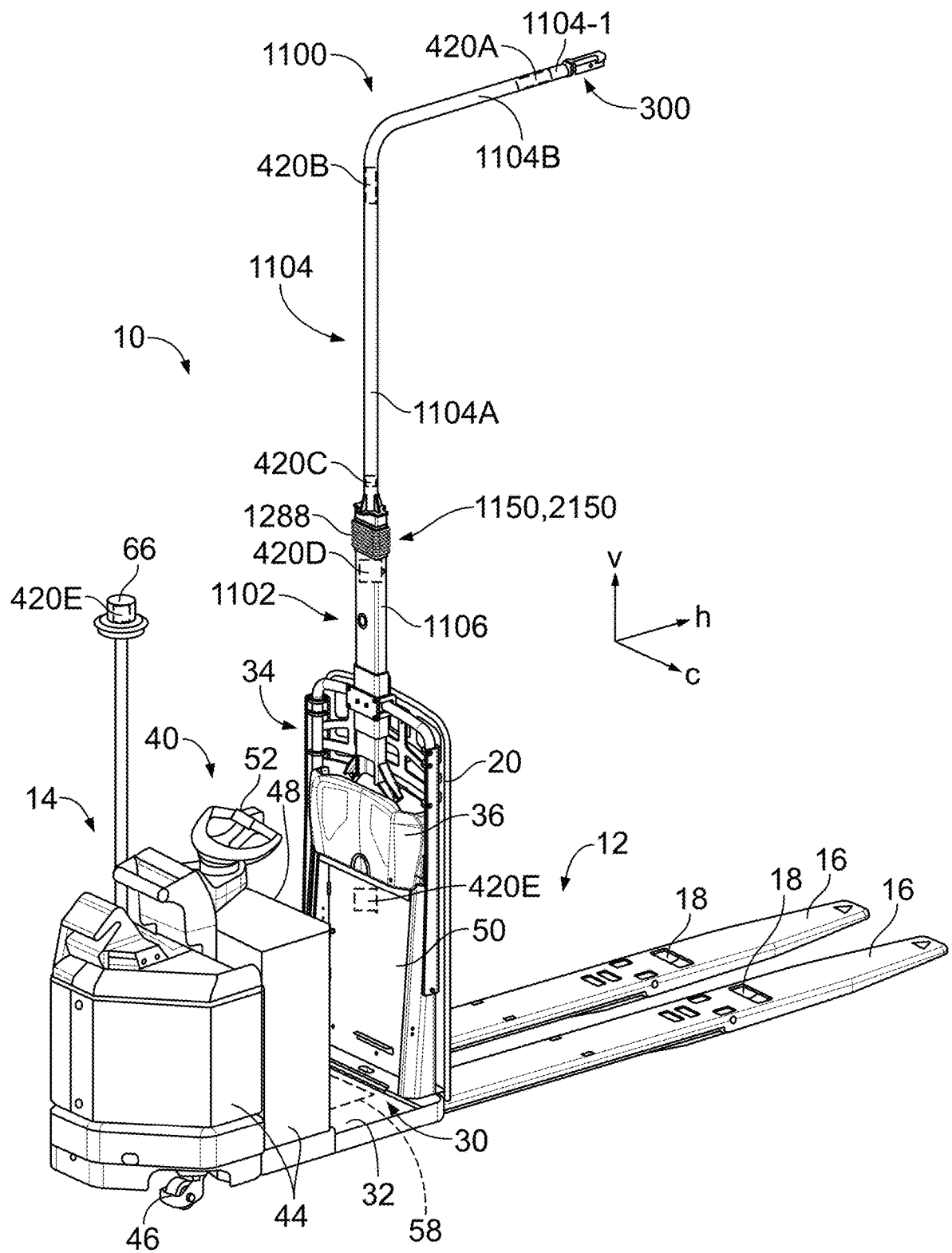

In the example shown in FIGS. 1A, 1B, and 39, the truck 10 may comprise the operator's backrest 34 and a separate load backrest 20. The operator's backrest 34 faces toward the power unit 14 and is fixed to the operator's platform 32, such that the operator's backrest 34 does not move vertically relative to the operator's platform 32. The load backrest 20, which forms part of the load handling assembly 12 and may move vertically with the other components of the load handling assembly 12, faces toward the forks 16 and serves as a backstop for a load positioned on the forks 16. In other examples (not shown), the truck 10 may comprise a single backrest that serves as both the operator's backrest and the load backrest. The operator's backrest 34 may comprise a wall 50 extending generally vertically above the operator's platform 32 and a support pad 36 coupled to the wall 50. During operation of the truck 10, the operator may stand against the support pad 36.

A boom assembly 100, 1100 may be associated with, i.e., coupled to, the truck 10, and an accessory 300 may be coupled to the boom assembly 100, 1100. In the example shown in FIGS. 1A, 1B, and 2, the boom assembly 100, 1100 is removably coupled to the operator's backrest 34, as described herein. In other examples (not shown), the boom assembly 100, 1100 may be welded or otherwise secured directly to the operator's backrest 34. In further examples (not shown), the boom assembly 100, 1100 may be offset from the operator's backrest 34 and may be secured to another component of the truck 10, such as the load handling assembly 12. The boom assembly 100, 1100 may extend above the operator's station 30 and over the forks 16, such that the accessory 300 is positioned above the forks 16. The accessory 300 may comprise, for example, a camera or other imaging device, a light detection and ranging (Lidar) device, a light or object/image projecting device, a sound emitting device, a wireless internet device, or any combination thereof.

Figure 2:
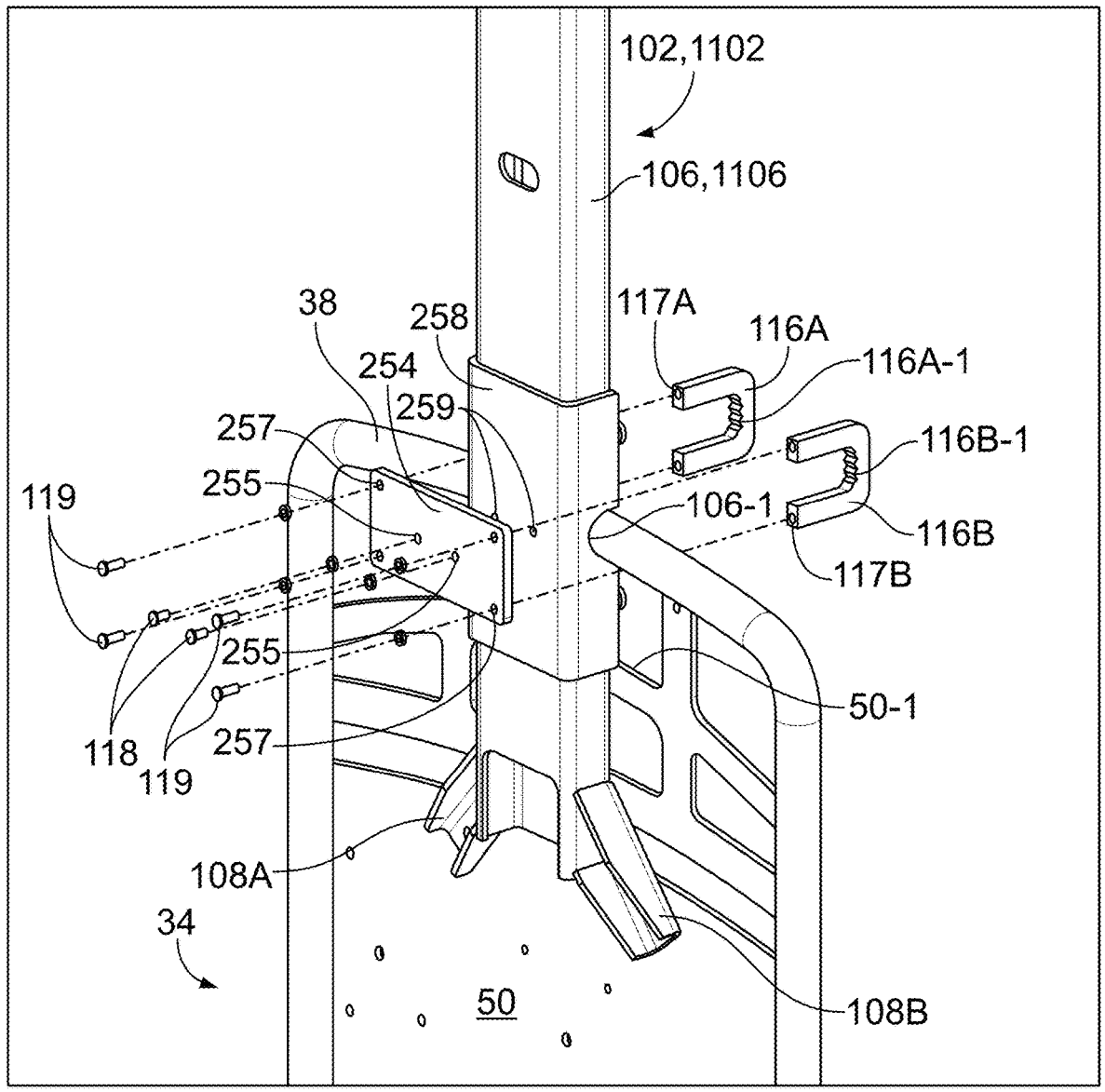
FIGS. 2-5 are partially exploded views of a portion of the boom assembly and the materials handling vehicle illustrated in FIG. 1B.

With reference to FIGS. 1A, 1B, and 2, the boom assembly 100, 1100 comprises a lower boom portion 102, 1102 (referred to herein as a base mount) and an upper boom portion 104, 1104. The base mount 102, 1102 is coupled to the upper boom portion 104, 1104 via an adapter 150, 1150, 2150 that is configured to yield when the upper boom portion 104, 1104, or at least one coupling member thereof, is subjected to one or more external forces sufficient to cause the adapter 150, 1150, 2150, or at least one coupling member thereof, to yield, such that the upper boom portion 104, 1104 moves to a deformed position relative to the base mount 102, 1102, as described herein.

As shown in FIGS. 2-5, the base mount 102, 1102 may comprise a main body 106, 1106, a first flange 108A, a second flange 108B, a first bracket 116A, and a second bracket 116B. The first and second flanges 108A, 108B are coupled and secured to the main body 106, 1106, e.g., via welding. In the example shown, the main body 106, 1106 is hollow and comprises a generally rectangular cross-section. In other examples, the main body 106, 1106 may comprise a different shape than that shown, such as a circular cross-sectional shape. The base mount 102, 1102 may be coupled to the operator's backrest 34 via the first and second flanges 108A, 108B and the first and second brackets 116A, 116B. The first and second flanges 108A, 108B may be positioned on one side of the operator's backrest 34, e.g., facing toward the power unit 14 (not visible in FIGS. 2-5; see FIGS. 1A and 1), and the first and second brackets 116A, 116B may be positioned opposite the first and second flanges 108A, 108B, e.g., facing toward the forks 16 (not visible in FIGS. 2-5; see FIGS. 1A and 1).

With reference to FIG. 2, the first and second brackets 116A, 116B may each comprise a "C" shape with a respective notch 116A-1, 116B-1 that fits over and receives a bar 38 comprising an upper portion of the operator's backrest 34. The main body 106, 1106 may also comprise a notch 106-1 that fits over and receives the bar 38. A retention plate 254 is positioned opposite the first and second brackets 116A, 116B. The base mount 102, 1102 may further comprise a support plate 258 coupled to the main body 106, 1106, e.g., via welding, that may at least partially surround a portion of the main body 106, 1106 adjacent to the notch 106-1. Fasteners 118 extend through apertures 255 formed in the retention plate 254 and are received in threaded apertures 259 formed in the support plate 258 to secure the retention plate 254 to the main body 106, 1106 of the base mount 102, 1102 via the support plate 258. Fasteners 119 extend through apertures 257 (only two of the apertures 257 are labeled in FIG. 2) formed in the retention plate 254 and are received in threaded apertures 117A, 117B formed in the first and second brackets 116A, 116B (only one of the threaded apertures 117A, 117B is labeled in FIG. 2) to secure the first and second brackets 116A, 116B to the retention plate 254, such that the bar 38 of the operator's backrest 34 is received in the notches 116A-1, 116B-1 of the first and second brackets 116A, 116B to clamp the bar 38 between the first and second brackets 116A, 116B and the retention plate 254. Washers (not labeled) may be positioned between the fasteners 118, 119 and the retention plate 254. Upon assembly, an upper half (not labeled) of each of the first and second brackets 116A, 116B may extend above the bar 38, and a lower half (not labeled) of each of the first and second brackets 116A, 116B may extend below the bar 38. The wall 50 comprises at least one opening 50-1 through which the lower half of each of the first and second brackets 116A, 116B extends for coupling to the retention plate 254. When the first and second brackets 116A, 116B are coupled to the retention plate 254, the first and second brackets 116A, 116B may engage, i.e., physically contact, the retention plate 254.

Figure 3:
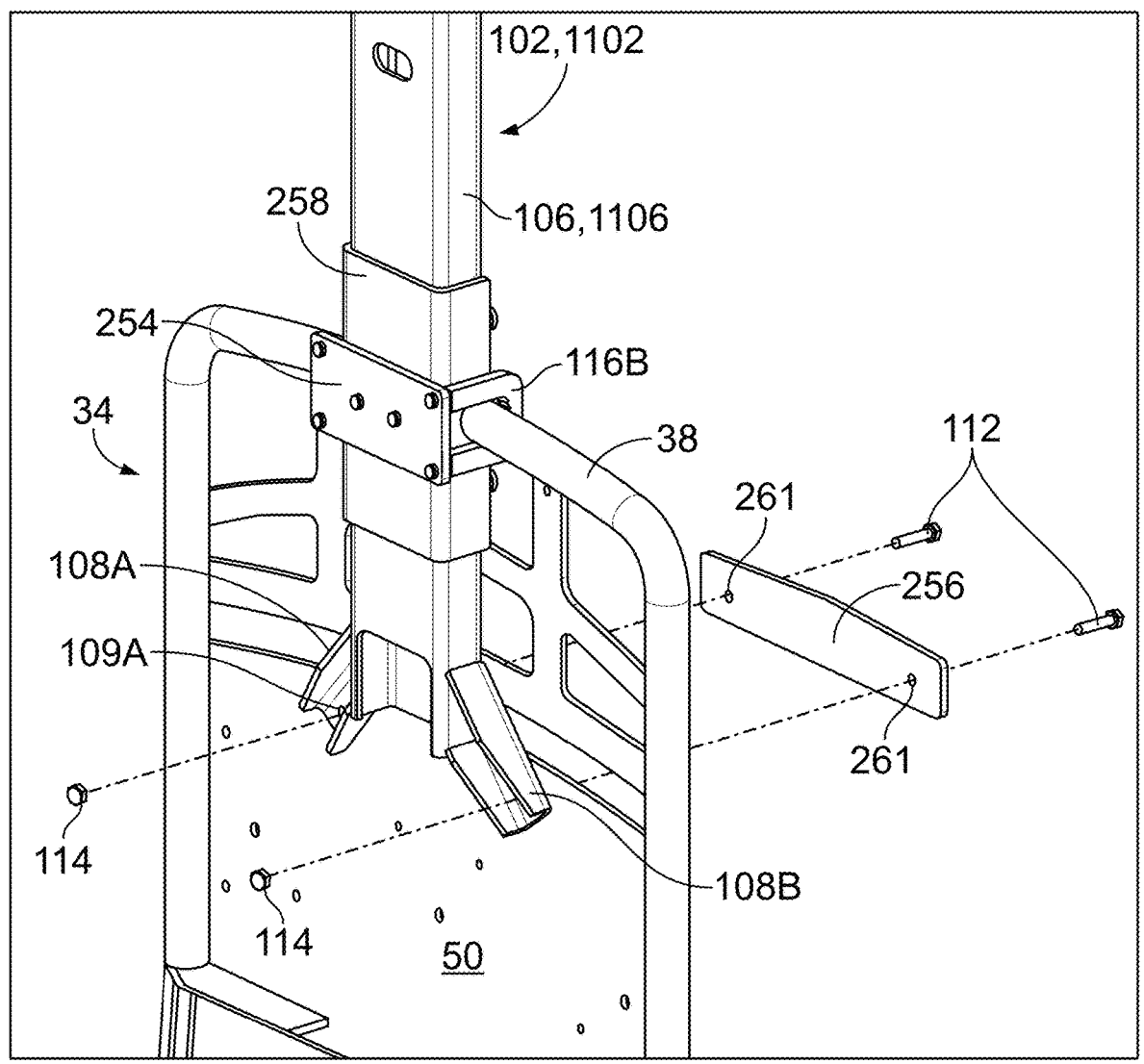

With reference to FIG. 3, a doubler plate 256 is positioned opposite the first and second flanges 108A, 108B. Fasteners 112 extend through apertures 261 formed in the doubler plate 256, through apertures (not visible) formed in the wall 50 of the operator's backrest 34, and through respective apertures 109A formed in the first and second flanges 108A, 108B (only the aperture 109A in the first flange 108A is visible in FIG. 3) and may be secured, e.g., via nuts 114.

Figure 4:
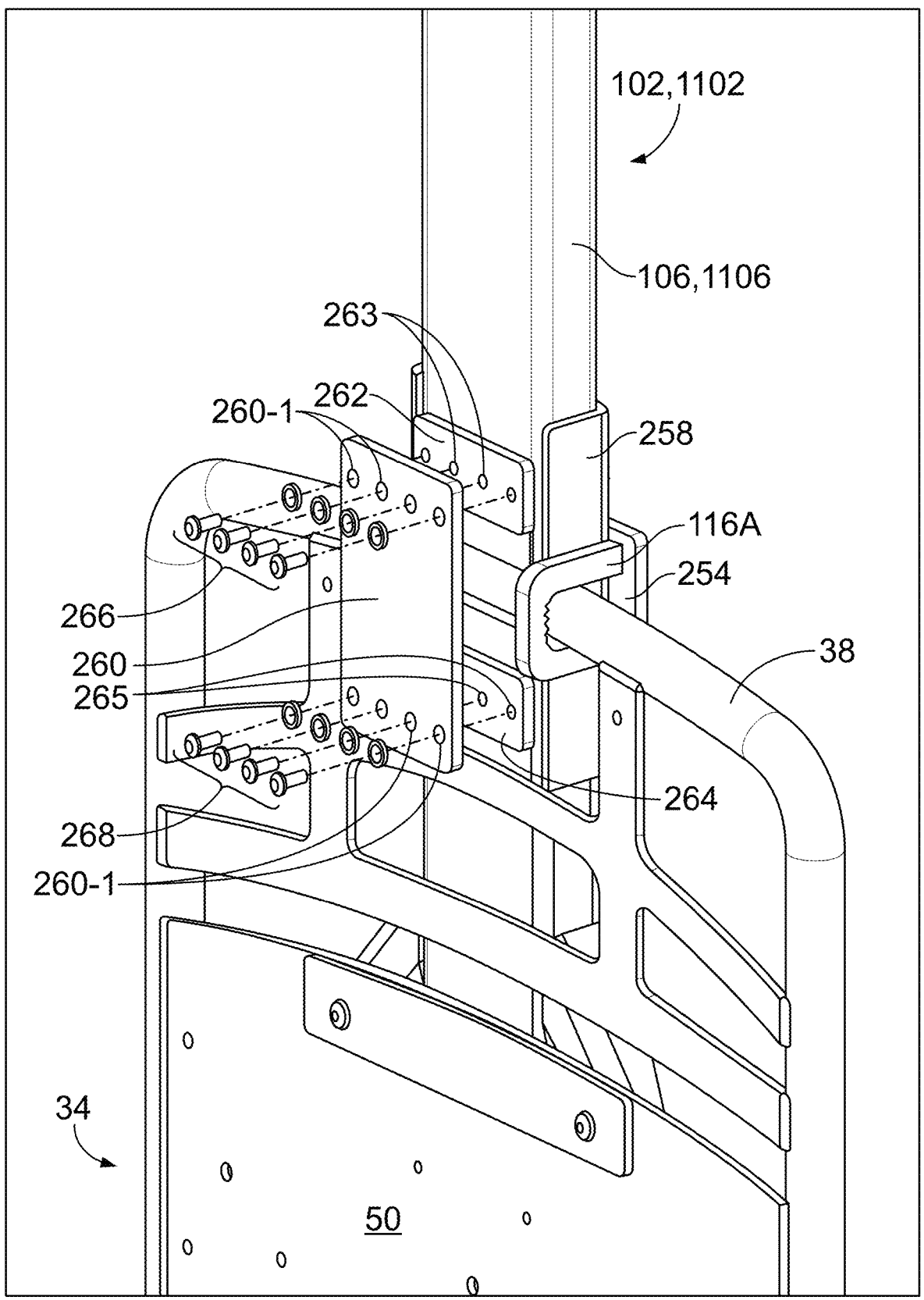

As shown in FIG. 4, a splice plate 260 may be secured to the main body 106, 1106 of the base mount 102, 1102 between the first and second brackets 116A, 116B on a side of the main body 106, 1106 opposite the retention plate 254. The main body 106, 1106 may comprise additional support plates 262, 264 coupled thereto, e.g., via welding, and positioned above and below the notch 106-1 (not visible in FIG. 4; see FIG. 2). Fasteners 266, 268 may extend through apertures 260-1 formed in the splice plate 260 (only four of the apertures 260-1 are labeled in FIG. 4) and be received in corresponding threaded apertures 263, 265 formed in the additional support plates 262, 264 (only two of the threaded apertures 263 are labeled in FIG. 4 and only two of the threaded apertures 265 are visible in FIG. 4). Washers (not labeled) may be positioned between the fasteners 266, 268 and the splice plate 260.

Upon coupling of the first and second brackets 116A, 116B to the retention plate 254 about the bar 38, coupling of the splice plate 260 to the main body 106, 1106, and coupling of the doubler plate 256 to the first and second flanges 108A, 108B through the wall 50 of the operator's backrest 34, the base mount 102, 1102 is fixed to the operator's backrest 34, and the base mount 102, 1102, specifically the main body 106, 1106 extends generally vertically above the operator's platform 32, as shown in FIGS. 1A and 1B. The first and second brackets 116A, 116B, the first and second flanges 108A, 108B, the doubler plate 256, and the splice plate 260 help to stabilize the base mount 102, 1102 and secure the base mount 102, 1102 to the operator's backrest 34 and also help to stabilize the upper boom portion 104, 1104. The boom assembly 100, 1100 may be field installable and may be configured for retrofitting to the operator's backrest 34 of existing trucks via the first and second brackets 116A, 116B and the first and second flanges 108A, 108B, as shown in FIGS. 2-4.

Figure 5:
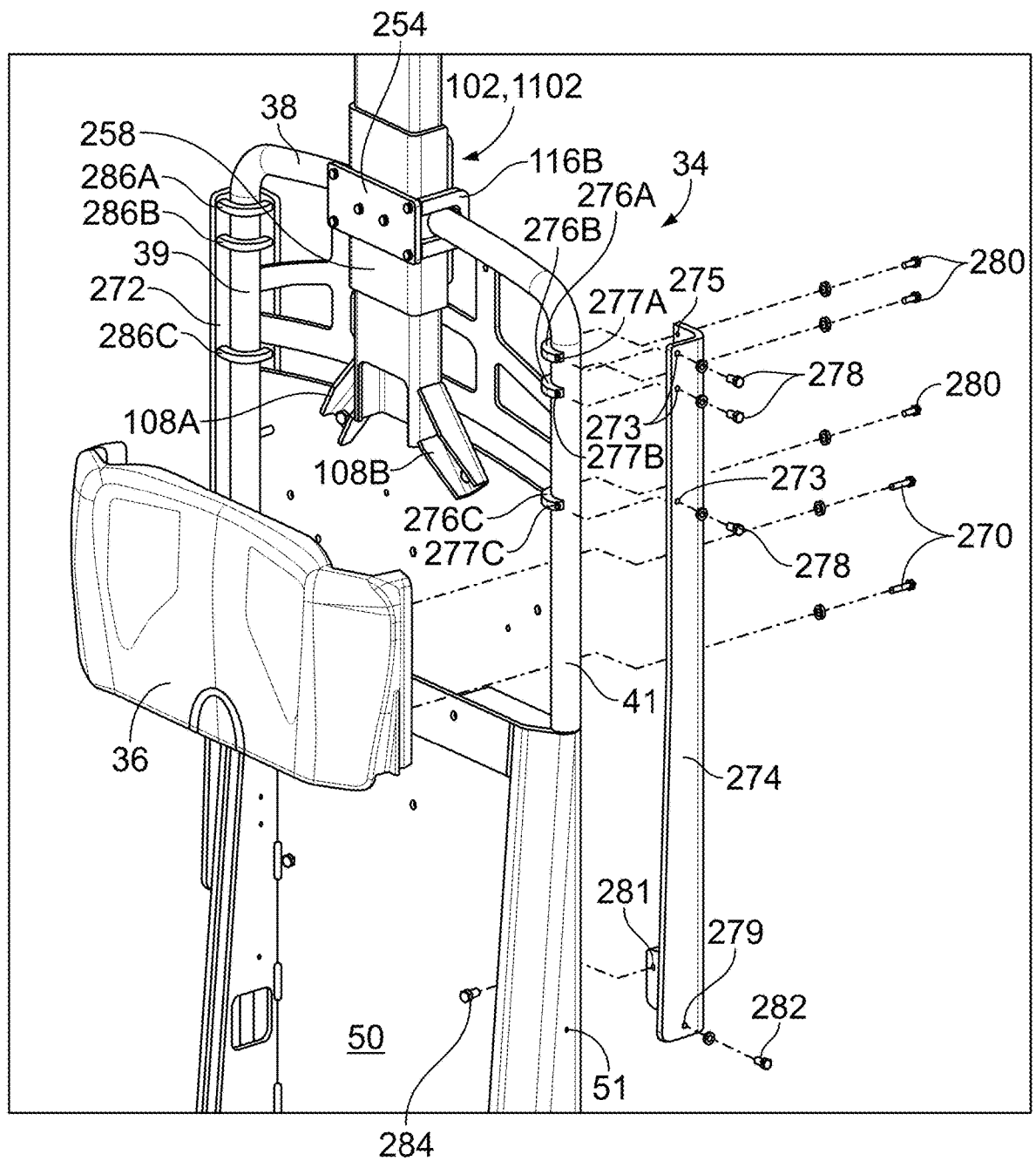
Figure 6:
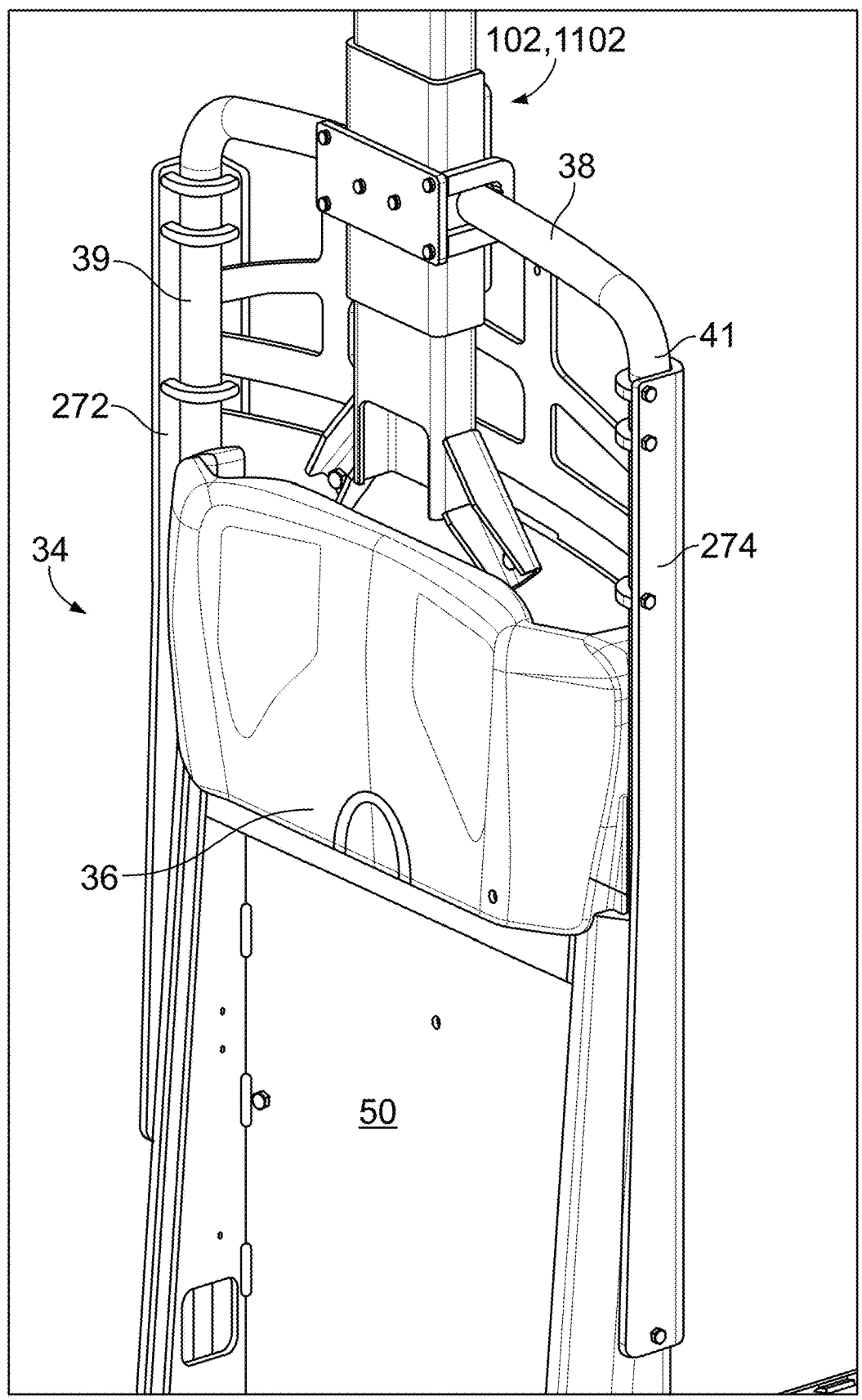
FIG. 6 is a detailed perspective view of the portion of the boom assembly and the materials handling vehicle illustrated in FIGS. 2-5 following assembly.

With reference to FIGS. 5 and 6, a pair of braces 272, 274 may be added to help support and strengthen the operator's backrest 34. The operator's backrest 34 may comprise a pair of posts 39, 41 that are coupled to the bar 38 defining the upper portion of the backrest 34, with the bar 38 extending generally horizontally between the posts 39, 41. One of the braces 272 may be attached to one of the posts 39, and the other brace 274 may be attached to the other post 41. With reference to the brace 274, a plurality of brackets 276A, 276B, 276C may be used to attach the brace 274 to the post 41. The brace 274 may comprise an "L" shape, and the brackets 276A, 276B, 276C may comprise a quadrant or quarter-circular shape that fits around the post 41. Fasteners 278 extend through apertures 273 formed along one edge of an upper portion of the brace 274 and are received in corresponding threaded apertures 277A, 277B, 277C formed in one end of the brackets 276A, 276B, 276C. Fasteners 280 extend through apertures 275 (only one aperture 275 is visible in FIG. 5) formed along the other edge of the upper portion of the brace 274 and are received in corresponding threaded apertures (not visible) formed in the other end (not visible) of the brackets 276A, 276B, 276C. A plurality of brackets 286A, 286B, 286C may similarly be used to attach an upper portion of the brace 272 to the post 39.

The braces 272, 274 may extend beyond their respective post 39, 41 and along a lower portion of the wall 50, as shown in FIGS. 5 and 6. With reference to the brace 274 in FIG. 5, one or more fasteners 282 extend through one or more additional apertures 279 formed along one edge of a lower portion of the brace 274 and are received in corresponding threaded aperture(s) 51 formed in the wall 50. One or more fasteners 284 extend through one or more additional apertures (not visible) formed in the wall 50 and are received in corresponding threaded aperture(s) 281 formed along the other edge of the lower portion of the brace 274. A lower portion of the brace 272 may be attached to the wall 50 in a similar manner.

The support pad 36 may be coupled to the operator's backrest 34 via a plurality of fasteners 270 (only two fasteners 270 are shown in FIG. 5) that extend through apertures (not visible) formed in the wall 50 and are received in threaded apertures formed in one or more metal plates (not visible) embedded within a polymeric pad portion of the support pad 36. Although the support pad 36 is depicted as being coupled to the operator's backrest 34 after attachment of the base mount 102, 1102 and/or the braces 272, 274, the support pad 36 may also be coupled to the backrest 34 prior to, or at the same time as, attachment of the base mount 102, 1102 and/or the braces 272, 274.

An additional example of a base mount is described in U.S. Provisional Patent Application No. 63/506,894 filed on Jun. 8, 2023.

Adapter with Shear Pins

Figure 7:
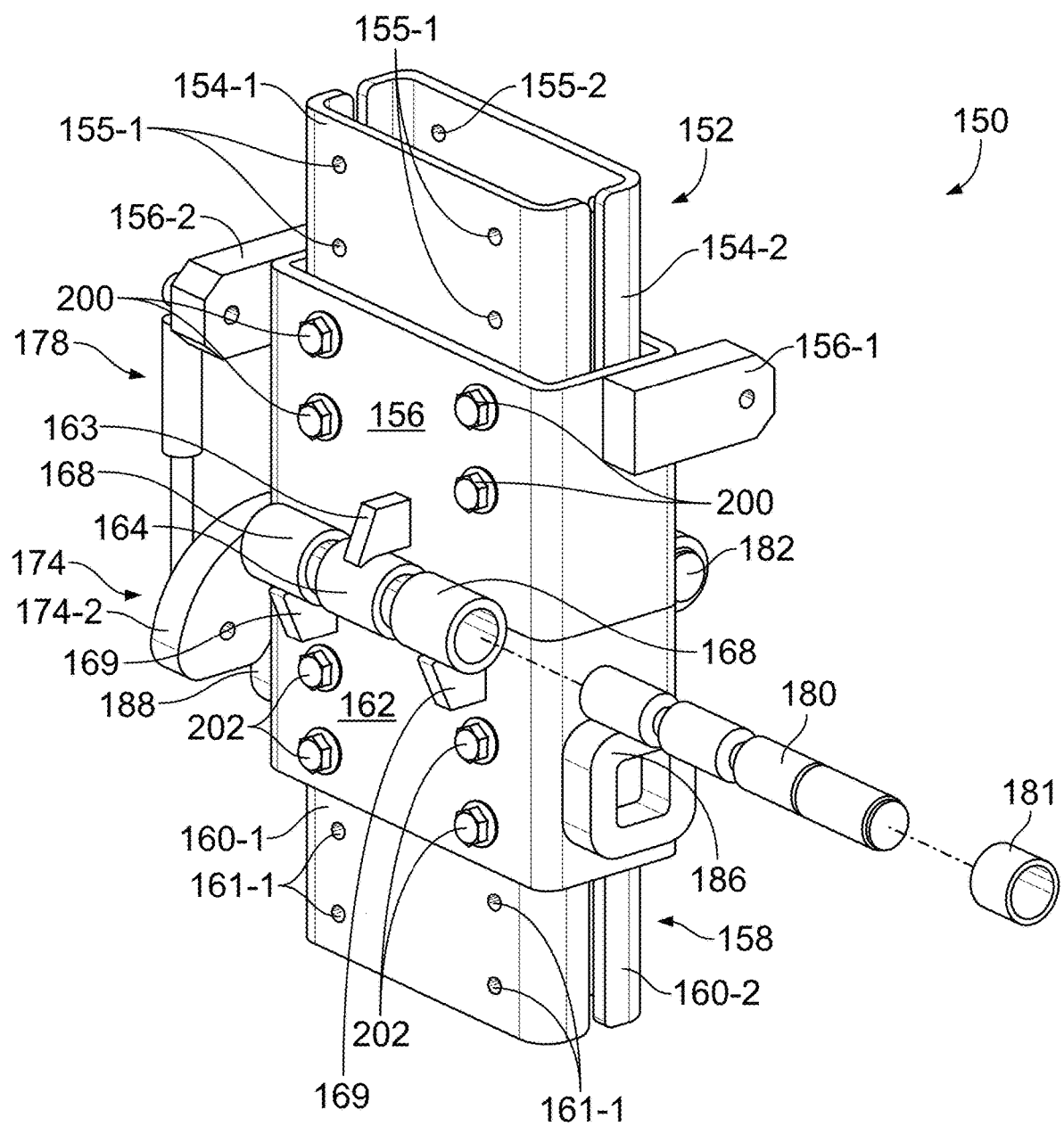
FIGS. 7 and 8 are partially exploded views of an adapter in accordance with the present disclosure.
Figure 8:
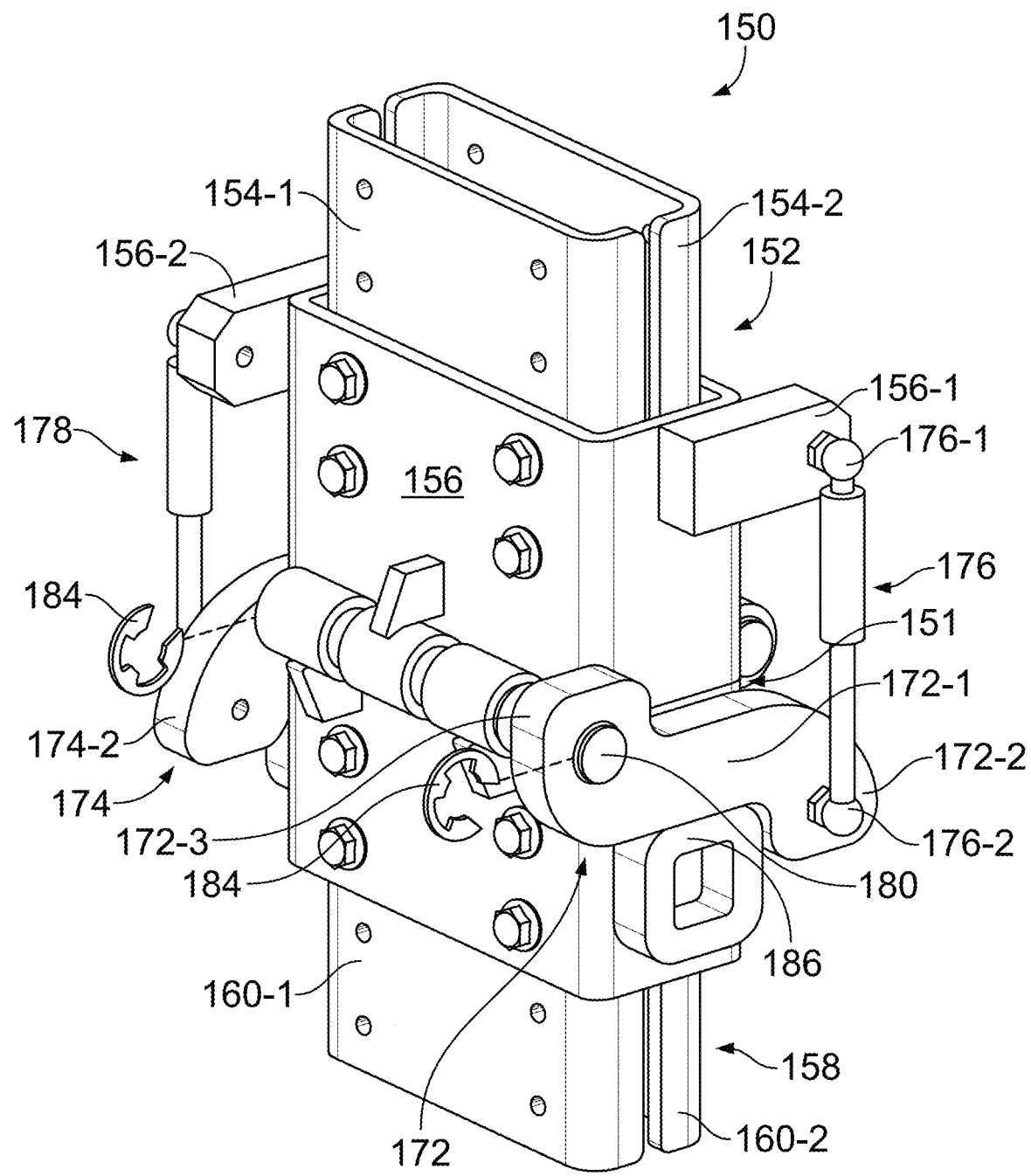

With reference to FIGS. 7 and 8, the adapter 150 comprises an upper element 152 that is coupled to the upper boom portion 104 (the upper boom portion 104 is not shown in FIGS. 7 and 8; see FIG. 11), a lower element 158 that is coupled to the base mount 102 (the base mount 102 is not shown in FIGS. 7 and 8; see FIG. 9), a first arm 172, a second arm 174, a first pin 180, a second pin 182, a first gas spring or first piston and cylinder unit or assembly 176, and a second gas spring or second piston and cylinder unit or assembly 178, in which the first and second gas springs 176, 178 may have a fluid in the cylinder such as a gas comprising air (in FIG. 7, the first arm 172 and the first gas spring 176 are omitted).

The upper element 152 comprises a pair of upper engagement plates 154-1, 154-2 that are received in an upper support body 156 and coupled to the upper support body 156 via fasteners 200. In the example shown in FIG. 7, four fasteners 200 extend through apertures (not visible) formed in a front side of the upper support body 156 and are received in threaded apertures (not visible) formed in the upper engagement plate 154-1 to secure the upper engagement plate 154-1 to the upper support body 156. Although not visible in FIG. 7, fasteners 200 also extend through apertures formed in a back side of the upper support body 156 and are received in threaded apertures formed in the upper engagement plate 154-2 to secure the upper engagement plate 154-2 to the upper support body 156 (see FIG. 13).

The lower element 158 comprises a pair of lower engagement plates 160-1, 160-2 that are received in a lower support body 162 and coupled to the lower support body 162 via fasteners 202. In the example shown in FIG. 7, four fasteners 202 extend through apertures (not visible) formed in a front side of the lower support body 162 and are received in threaded apertures (not visible) formed in the lower engagement plate 160-1 to secure the lower engagement plate 160-1 to the lower support body 162. Although not visible in FIG. 7, fasteners also extend through apertures formed in a back side of the lower support body 162 and are received in threaded apertures formed in the lower engagement plate 160-2 to secure the lower engagement plate 160-2 to the lower support body 162 (see FIG. 13).

Figure 27:
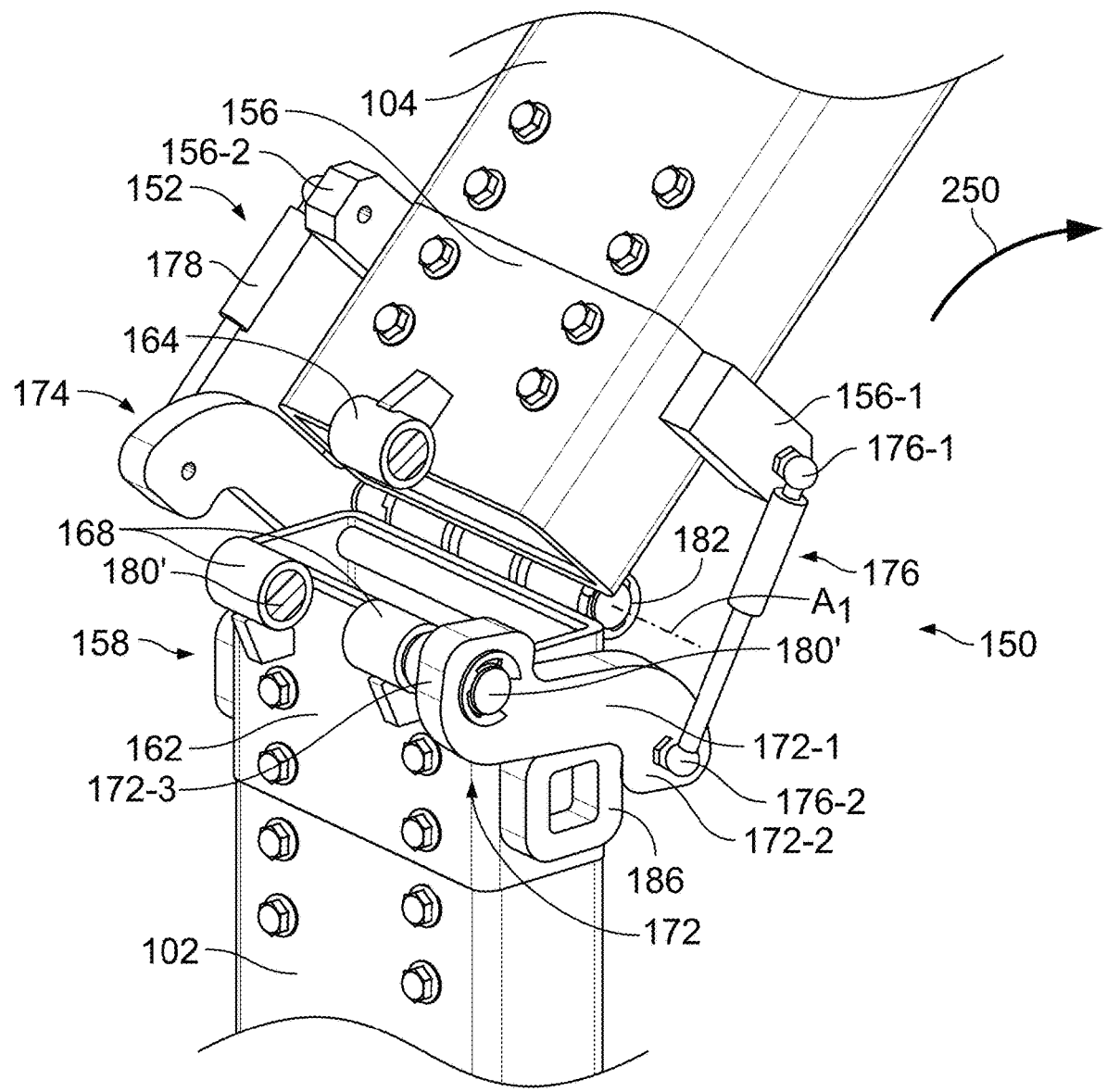
FIGS. 27 and 28 are detailed perspective views of the adapter illustrated in FIG. 26.
Figure 28:
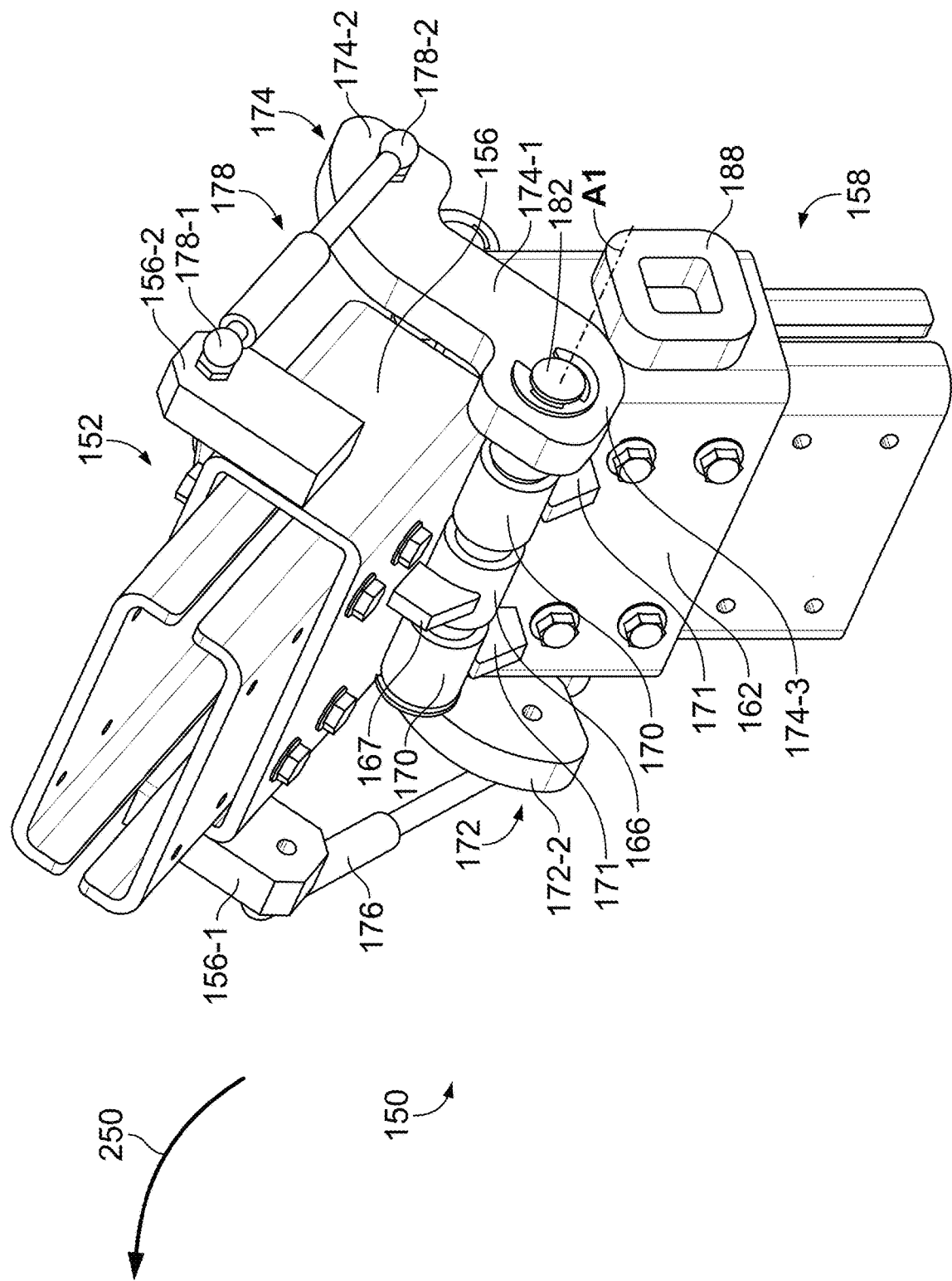

As shown in FIG. 8, the first arm 172 may generally comprise a flattened "S" shape with a linear section 172-1, a first end 172-2 that extends away from the linear section 172-1 in a first direction, and a second end 172-3 that extends away from the linear section 172-1 in a second direction that is opposite to the first direction (see also FIG. 27). As best seen in FIG. 28, the second arm 174 may similarly comprise a flattened "S" shape with a linear section 174-1, a first end 174-2 that extends away from the linear section 174-1 in a first direction, and a second end 174-3 that extends away from the linear section 174-1 in a second direction that is opposite to the first direction.

With reference to FIGS. 7, 8, 27, and 30, the upper support body 156 comprises a first extension 156-1 that extends outward from the upper support body 156 in a first direction, and a second extension 156-2 that extends outward from the upper support body 156 in a second direction opposite the first direction. A first end 176-1 of the first gas spring 176 is coupled to the first extension 156-1, and a second end 176-2 of the first gas spring 176 is coupled to the first end 172-2 of the first arm 172, as shown in FIGS. 8 and 27. Hence, the first arm 172 is coupled to the upper support body 156 via the first gas spring 176, which is coupled to the first extension 156-1. A first end 178-1 of the second gas spring 178 is similarly coupled to the second extension 156-2, and a second end 178-2 of the second gas spring 178 is coupled to the first end 174-2 of the second arm 174, as shown in FIG. 28 (see also FIG. 30). Hence, the second arm 174 is coupled to the upper support body 156 via the second gas spring 178, which is coupled to the second extension 156-2.

Figure 9:
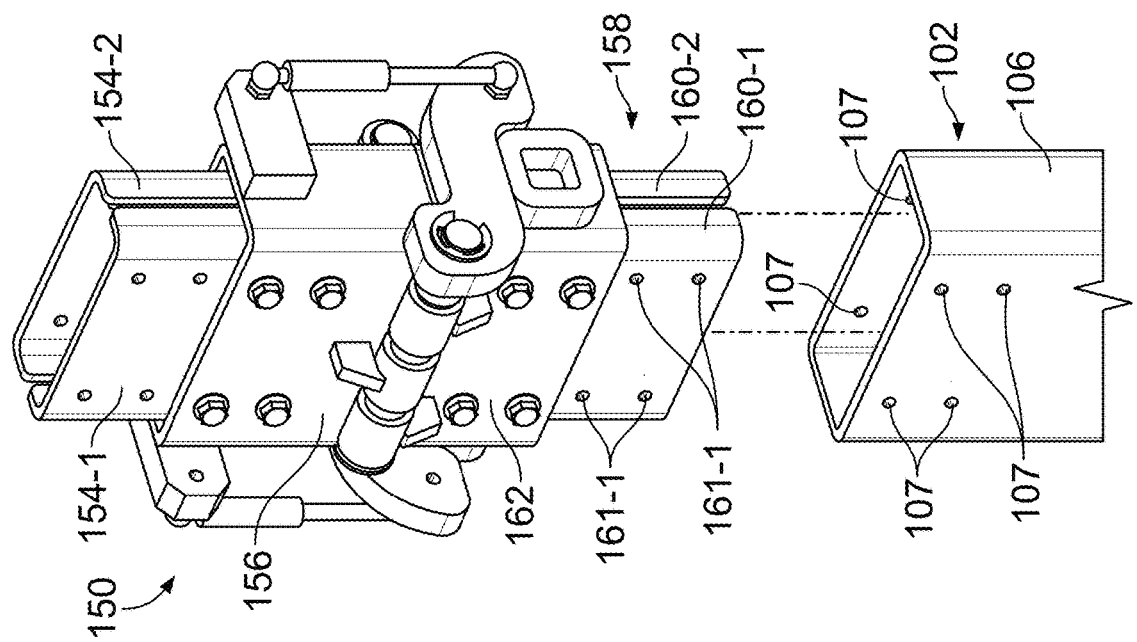

In the example shown in FIGS. 7-9, when the adapter 150 is in a normal operating position (i.e., prior to failure as described herein), the first and second gas springs 176, 178 may extend generally vertically between the respective first and second extensions 156-1, 156-2 and the first ends 172-2, 174-2 of the respective first and second arms 172, 174 and may be generally parallel to the main body 106 of the base mount 102. In other examples (not shown), the first and second gas springs 176, 178 may extend at an angle with respect to the main body 106 and the upper boom portion 104.

As shown in FIGS. 7, 11, 28, and 30, the upper support body 156 comprises one hinge barrel 164 on one side and one hinge barrel 166 on the other side. The hinge barrel 164 may comprise a support bracket or gusset 163 extending between the hinge barrel 164 and an adjacent portion of the upper support body 156 to help support the hinge barrel 164. The hinge barrel 166 may similarly comprise a support bracket or gusset 167 extending between the hinge barrel 166 and an adjacent portion of the upper support body 156. The lower support body 162 comprises two hinge barrels 168 on one side and two hinge barrels 170 on the other side. Each hinge barrel 168 may comprise a support bracket or gusset 169 extending between the hinge barrels 168 and an adjacent portion of the lower support body 162. Each hinge barrel 170 may similarly comprise a support bracket or gusset 171 extending between the hinge barrel 170 and an adjacent portion of the lower support body 162.

Figure 30:
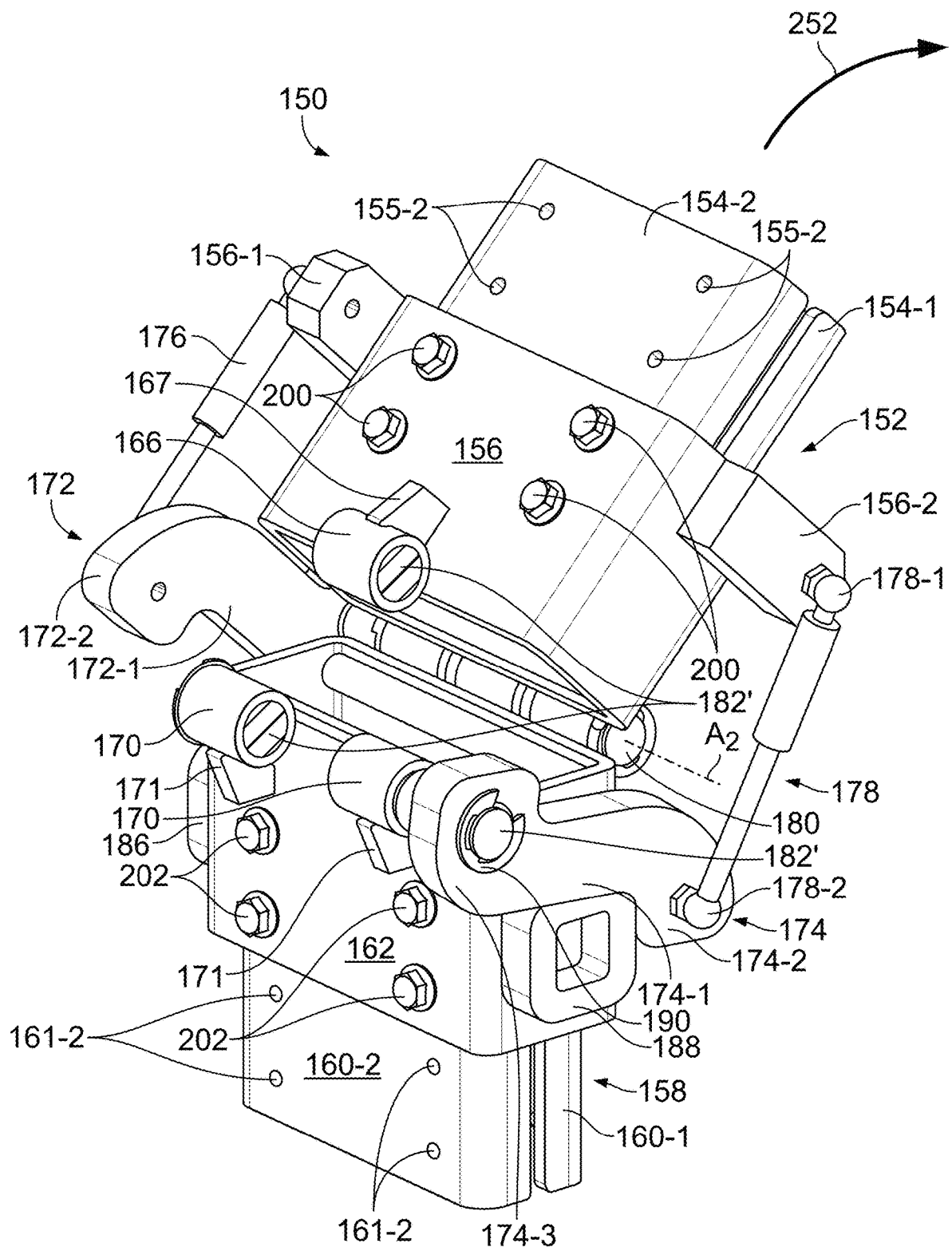
FIG. 30 is a detailed perspective view of the adapter illustrated in FIG. 29.

The hinge barrels 164, 168 and an aperture formed in the second end 172-3 of the first arm 172 are aligned to receive the first pin 180, as shown in FIGS. 7 and 8, such that the first pin 180 couples the second end 172-3 of the first arm 172 to the upper and lower support bodies 156, 162 via the first pin 180 being received in the respective hinge barrels 164, 168 of the upper and lower support bodies 156, 162 and the aperture of the first arm 172. The hinge barrels 166, 170 and an aperture formed in the second end 174-3 of the second arm 174 are similarly aligned to receive the second pin 182, as shown in FIG. 28, such that the second pin 182 couples the second end 174-3 of the second arm 174 to the upper and lower support bodies 156, 162 via the second pin 182 being received in the hinge barrels 166, 170 of the upper and lower support bodies 156, 162 and the aperture of the second arm 174. One or more spacers 181 may be placed about the first pin 180 and between the first arm 172 and the adjacent hinge barrel 168 to maintain a desired spacing between the first arm 172 and the adjacent hinge barrel 168, as shown in FIG. 7. One or more spacers (not shown) may similarly be placed between the second arm 174 and the adjacent hinge barrel 170 (see FIG. 28). As shown in FIG. 8, one or more snap rings 184 may be placed around ends of the first pin 180 to hold the first pin 180 in place. One or more snap rings 190 may similarly be used to hold the second pin 182 in place, as best seen in FIG. 30. The first and second pins 180, 182 may comprise shear pins that are configured to break or shear off upon application of a shear force equal to, or in excess of, a shear force threshold value, as described herein.

With continued reference to FIGS. 7, 8, 28, and 30, the lower support body 162 may comprise a first stop 186 and a second stop 188 extending outward from opposing sides of the lower support body 162. The first stop 186 may be positioned so that when the adapter 150 is in the normal, i.e., home, operating position as shown in FIG. 8, the linear section 172-1 of the first arm 172 rests against the first stop 186, and the linear section 174-1 (see FIG. 30) of the second arm 174 similarly rests against the second stop 188.

Figure 10:
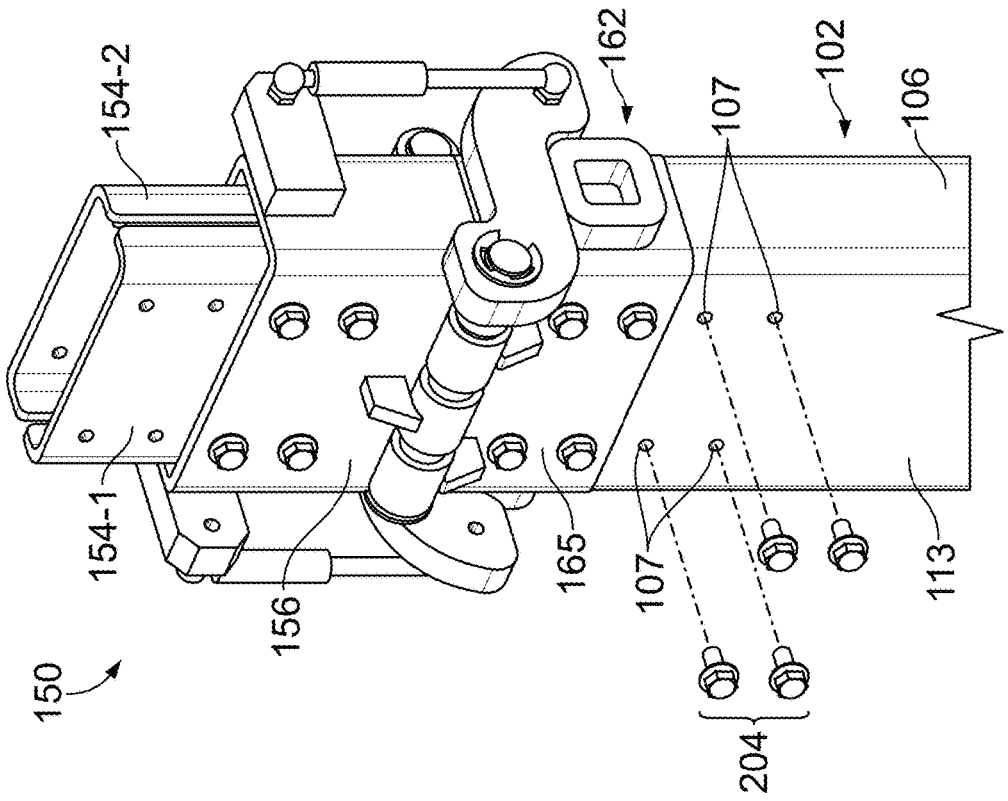

As shown in FIGS. 9 and 10, the adapter 150 may be coupled to the main body 106 of the base mount 102. The main body 106 of the base mount 102 comprises a plurality of apertures 107 formed on both sides. In the example shown in FIG. 9, a front side of the main body 106 comprises four apertures 107. A back side of the main body 106 also comprises four apertures 107, although only a portion of the apertures 107 is visible. The lower engagement plates 160-1, 160-2 each comprise a plurality of corresponding threaded apertures 161-1, 161-2 (only the apertures 161-1 formed in the lower engagement plate 160-1 are visible in FIG. 9; see the apertures 161-2 formed in the lower engagement plate 160-2 in FIG. 30). The lower engagement plates 160-1, 160-2 may be configured, i.e., sized and shaped, to fit and be received inside the main body 106 of the base mount 102. To secure the adapter 150, specifically the lower element 158 of the adapter 150, to the main body 106 of the base mount 102, the adapter 150 may be inserted into the base mount 102 so that the lower engagement plates 160-1, 160-2 are received in the main body 106, a lower surface of the lower support body 162 is seated against an upper surface of the main body 106, and the apertures 161 formed in the lower engagement plates 160-1, 160-2 are aligned with the apertures 107 formed in the main body 106. Fasteners 204 extend through the apertures 107 formed in the front side of the main body 106 and are received in the apertures 161 formed in the lower engagement plate 160-1. Although not visible in FIG. 10, fasteners 204 similarly extend through apertures formed in the back side of the main body 106 and are received in apertures formed in the lower engagement plate 160-2 (see FIG. 13). Upon installation of the adapter 150 into the main body 106 of the base mount 102, an outer surface 165 of the lower support body 162 may be flush with an outer surface 113 of the main body 106.

With reference to FIGS. 11 and 12, the upper boom portion 104 may be coupled to the adapter 150. In the example shown, the upper boom portion 104 is hollow and comprises a generally rectangular cross-section that corresponds to the cross-sectional shape of the base mount 102. In other examples, the upper boom portion 104 may comprise a different shape, such as a circular cross-sectional shape. The upper boom portion 104 may comprise a first section 104A and a second section 104B. In some examples, the second section 104B extends at an angle with respect to the first section 104A. In the example shown in FIGS. 1A and 13, the second section 104B extends substantially perpendicular, i.e., at an angle of about 90 degrees, +/−5 degrees, with respect to the first section 104A (see also FIG. 1A). In other examples (not shown), the second section 104B may extend at an angle of +/−45 degrees from horizontal, e.g., parallel to a plane (not shown) defined by the operator's platform 32 and/or the forks 16. In further examples (not shown), the upper boom portion 104 may comprise a single section that extends generally vertically above the operator's platform 32. In the example shown in FIGS. 1A and 13, the first and second sections 104A, 104B may be substantially equal in length. In other examples (not shown), the first section 104A may comprise a different length than the second section 104B. The main body 106 and the upper boom portion 104 may have a cross section with a width dimension ranging from 0.5 inch to 6.0 inches and a length dimension ranging from 0.5 inch to 6.0 inches. The main body 106 and the upper boom portion 104 may be made from any metal, such as a steel, stainless steel, aluminum, etc., and may have a wall thickness ranging from ⅛ inch to ¼ inch. An overall height of the boom assembly 100, i.e., the overall height of the boom assembly 100 above the forks 16 when the boom assembly 100 is installed, may range from 5.5 feet to 14 feet.

With continued reference to FIGS. 11 and 12, the upper boom portion 104, specifically the first section 104A, comprises a plurality of apertures 105 formed on both sides. In the example shown in FIG. 11, a front side of the upper boom portion 104 comprises four apertures 105. Although not visible, a back side of the upper boom portion 104 also comprises four apertures. The upper engagement plates 154-1, 154-2 each comprise a plurality of corresponding threaded apertures 155-1, 155-2 (only one of the apertures 155-2 formed in the upper engagement plate 154-2 is visible in FIG. 11; see also FIG. 30). The upper engagement plates 154-1, 154-2 may be configured, i.e., sized and shaped, to fit and be received inside the first section 104A of the upper boom portion 104. To secure the upper boom portion 104 to the adapter 150, specifically to the upper element 152 of the adapter 150, the first section 104A of the upper boom portion 104 may be placed over the upper element 152 of the adapter 150 and positioned so that the upper engagement plates 154-1, 154-2 are received in the first section 104A, a lower surface of the first section 104A is seated against an upper surface of the upper support body 156, and the apertures 155-1, 155-2 formed in the upper engagement plates 154-1, 154-2 are aligned with the apertures 105 formed in the upper boom portion 104. Fasteners 206 extend through the apertures 105 formed in the front side of the upper boom portion 104 and are received in the apertures 155-1 formed in the upper engagement plate 154-1. Although not visible in FIG. 12, fasteners 206 similarly extend through apertures formed in the back side of the upper boom portion 104 and are received in the apertures 155-2 formed in the upper engagement plate 154-2 (see FIG. 13). Upon installation of the upper boom portion 104 onto the adapter 150, an outer surface 159 of the upper support body 156 may be flush with an outer surface 115 of the upper boom portion 104.

Figure 13:
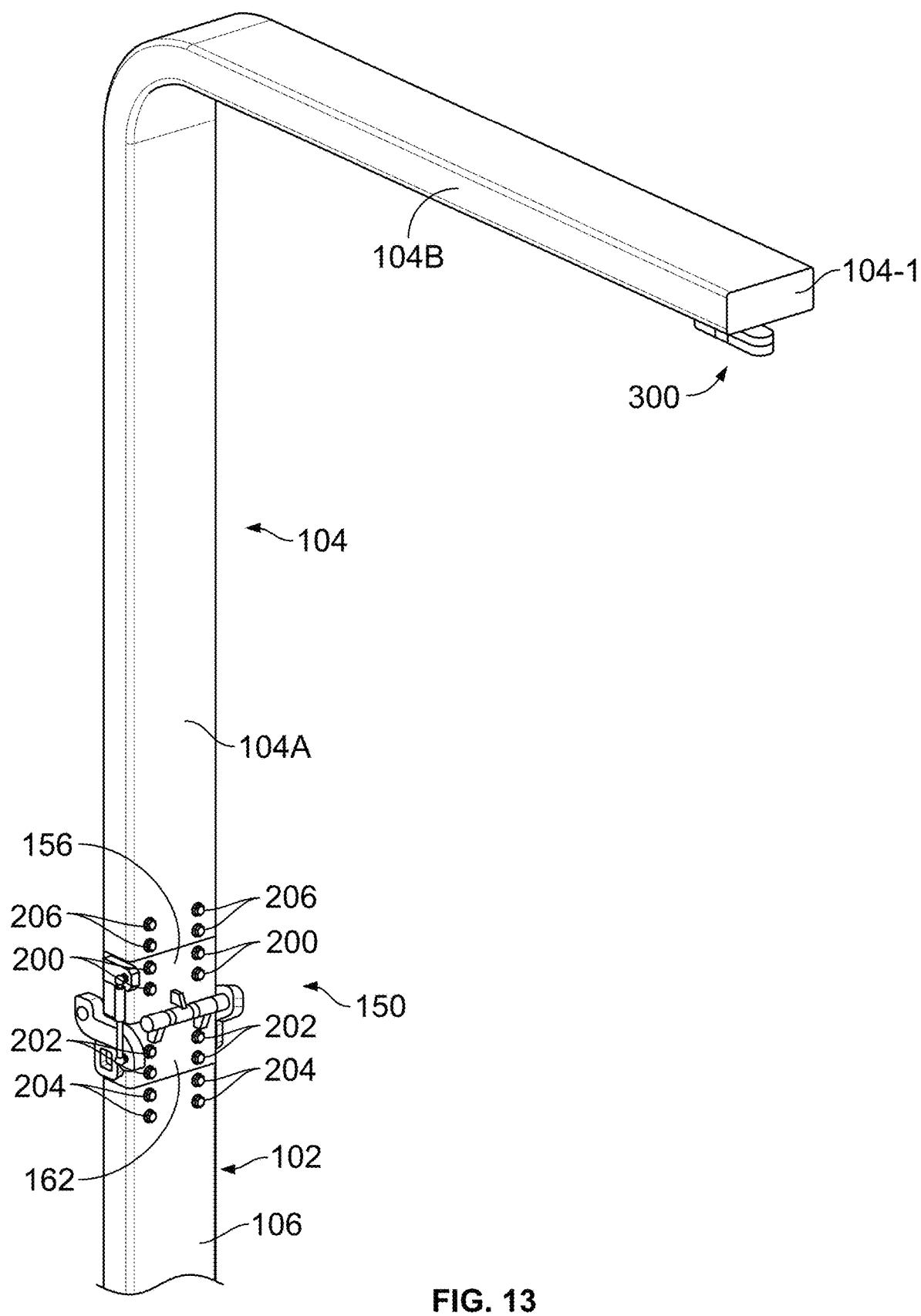
FIG. 13 is a detailed perspective view of the boom assembly and the adapter illustrated in FIGS. 9-12 following assembly.

In the example shown in FIGS. 1A and 13, upon coupling of the upper boom portion 104 to the adapter 150, the first section 104A of the upper boom portion 104 extends generally vertically above the operator's platform 32 and is generally vertically aligned with the main body 106 of the base mount 102, e.g., aligned along a vertical axis v, as shown in FIG. 1A. The second section 104B of the upper boom portion 104 may extend over, and generally parallel to, the forks 16 and perpendicular to the first section 104A and the main body 106 of the base mount 102.

Adapter with Coupling Plate(s)

With reference to FIGS. 14-18, an exemplary adapter 1150 coupling the base mount 1102 to the upper boom portion 1104 is described in detail. The adapter 1150 comprises at least one coupling member that includes at least one coupling plate. In the example shown, the adapter 1150 comprises a first upper plate mount 1156, a first lower plate mount 1158, a second upper plate mount 1160, and a second lower plate mount 1162, and the at least one coupling member comprises a first coupling plate 1152 and a second coupling plate 1154. The first coupling plate 1152 is joined to the first upper and lower plate mounts 1156, 1158, e.g., via welding. The first upper plate mount 1156 is coupled to the upper boom portion 1104, and the first lower plate mount 1158 is coupled to the base mount 1102, as described herein. The second coupling plate 1154 is similarly joined to the second upper and lower plate mounts 1160, 1162, e.g., via welding. The second upper plate mount 1160 is coupled to the upper boom portion 1104, and the second lower plate mount 1162 is coupled to the base mount 1102, as described herein. Although two coupling plates 1152, 1154 are shown, it should be understood that the at least one coupling member may include a single coupling plate, e.g., one of coupling plates 1152 or 1154.

Figure 14:
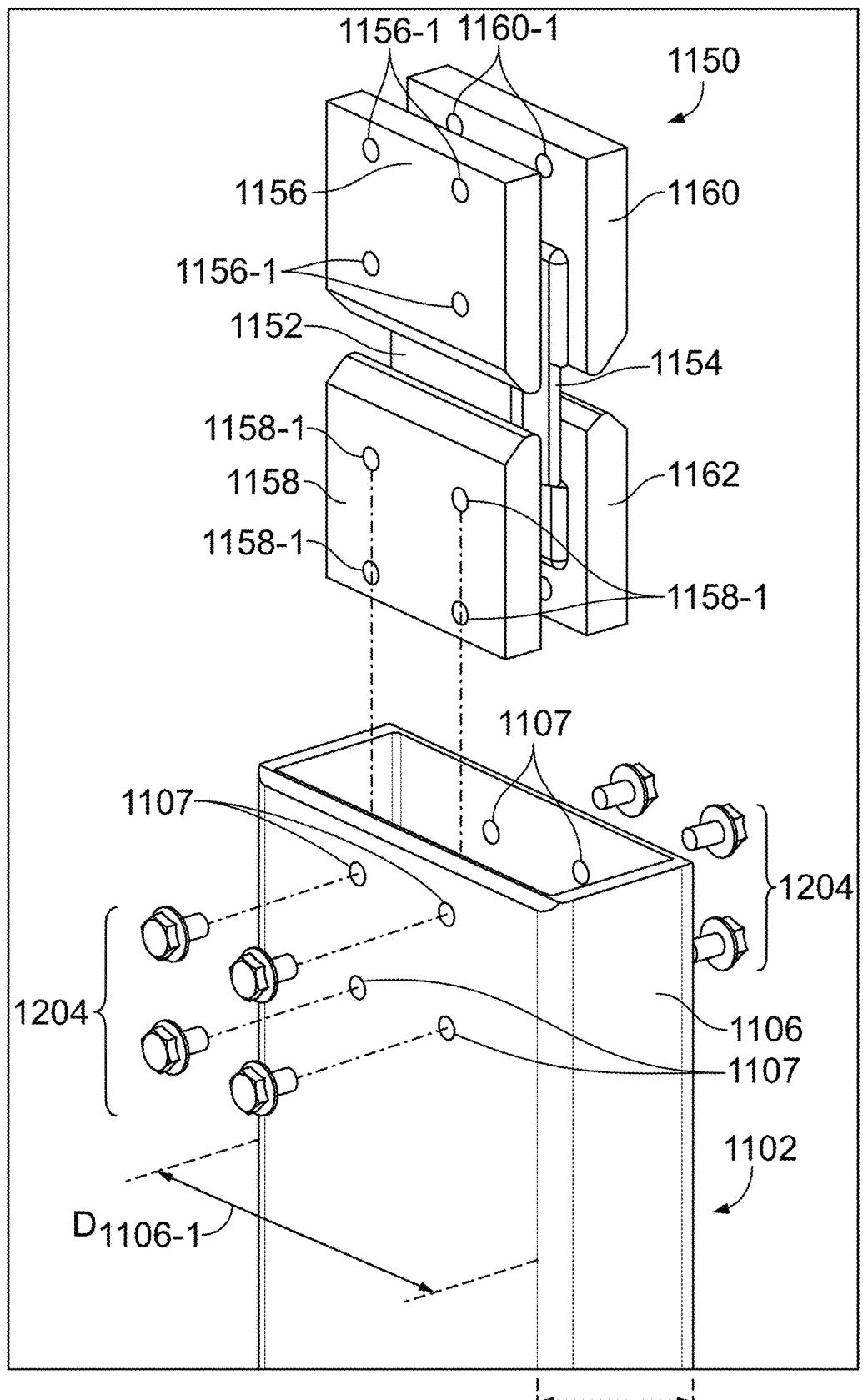
FIGS. 14 and 15 are partially exploded views of a portion of the boom assembly and adapter with at least one coupling member comprising coupling plates in accordance with the present disclosure.

As shown in FIG. 14, the main body 1106 of the base mount 1102 comprises a plurality of apertures 1107 formed on front and back sides. In the example shown, the front side of the main body 1106 comprises four apertures 1107. The back side of the main body 1106 also comprises four apertures 1107, although only some of the apertures 1107 are visible. The first and second lower plate mounts 1158, 1162 each comprises a plurality of corresponding threaded apertures 1158-1 (only the apertures 1158-1 formed in the first lower plate mount 1158 are visible in FIG. 14). The first and second lower plate mounts 1158, 1162 may be configured, i.e., sized and shaped, to fit and be received inside the main body 1106 of the base mount 1102. To secure the adapter 1150, specifically the first and second lower plate mounts 1158, 1162 and the first and second coupling plates 1152, 1154 joined thereto, to the main body 1106 of the base mount 1102, the first and second lower plate mounts 1158, 1162 may be inserted into the base mount 1102 so that the first and second lower plate mounts 1158, 1162 are received in the main body 1106, and the apertures 1158-1 formed in the first and second lower plate mounts 1158, 1162 are aligned with the apertures 1107 formed in the main body 1106. Fasteners 1204 extend through the apertures 1107 formed in the front side of the main body 1106 and are received in the apertures 1158-1 formed in the first lower plate mount 1158. Fasteners 1204 similarly extend through the apertures 1107 formed in the back side of the main body 1106 and are received in the apertures (not visible) formed in the second lower plate mount 1162.

With reference to FIGS. 1B and 39, the upper boom portion 1104 may be coupled to the adapter 1150. In the example shown, the upper boom portion 1104 is hollow and comprises a first section 1104A and a second section 1104B. In some examples, the second section 1104B extends at an angle with respect to the first section 1104A. In the example shown in FIGS. 1B and 39, the second section 1104B extends substantially perpendicular, i.e., at an angle of about 90 degrees, +/−5 degrees, with respect to the first section 1104A. In other examples (not shown), the second section 1104B may extend at an angle of +/−45 degrees from horizontal, e.g., parallel to a plane (not shown) defined by the operator's platform 32 and/or the forks 16. In further examples (not shown), the upper boom portion 1104 may comprise a single section that extends generally vertically above the operator's platform 32. In the example shown in FIGS. 1B and 39, a length $L_1$ of the first section 1104A may be different from, e.g., greater than, a length $L_2$ of the second section 1104B. In other examples (not shown), the lengths $L_1$, $L_2$ of the first and second sections 1104A, 1104B may be substantially equal. As shown in FIG. 14, the main body 1106 may have a square or rectangular cross section with a first dimension $D_{106\text{-}1}$ ranging from 0.5 inch to 6.0 inches and a second dimension $D_{106\text{-}2}$ ranging from 0.5 inch to 6.0 inches, and the upper boom portion 1104 may have a circular cross section with a diameter dimension ranging from 1.0 inch to 3.0 inches The main body 1106 and the upper boom portion 1104 may be made from any metal, such as a steel, stainless steel, aluminum, etc. The main body 1106 may have a wall thickness ranging from ⅛ inch to ¼ inch, and the upper boom portion 1104 may have a wall thickness ranging from 1/10 inch to ¼ inch. An overall height of the boom assembly 1100, i.e., the overall height of the boom assembly 1100 above the forks 16 when the boom assembly 1100 is installed, may range from 5.5 feet to 14 feet.

Figure 15:
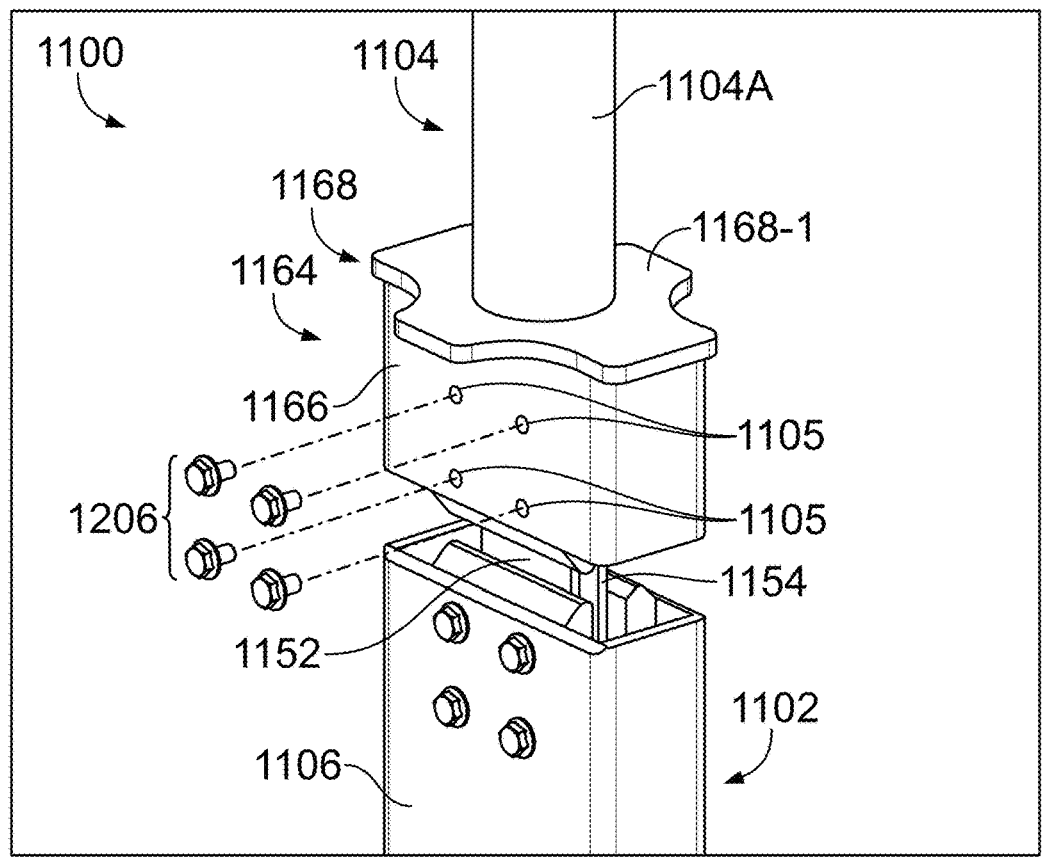

In the example shown in FIGS. 15-18, the upper boom portion 1104 comprises a different cross-section, i.e., a generally circular cross-section, as compared to the main body 1106 of the base mount 1102, and a connector 1164 provides a transition between the generally rectangular cross-section of the main body 1106 to the generally circular cross-section of the upper boom portion 1104. In other examples (not shown), the base mount 1102 and the upper boom portion 1104 may comprise the same cross-sectional shape. The connector 1164 may be positioned between the adapter 1150 and the upper boom portion 1104, as shown in FIG. 15. The connector 1164 comprises a lower element 1166 having a cross-sectional shape (i.e., generally rectangular) and dimensions that mirror the cross-sectional shape and dimensions of the main body 1106 of the base mount 1102. The lower element 1166 is coupled, e.g., via welding, to a lower surface (not visible) of an adapter plate 1168, and the first section 1104A of the upper boom portion 1104 is coupled, e.g., via welding, to an upper surface 1168-1 of the adapter plate 1168 opposite the lower surface. Gussets 1174 may be coupled, e.g., via welding, to the first section 1104A of the upper boom portion 1104 and may be further coupled, e.g., via welding, to the upper surface 1168-1 of the adapter plate 1168. The gussets 1174 may help to attach the first section 1104A of the upper boom portion 1104 to the adapter plate 1168 and to stabilize the upper boom portion 1104.

As shown in FIGS. 14 and 15, the lower element 1166 of the connector 1164 comprises a plurality of apertures 1105 formed on front and back sides, and the first and second upper plate mounts 1156, 1160 each comprises a plurality of corresponding threaded apertures 1156-1, 1160-1. In the illustrated example, the front side of the lower element 1166 comprises four apertures 1105. Although not visible, the back side of the lower element 1166 also comprises four apertures. The first and second upper plate mounts 1156, 1160 each comprise four apertures 1156-1, 1160-1 (only two of the apertures 1160-1 formed in the second upper plate mount 1160 are visible in FIG. 14).

The first and second upper plate mounts 1156, 1160 may be configured, i.e., sized and shaped, to fit and be received inside the lower element 1166 of the connector 1164. To secure the upper boom portion 1104 to the adapter 1150, specifically to the first and second upper plate mounts 1156, 1160 and the first and second coupling plates 1152, 1154 joined thereto, the lower element 1166 of the connector 1164 may be placed over the first and second upper plate mounts 1156, 1160 and positioned so that the first and second upper plate mounts 1156, 1160 are received in the lower element 1166 and the apertures 1156-1, 1160-1 formed in the first and second upper plate mounts 1156, 1160 are aligned with the apertures 1105 formed in the lower element 1166. Fasteners 1206 extend through the apertures 1105 formed in the front side of the lower element 1166 and are received in the apertures 1156-1 formed in the first upper plate mount 1156. Although not visible in FIGS. 14 and 15, fasteners 1206 similarly extend through apertures formed in the back side of the lower element 1166 and are received in the apertures 1160-1 formed in the second upper plate mount 1160.

Figure 18:
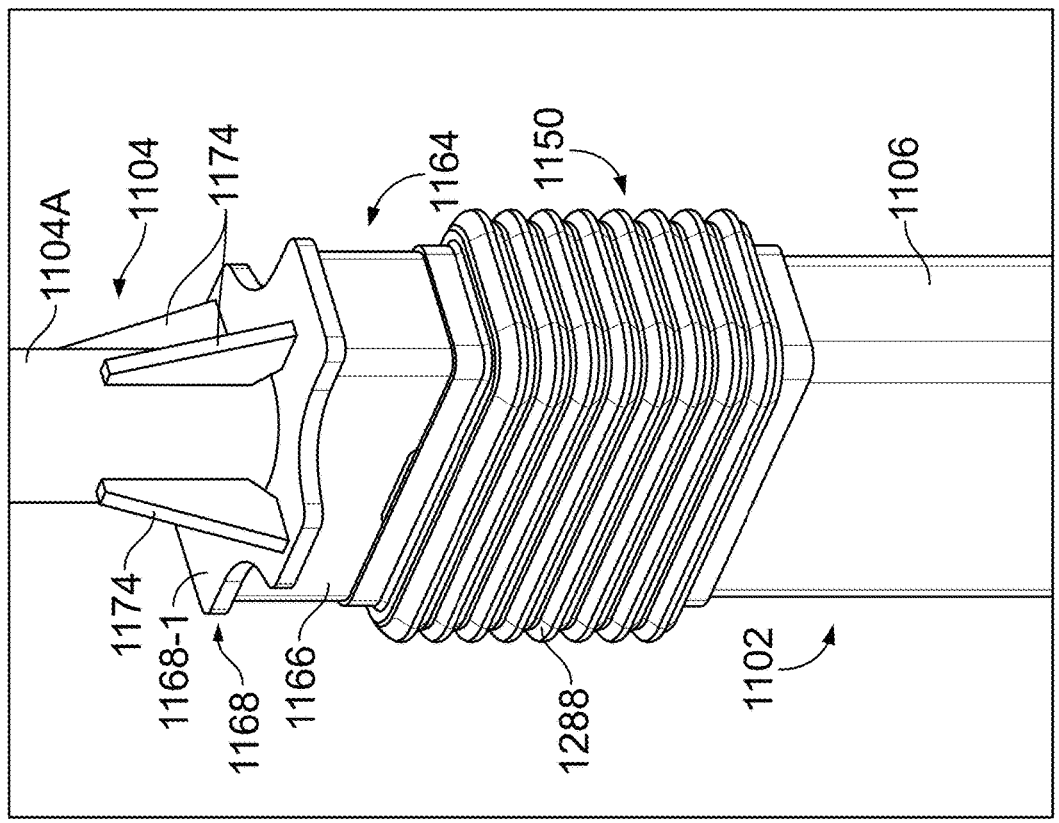
FIG. 18 is a detailed perspective view of the portion of the boom assembly and the adapter of FIG. 16, in which the adapter comprises a cover.

In the example shown in FIGS. 1, 15, and 39, upon coupling of the upper boom portion 1104 to the adapter 1150 and when the adapter 1150 is in a normal operating position (i.e., prior to failure as described herein), the first section 1104A of the upper boom portion 1104 extends generally vertically above the operator's platform 32 and is generally vertically aligned with the main body 1106 of the base mount 1102, e.g., aligned along a vertical axis v. The second section 1104B of the upper boom portion 1104 may extend over, and generally parallel to, the forks 16 and perpendicular to the first section 1104A and the main body 1106 of the base mount 1102. The first and second coupling plates 1152, 1154 may extend generally vertically and may be generally parallel to the main body 1106 of the base mount 1102. As shown in FIGS. 1B and 18, a cover 1288 may optionally be placed over the adapter 1150 and may extend from the lower element 1166 of the connector 1164 to the main body 1106 of the base mount 1102 to cover the first and second coupling plates 1152, 1154. The cover 1288 may be formed from a flexible, polymeric material.

Adapter with Coupling Bar(s)

With reference to FIGS. 19-23, another exemplary adapter 2150 coupling a base mount 1102 to an upper boom portion 1104 of a boom assembly 1100 is described in detail. The boom assembly 1100 may be substantially similar to the boom assembly 1100 shown in FIGS. 1B and 15, except as described herein. The adapter 2150 comprises at least one coupling member that includes at least one bar. In the example shown, the at least one coupling member comprises a first coupling bar 2152 and a second coupling bar 2154 that are each coupled to an upper boom portion 1104 and a base mount 1102. Although two bars 2152, 2154 are shown, it should be understood that the at least one coupling member may include a single bar, e.g., one of bars 2152 or 2154.

Figure 19:
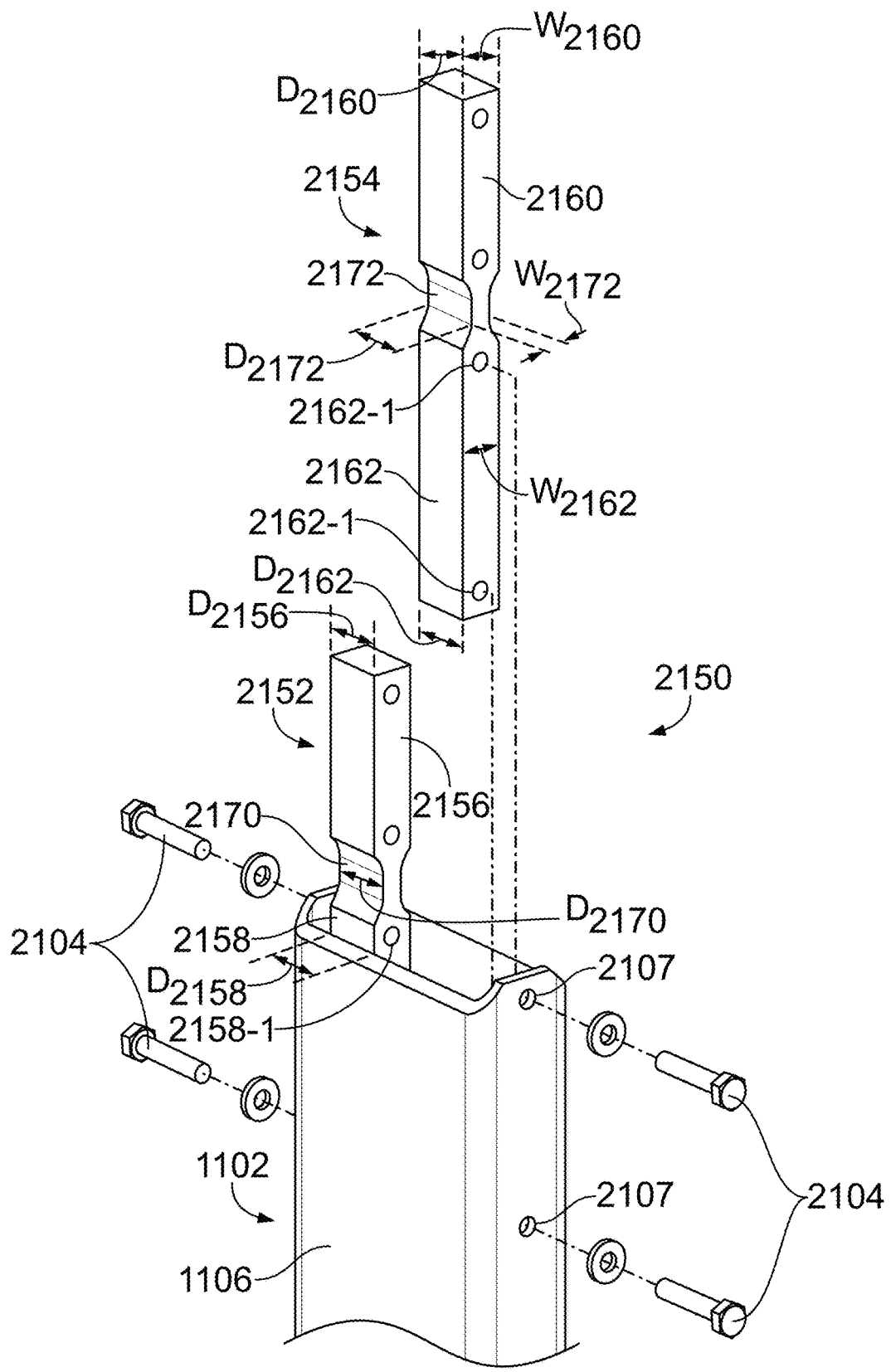
FIGS. 19 and 20 are partially exploded views of a portion of the boom assembly and adapter with at least one coupling element comprising coupling bars in accordance with the present disclosure.
Figure 21:
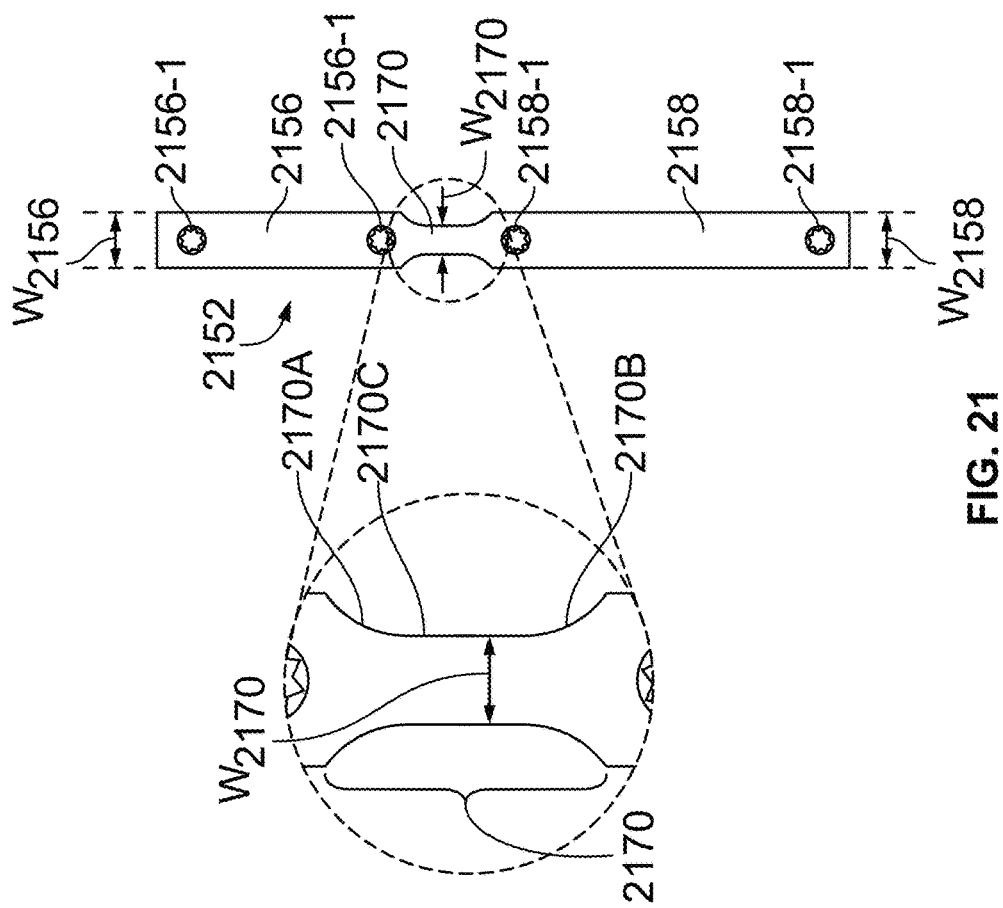
FIG. 21 is a detailed side view of one of the coupling bars of the adapter of FIGS. 19 and 20.

The first and second coupling bars 2152, 2154 may be substantially similar to each other and may each comprise a respective upper section 2156, 2160 that is coupled to the upper boom portion 1104; a lower section 2158, 2162 that is coupled to the base mount 1102; and a middle section 2170, 2172 joining the upper and lower sections 2156, 2158 and 2160, 2162. As shown in FIGS. 19 and 21, the upper and lower sections 2156, 2158 of the first coupling bar 2152 each comprise a respective first dimension or width $W_{2156}$, $W_{2158}$ and a second dimension or depth $D_{2156}$, $D_{2158}$, with the widths $W_{2156}$, $W_{2158}$ being substantially equal to each other and the depths $D_{2156}$, $D_{2158}$ being substantially equal to each other. The middle section 2170 of the first coupling bar 2152 comprises a width $W_{2170}$ and a depth $D_{2170}$, in which one or both of the width $W_{2170}$ and the depth $D_{2170}$ of the middle section 2170 are reduced or decreased, as compared to the corresponding width $W_{2156}$, $W_{2158}$ and/or depth $D_{2156}$, $D_{2158}$ of the upper and lower sections 2156, 2158. In the example shown in FIG. 21, the middle section 2170 comprises a pair of upper curved surfaces 2170A, a pair of lower curved surfaces 2170B, and a pair of substantially planar middle surfaces 2170C (only one of each of the upper and lower curved surfaces 2170A, 2170B and the substantially planar middle surface 2170C is labeled), in which the upper and lower curved surfaces 2170A, 2170B curve continuously inward toward the substantially planar middle surfaces 2170C.

In examples, the first and second coupling bars 2152, 2154 may be formed from steel, have upper and lower sections 2156, 2158 each comprising a respective width $W_{2156}$, $W_{2158}$ from 1⅜ inch to 2.0 inches, and a respective depth $D_{2156}$, $D_{2158}$ from ½ inch to 2.5 inches, middle sections 2170, 2172 each comprising a respective width $W_{2170}$ from ¼ inch to ¾ inch and a respective depth $D_{2170}$ from ½ inch to 2.5 inches.

As shown in FIG. 19, the upper, lower, and middle sections 2160, 2162, 2172 of the second coupling bar 2154 likewise each comprise a respective width $W_{2160}$, $W_{2162}$, $W_{2172}$ and depth $D_{2160}$, $D_{2162}$, $D_{2172}$, in which the widths $W_{2160}$, $W_{2162}$ of the upper and lower sections 2160, 2162 are substantially equal to each other; the depths $D_{2160}$, $D_{2162}$ of the upper and lower sections 2160, 2162 are substantially equal to each other; and one or both of the width $W_{2172}$ and the depth $D_{2172}$ of the middle section 2172 are reduced or decreased, as compared to the corresponding width $W_{2160}$, $W_{2162}$ and/or depth $D_{2160}$, $D_{2162}$ of the upper and lower sections 2160, 2162.

The main body 1106 comprises a plurality of apertures 2107 formed in the sides thereof, as shown in FIG. 19. In the example shown, a right side of the main body 1106 comprises two apertures 2107. Although not visible, a left side of the main body 1106 also comprises two apertures. The lower sections 2158, 2162 of the first and second coupling bars 2152, 2154 each comprise a plurality of corresponding threaded apertures 2158-1, 2162-1 extending through the depth $D_{2158}$, $D_{2162}$ of the respective lower sections 2158, 2162. The first and second coupling bars 2152, 2154 may be configured, i.e., sized and shaped, to fit and be received inside the main body 1106 of the base mount 1102. To secure the adapter 2150, specifically the first and second coupling bars 2152, 2154 of the adapter 2150, to the main body 1106 of the base mount 1102, the lower section 2158, 2162 of each of the first and second coupling bars 2152, 2154 may be inserted into the base mount 1102 so that the lower sections 2158, 2162 are received in the main body 1106 and the apertures 2158-1, 2162-1 formed in the lower sections 2158, 2162 of the first and second coupling bars 2152, 2154 are aligned with the apertures 2107 formed in the main body 1106, as shown in FIG. 19. Fasteners 2104 extend through the apertures 2107 formed in the right side of the main body 1106 and are received in the apertures 2162-1 formed in the lower section 2162 of the second coupling bar 2154. Fasteners 2104 similarly extend through the apertures (not visible) formed in the left side of the main body 1106 and are received in the apertures 2158-1 formed in the lower section 2158 of the first coupling bar 2152. Washers (not labeled) may be positioned between the fasteners 2104 and the main body 1106. When the first and second coupling bars 2152, 2154 are installed in the main body 1106 of the base mount 1102, the upper sections 2156, 2160 and the middle sections 2170, 2172 extend above the main body 1106, as shown in FIGS. 19 and 20.

The upper boom portion 1104 may be coupled to the adapter 2150. As shown in FIGS. 1B and 20, the upper boom portion 1104 may comprise a first section 1104A and a second section 1104B. A connector 2164 provides a transition between the generally rectangular cross-section of the main body 1106 to the generally circular cross-section of the upper boom portion 1104. The connector 1164 shown in FIG. 20, which may be substantially similar to the connector 1164 shown in FIG. 15, may be positioned between the adapter 2150 and the upper boom portion 1104 and comprises a lower element 1166 having a cross-sectional shape (i.e., generally rectangular) and dimensions that mirror the cross-sectional shape and dimensions of the main body 1106 of the base mount 1102. The lower element 1166 is coupled, e.g., via welding, to a lower surface (not visible) of an adapter plate 1168, and the first section 1104A of the upper boom portion 1104 is coupled, e.g., via welding, to an upper surface 1168-1 of the adapter plate 1168 opposite the lower surface. Gussets 1174 may be coupled, e.g., via welding, to the first section 1104A of the upper boom portion 1104 and may be further coupled, e.g., via welding, to the upper surface 1168-1 of the adapter plate 1168.

Figure 20:
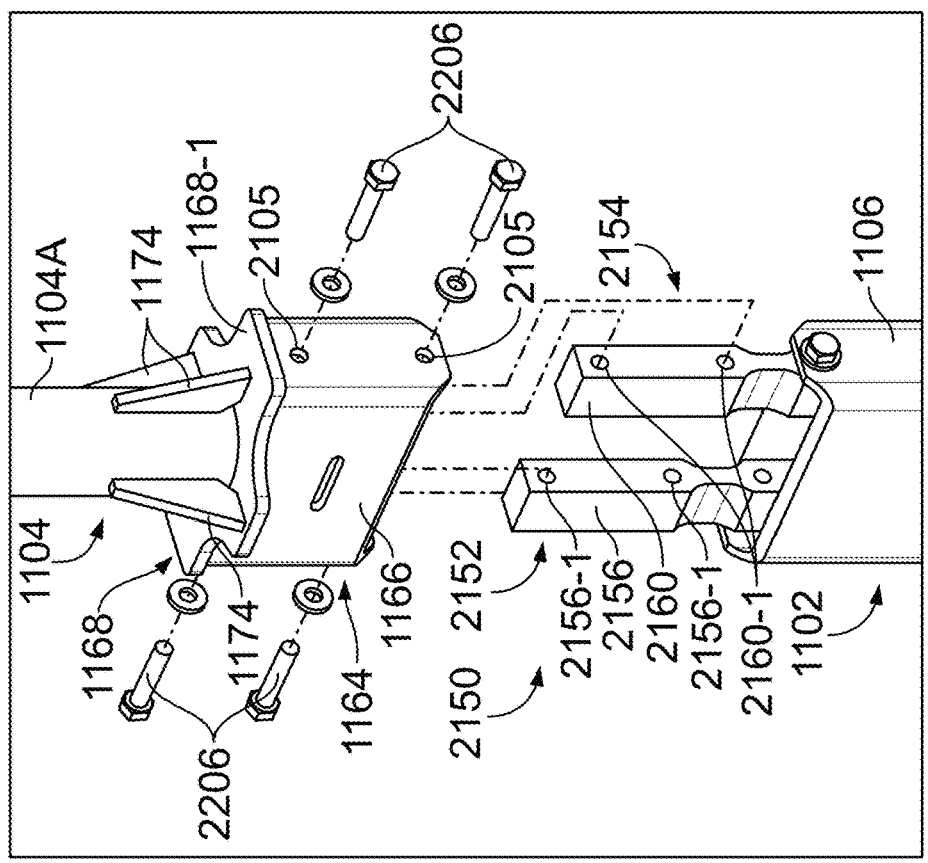

With continued reference to FIG. 20, the lower element 1166 of the connector 1164 comprises a plurality of apertures 2105 formed in the sides thereof. In the example shown, a right side of the lower element 1166 comprises two apertures 2105. Although not visible, a left side of the lower element 1166 also comprises two apertures. The upper sections 2156, 2160 of the first and second coupling bars 2152, 2154 each comprise a plurality of corresponding threaded apertures 2156-1, 2160-1 extending through the depth $D_{2156}$, $D_{2160}$ (not labeled in FIG. 20; see FIG. 19) of the respective upper sections 2156, 2160. The first and second coupling bars 2152, 2154 may be configured, i.e., sized and shaped, to fit and be received inside the lower element 1166 of the connector 1164. To secure the upper boom portion 1104 to the adapter 2150, specifically to the first and second coupling bars 2152, 2154 of the adapter 2150, the lower element 1166 of the connector 1164 may be placed over the upper sections 2156, 2160 of the first and second coupling bars 2152, 2154 and positioned so that the upper sections 2156, 2160 are received in the lower element 1166 and the apertures 2156-1, 2160-1 formed in the first and second coupling bars 2152, 2154 are aligned with the apertures 2105 formed in the lower element 1166. Fasteners 2206 extend through the apertures 2105 formed in the right side of the lower element 1166 and are received in the apertures 2160-1 formed in the upper section 2160 of the second coupling bar 2154. Fasteners 2206 similarly extend through apertures (not visible) formed in the left side of the lower element 1166 and are received in the apertures 2156-1 formed in the upper section 2156 of the first coupling bar 2152. Washers (not labeled) may be positioned between the fasteners 2206 and the lower element 1166.

Figure 23:
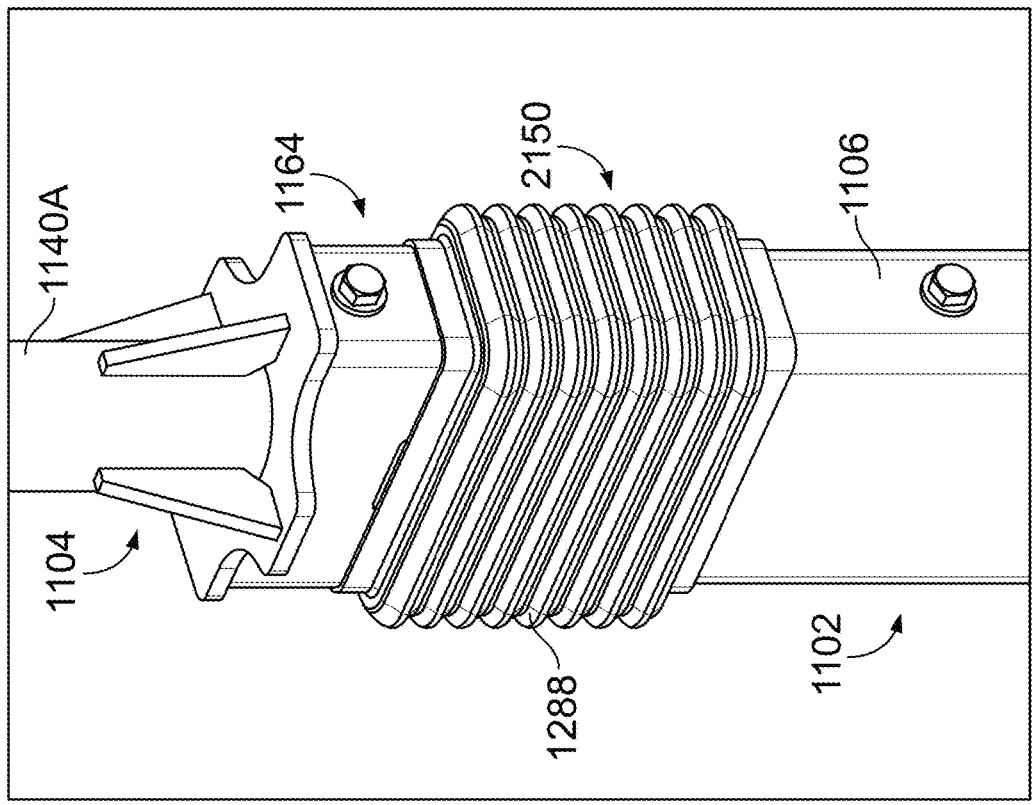
FIG. 23 is a detailed perspective view of the portion of the boom assembly and the adapter of FIG. 22, in which the adapter comprises a cover.
Figure 22:
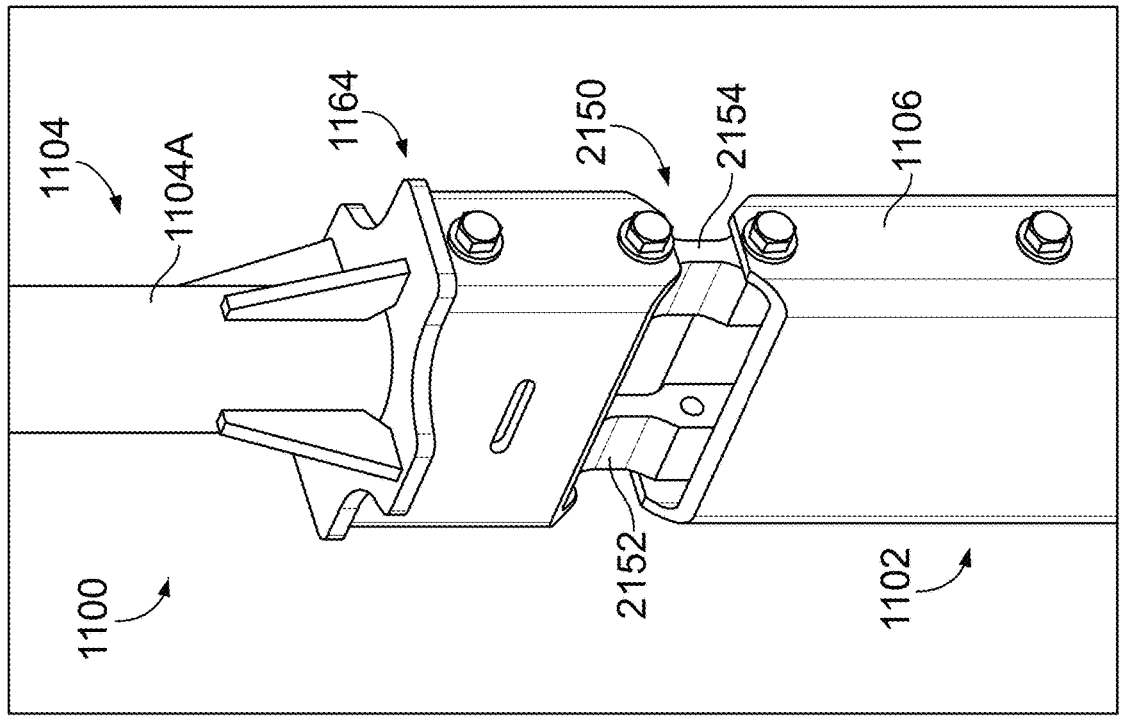
FIG. 22 is a detailed perspective view of the portion of the boom assembly and the adapter illustrated in FIGS. 19 and 20 following assembly.

In the example shown in FIGS. 1, 22, and 39, upon coupling of the upper boom portion 1104 to the adapter 1150 and when the adapter 2150 is in a normal operating position (i.e., prior to failure as described herein), the first and second coupling bars 2152, 2154 may extend generally vertically and may be generally parallel to the main body 1106 of the base mount 1102. As shown in FIGS. 1B and 23, a cover 1288 may optionally be placed over the adapter 2150 and may extend from the lower element 1166 of the connector 1164 to the main body 1106 of the base mount 1102 to cover the first and second coupling bars 2152, 2154.

Coupling of the Accessory to the Boom Assembly

Figure 24:
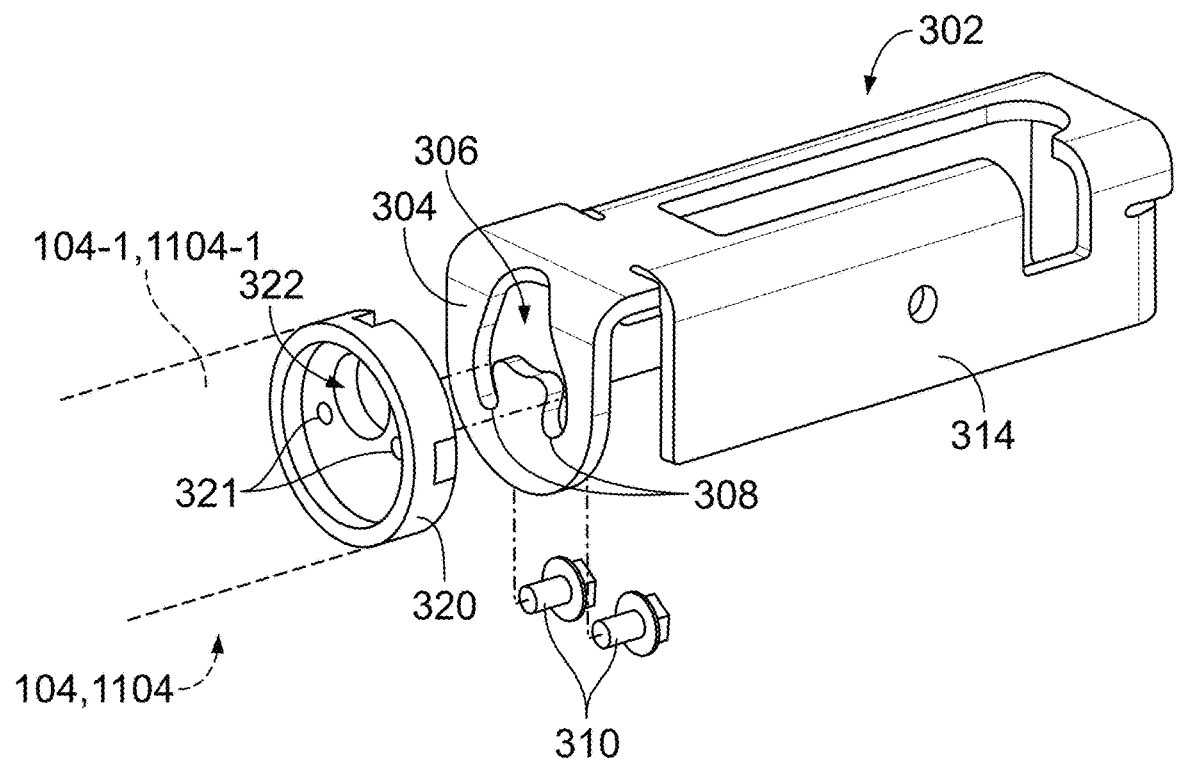
FIGS. 24 and 25 are partially exploded views of a distal end of an upper boom portion, an adapter bracket, and an accessory in accordance with the present disclosure.
Figure 25:
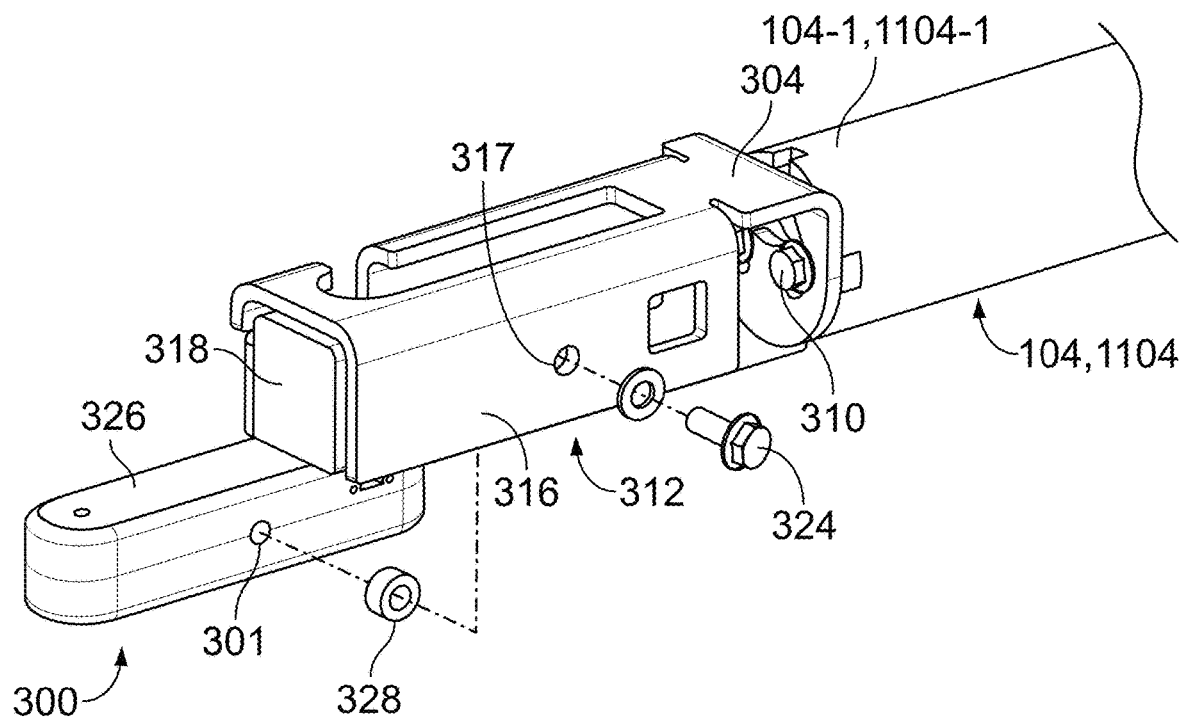

With reference to FIGS. 1A, 1B, 24, and 25, the accessory 300 may be coupled to a distal end 104-1, 1104-1 of the upper boom portion 104, 1104 prior to, or after, coupling of the upper boom portion 104, 1104 to the adapter 150, 1150, 2150. The accessory 300 may be coupled to the distal end 104-1, 1104-1 of the upper boom portion 104, 1104 via any suitable attachment or attaching means (not shown), such as an adapter bracket 302 as shown in FIGS. 24 and 25. The accessory 300 may also be coupled to the distal end 104-1, 1104-1 of the upper boom portion 104, 1104, e.g., via a threaded opening in the upper boom portion 104, 1104 that receives the accessory 300, etc. In some examples, the accessory 300 may be wireless and may comprise a battery or other power source. In other examples, wiring (not shown) may extend from the truck 10 through the boom assembly 100, 1100 to the accessory 300, e.g., to provide the accessory 300 with power and/or to send data to and receive data from the accessory 300.

In the example shown in FIGS. 24 and 25, the accessory 300 is coupled to the upper boom portion 104, 1104 via an adapter bracket 302 (an outline of the upper boom portion 104, 1104 is shown with dashed lines in FIG. 24 to illustrate internal components). The distal end 104-1, 1104-1 of the upper boom portion 104, 1104 may comprise a receiver 320 that is configured to secure the adapter bracket 302 to the upper boom portion 104, 1104. The adapter bracket 302 comprises a flange 304 that is seated against the receiver 320 when the adapter bracket 302 is installed. An opening 306 in the flange 304 includes slots 308 through which fasteners 310 extend and are received in threaded apertures 321 formed in the receiver 320. The receiver 320 may comprise an opening 322, such that any wiring (not shown) may extend from the truck 10 through the boom assembly 100, 1100 and through the openings 322, 306 to the accessory 300.

After the adapter bracket 302 is coupled to the distal end 104-1, 1104-1 of the upper boom portion 104, 1104, the accessory 300 may be coupled to the adapter bracket 302. The adapter bracket 302 comprises a compartment 312 that is defined by the flange 304, side walls 314, 316, and an end wall 318. One of the side walls 316 comprises an opening 317 through which a fastener 324 extends and is received in a threaded aperture 301 formed in a housing 326 of the accessory 300. A washer (not labeled) may be positioned between the fastener 324 and the side wall 316. A spacer 328 may be placed between the accessory 300 and an inner surface (not visible) of the side wall 316 to maintain a desired positioning of the accessory 300 within the compartment 312 and to prevent the accessory 300 from moving during operation. After the accessory 300 is coupled to the adapter bracket 302, the accessory 300 is received in the compartment 312, and the flange 304, side walls 314, 316, and end wall 318 at least partially enclose and protect the accessory 300.

As shown in FIG. 39, a length $L_1$ of the first section 104A, 1104A of the upper boom portion 104, 1104 and/or a length $L_3$ of the main body 106, 1106 of the base mount 102, 1102 may be adjusted or configured as desired to place the accessory 300 at a desired vertical distance $D_1$ above the forks 16 so that the accessory 300 may perform the desired functions without interfering with the operator or loading of items on the forks 16. A length $L_2$ of the second section 104B, 1104B of the upper boom portion 104, 1104 may also be adjusted or configured as desired to obtain a desired horizontal placement or positioning of the accessory 300, i.e., a distance $D_2$ between the operator's backrest 34 or the load backrest 20 and the accessory 300. In particular, the location of the main body 106, 1106 and the upper boom portion 104, 1104 and/or the length $L_2$ of the second section 104B, 1104B may be configured to position the accessory 300: (i) generally centered over the forks 16, (ii) laterally along axis c so as to be near or directly over one of the forks 16, and/or (iii) outside of the load handling/fork area. In some examples, the accessory 300 may be a camera. A pallet (not shown) may be placed on the forks 16, and the boom assembly 100, 1100 may position the camera above and over the forks 16 so that the camera may monitor and track items that are loaded onto the pallet. In other examples, the accessory 300 may be an image projecting device, and the boom assembly 100, 1100 may position the image projecting device above and over the forks 16 so that the device may project an image at a desired location on the forks 16 or a pallet placed on the forks 16. Although the structure depicted in FIG. 39 resembles the boom assembly 1100 of FIG. 1B, reference numerals for analogous components of the boom assembly 100 of FIG. 1A are included.

Calculation of a Modified Force $F_M$

Figure 40:
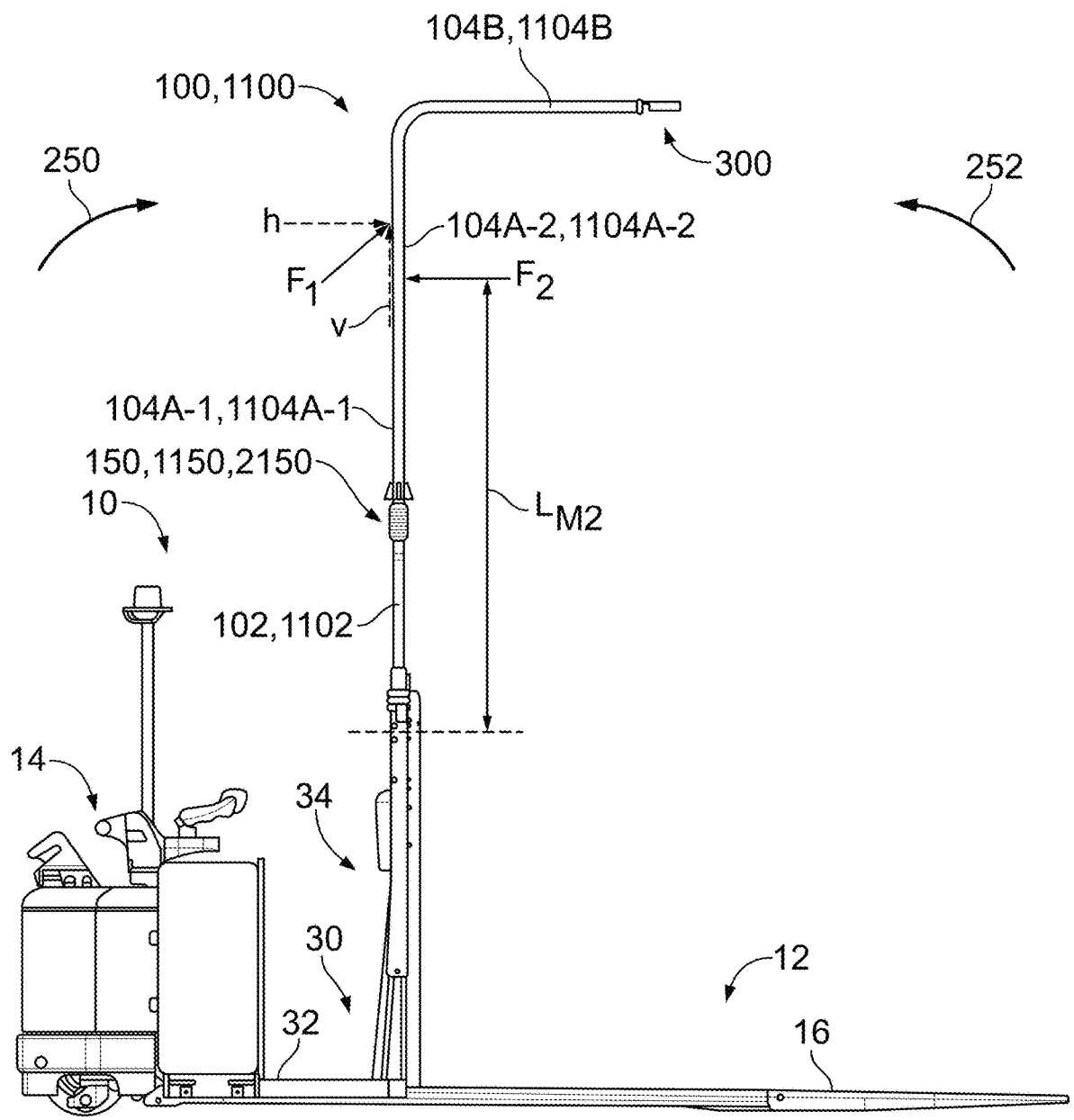

Because the boom assembly 100, 1100 as described herein may extend generally vertically above the operator's platform 32 and generally horizontally over the forks 16, the boom assembly 100, 1100 is subjected to a variety of standard application forces during normal operation of the truck 10, including acceleration, braking, turning, and loading/unloading. The boom assembly 100, 1100 may be subjected to additional forces, such as when the boom assembly 100, 1100 collides with an object (e.g., an overhead object, a falling object, etc. (not shown)) and/or the truck 10 collides with another object, such as another truck, a rack, etc. (not shown). As shown in FIG. 40, when the upper boom portion 104, 1104 collides with an object, the boom assembly 100, 1100 may be subjected to forces directly incident on the upper boom portion 104, 1104 at any angle, such as exemplary external force $F_1$ or force $F_2$. The external forces $F_1$, $F_2$ may have force components coincident or parallel with a horizontal axis h, a vertical axis v, and/or an out-of-plane axis c, which axes are shown in FIGS. 1A and 1B. Although the structure depicted in FIG. 40 resembles the boom assembly 1100 of FIG. 1B, reference numerals for analogous components of the boom assembly 100 of FIG. 1A are included.

With continued reference to FIG. 40, the external force $F_1$ may be caused by an object engaging/striking a first wall 104A-1, 1104A-1 of the first section 104A, 1104A of the upper boom portion 104, 1104, which first wall 104A-1, 1104A-1 faces away from the forks 16. The force $F_1$ may strike the first wall 104A-1, 1104A-1 at an angle, such that the force $F_1$ may have horizontal and vertical force components, as indicated by line h and line v, respectively. This force $F_1$ may cause the boom assembly 100, 1100 to bend in a bending direction 250 toward the forks 16 (also referred to herein as a first bending direction).

Figure 26:
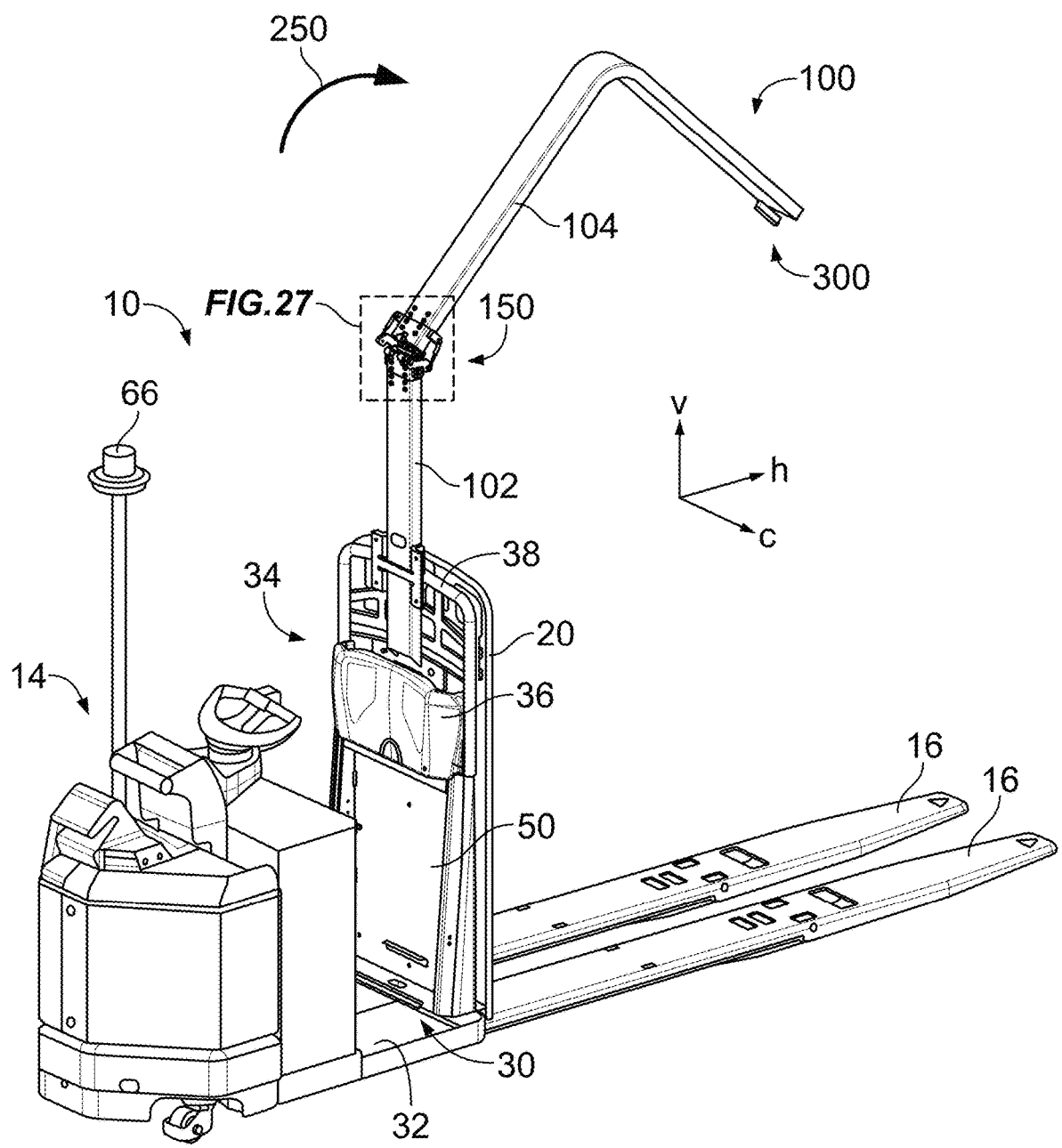
FIG. 26 is a perspective view of a materials handling vehicle comprising a boom assembly with the adapter of FIGS. 7-13 in a first shear state, in accordance with the present disclosure.

Alternatively, with continued reference to FIG. 40, the upper boom portion 104, 1104 may be subjected to a different external force, such as the force $F_2$, caused by an object acting on a second wall 104A-2, 1104A-2 of the first section 104A, 1104A of the upper boom portion 104, 1104, which second wall 104A-2, 1104A-2 faces toward the forks 16, and/or acting on the adapter bracket 302, e.g., on the end wall 318 (see FIG. 26) of the adapter bracket 302 that extends substantially parallel to the second wall 104A-2, 1104A-2. The force $F_2$ may comprise a normal force acting on the second wall 104A-2, 1104A-2 of the first section 104A, 1104A of the upper boom portion 104, 1104 or on the adapter bracket 302. This force $F_2$ may cause the boom assembly 100, 1100 to bend in a bending direction 252 toward the power unit 14 (also referred to herein as a second direction).

Without the adapter 150, 1150, 2150 in accordance with the present disclosure, these external forces $F_1$ or $F_2$ may generate stresses on the boom assembly 100, 1100, the operator's backrest 34, and other components of the truck 10 that may cause damage or failure in structural integrity, such as permanent deformation, cracking, shearing, or other type(s) of failure. As shown in FIGS. 1A, 1, and 40, the adapter 150, 1150, 2150 is configured to maintain the boom assembly 100, 1100 in a normal (e.g., upright) operating position when the upper boom portion 104, 1104 is subjected to standard application forces during normal operation of the truck 10, i.e., when the upper boom portion 104, 1104 is subjected to one or more external forces causing one or more internal forces or stresses in the adapter 150, 1150, 2150, or at least one coupling member thereof, that are below the yield force threshold or the yield stress threshold of the adapter 150, 1150, 2150 or at least one coupling member thereof. In other words, the adapter 150, 1150, 2150 is configured to maintain the boom assembly 100, 1100 in the normal operating position when the upper boom portion 104, 1104 is subjected to one or more external forces insufficient to cause the adapter 150, 1150, 2150 to yield. The adapter 150, 1150, 2150 is further configured to yield or fail in a controlled manner, as shown in FIGS. 26-38, when the upper boom portion 104, 1104 is subjected to one or more external forces causing one or more internal forces or stresses in the adapter 150, 1150, 2150, or at least one coupling member thereof, equal to, or in excess of, the yield force threshold or the yield stress threshold of the adapter 150, 1150, 2150 or at least one coupling member thereof. In other words, the adapter 150, 1150, 2150 is configured to yield when the upper boom portion 104, 1104 is subjected to one or more external forces sufficient to cause the adapter 150, 1150, 2150 to yield, such that the upper boom portion 104, 1104 moves to a deformed position relative to the base mount 102, 1102, as described herein. The yield force threshold or the yield stress threshold of the adapter 150, 1150, 2150 or at least one coupling member thereof may be designed so that the adapter 150, 1150, 2150 or coupling member yields or fails before one or more external forces applied to the upper boom portion 104, 1104 cause stresses in the operator's backrest 34 sufficient to result in damage or failure in the structural integrity of the operator's backrest 34. Hence, the yield force threshold or the yield stress threshold of the adapter 150, 1150, 2150 or at least one coupling member thereof may be designed so that the adapter 150, 1150, 2150 yields or fails before the one or more external forces applied to the upper boom portion 104, 1104 cause an element or component of the truck 10, i.e., the operator's backrest 34, to which the boom assembly 100 is coupled, to fail. The boom assembly 100 is considered to comprise the structure, e.g., first and second brackets 116A, 116B and the first and second flanges 108A, 108B, for coupling the base mount 102, 1102 to the truck 10.

With reference to FIG. 40, when a force, such as exemplary force $F_2$, acts on the second wall 104A-2, 1104A-2, a moment $M_2$ of the force $F_2$ equals a magnitude of the force $F_2$ (i.e., its component parallel to the horizontal axis h; see FIG. 1) times a length $L_{M2}$ extending from where the force $F_2$ impacts or is applied to the second wall 104A-2, 1104A-2 to a location anywhere on the operator's backrest 34 (as the base mount 102, 1102 is coupled to the operator's backrest 34), such as where the first and second flanges 108A, 108B (not visible in FIG. 40; see FIG. 2) are coupled to the operator's backrest 34. The operator's backrest 34 will experience substantial bending stress from the moment $M_2$. A geometry of, and material used for, the main body 106, 1106 of the base mount 102, 1102 and upper boom portion 104, 1104 are generally selected so that the main body 106, 1106 and the upper boom portion 104, 1104 have a high section modulus to withstand impact forces. Hence, when a force, such as force $F_2$, acts on the boom assembly 100, 1100, stresses on the boom assembly 100, 1100 and the operator's backrest 34 resulting from the force $F_2$ and its corresponding moment $M_2$ are more likely to cause damage to the structural integrity of the operator's backrest 34 than the boom assembly 100, 1100. Accordingly, a yield force or yield stress threshold for failure of the operator's backrest 34 will be determined, which may be used to determine a yield force threshold for the each of the first and second pins 180, 182 (see FIG. 7) and a yield stress threshold for each of the coupling plates 1152, 1154 (see FIG. 16) or coupling bars 2152, 2154 (see FIG. 22).

Figure 41:
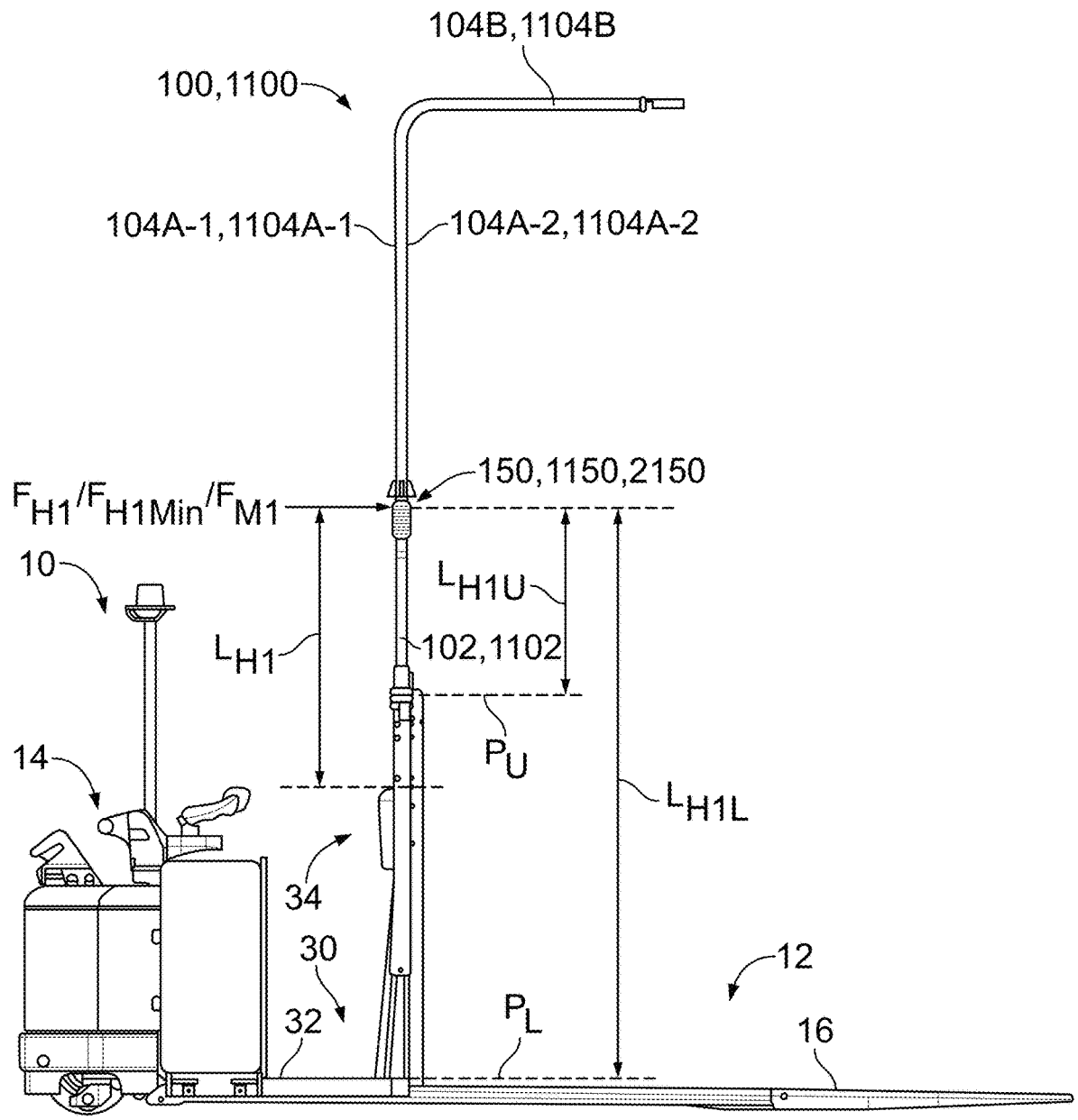

With reference to FIG. 41, in all examples of the adapter 150, 1150, 2150, it may be presumed that a force $F_{H1}$ is applied at a height above the forks 16 and the operator's platform 32, which height is slightly above an operator height $H_2$ for a 95$^{th}$ percentile adult male, see FIG. 39. An internal moment $M_{H1}$ from the force $F_{H1}$ is developed within the operator's backrest 34, which equals a magnitude of the force $F_{H1}$ (i.e., its component parallel to the horizontal axis h) times a length $L_{H1}$ extending from where the force $F_{H1}$ impacts or is applied to the upper boom portion 104, 1104 to a given location on the operator's backrest 34, which given location on the operator's backrest 34 may extend from a lowermost point $P_L$ on the operator's backrest 34 to an uppermost point $P_U$ on the operator's backrest 34, see FIG. 41.

A bending stress at the operator's backrest 34 resulting from moment $M_{H1}$ is given by the following Equation (1):

$$\sigma = M_{H1}/Z$$

where σ=bending stress;
$M_{H1}$=moment; and
Z=section modulus based on a geometry of the operator's backrest 34.

Equation (1) may be solved for various values of moment $M_{H1i}$, in which i=1 ... n, in which each moment $M_{H1i}$ has a corresponding moment arm defined by a length $L_{H1i}$, in which i=1 ... n, in which $L_{H1i}$ may be any length extending from where the force $F_{H1}$ impacts or is applied to the upper boom portion 104, 1104 to an end point at or between the lowermost point $P_L$ of the operator's backrest 34 (illustrated as $L_{H1L}$ in FIG. 41) and the uppermost point $P_U$ of the operator's backrest 34 (illustrated as $L_{H1U}$ in FIG. 41). Bending stress a may be set equal to a yield strength of the material from which the operator's backrest 34 is formed, such as a specific grade of steel from which the operator's backrest 34 is formed. Yield strengths for such materials are well known. The section modulus Z can be calculated from the geometry of the operator's backrest 34 and may vary with height depending on backrest geometry, as section modulus Z may change along a height of the operator's backrest 34, i.e., a section modulus Z calculated for a backrest horizontal plane taken at one point along the height of the operator's backrest 34 may vary from a section modulus Z calculated for a backrest horizontal plane taken at a different point along the height of the operator's backrest 34. That is, the section modulus Z may have one value when the moment arm defined by the length $L_{H1L}$ has an end point positioned at the lowermost point $P_L$ of the operator's backrest 34, as the cross-section of the geometry at the lowermost point $P_L$ of the operator's backrest 34 will be used when calculating the section modulus Z, and the section modulus Z may have another value when the moment arm defined by the length $L_{H1U}$ has an end point positioned at the uppermost point $P_U$ of the operator's backrest 34, as the cross-section of the geometry at the uppermost point $P_U$ of the operator's backrest 34 will be used when calculating the section modulus Z, which may differ from the cross-section taken at the lowermost point $P_L$ of the operator's backrest 34. Setting the bending stress a equal to the yield strength of the material from which the operator's backrest 34 is formed allows a moment $M_{H1}i$ at each determined section modulus Z to be calculated that would result in the structural integrity of the operator's backrest 34 being damaged, see Equation (1) above. Each section modulus Z may be located at a different height along the operator's backrest 34 such that each calculated moment $M_{M1i}$ with a different, corresponding section modulus Z may have a different moment arm or length $L_{H1i}$. The yield strength also defines a yield stress threshold for the operator's backrest 34. In other words, the force $F_{H1}$ resulting in the moment $M_{H1}$ will create stresses in the operator's backrest 34 equal to the yield stress threshold for the operator's backrest 34, resulting in structural integrity damage to the operator's backrest 34.

The moment $M_{H1i}$ having the lowest value from all values of the moment $M_{H1i}$ calculated, which equals the smallest moment $M_{H1i}$ to cause damage to the operator's backrest 34, is designated as a minimum moment value $M_{H1Min}$. Once the minimum moment $M_{H1Min}$ is known, a magnitude of a corresponding force $F_{H1Min}$ may be determined, which force $F_{H1Min}$ is likely to cause structural integrity damage to the operator's backrest 34. The force $F_{H1Min}$ may be determined by dividing the moment $M_{H1Min}$ by a length corresponding to moment $M_{H1Min}$, e.g., the length corresponding to the section modulus Z corresponding to and from which moment $M_{H1Min}$ was determined. It is desirable to have each of the pins 180, 182 (see FIG. 3), the coupling plates 1152, 1154 (see FIGS. 4 and 5), or the bars 2152, 2154 (see FIG. 6) fail prior to structural integrity damage occurring at the operator's backrest 34. Hence, the force $F_{H1Min}$ may be multiplied by a safety factor, such as 0.5 or any other value desired to calculate a modified force $F_M$.

Failure of the Adapter Comprising Shear Pins

Figure 42:
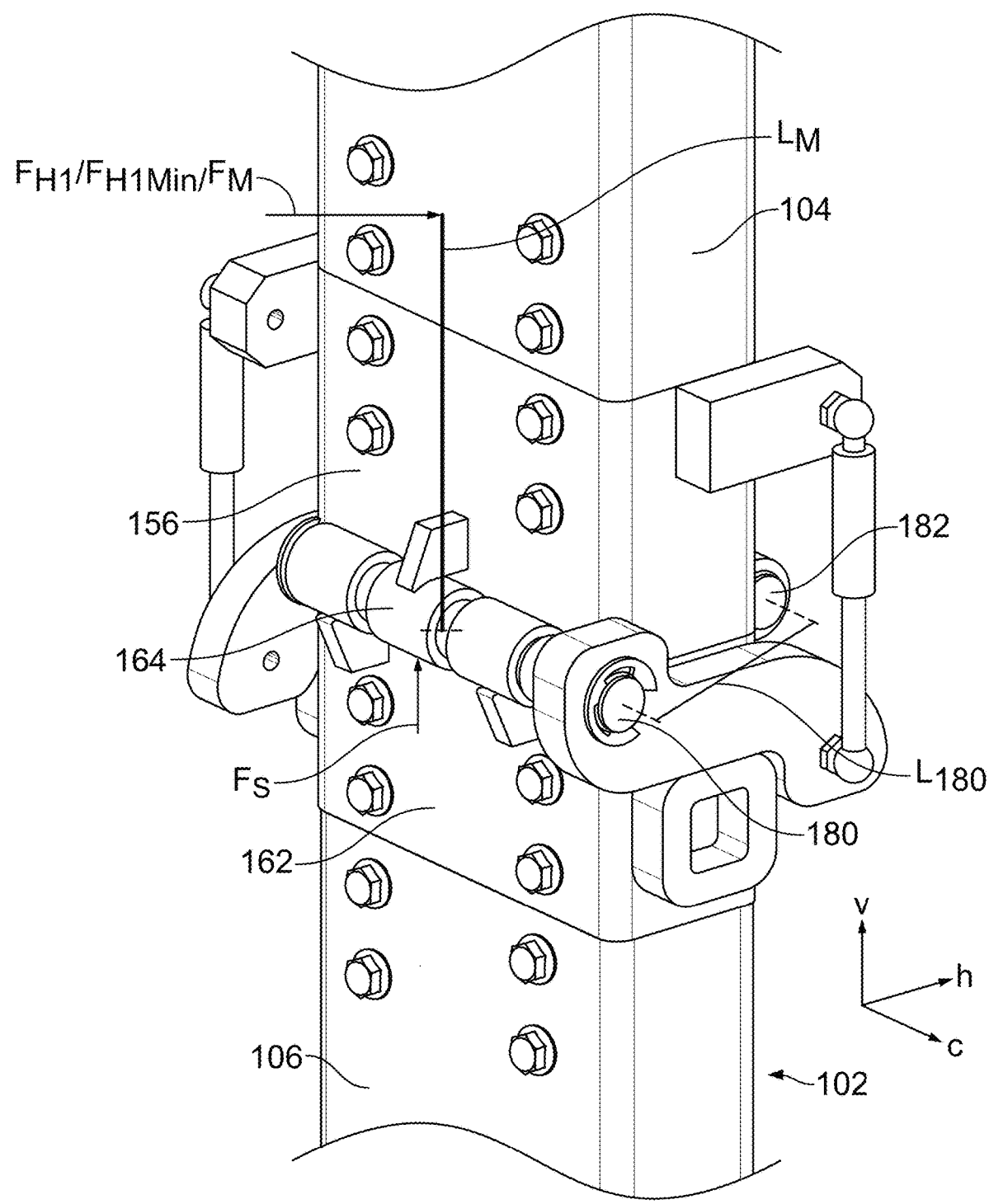
FIG. 42 is a perspective view of the adapter of FIGS. 7-13.

With reference to the adapter 150 illustrated in FIGS. 7-13, the force $F_{H1Min}$ is applied to a section of the upper boom portion 104 overlapping or overlying one of the upper engagement plates 154-1, as illustrated in FIGS. 41 and 42, which location where the force $F_{H1Min}$ is applied is spaced a distance from the first pin 180 equal to length $L_M$. Using the modified force $F_M$ instead of the force $F_{H1Min}$, a moment $M_{FM}$ of the modified force $F_M$ about the first pin 180 equals a magnitude of the modified force $F_M$ (i.e., its component parallel to the horizontal axis h) times the length $L_M$ extending from where the modified force $F_M$ impacts or is applied to the upper boom portion 104/upper engagement plate 154-1 to a location of the first pin 180. Application of the modified force $F_M$ causes an internal shear force $F_S$ to be applied by the hinge barrel 164 coupled to the upper support body 156 sufficient to shear the first pin 180. A moment $M_S$ of the shear force $F_S$ about the second pin 182 equals the magnitude of the shear force $F_S$ times a length $L_{180}$ extending from where the force $F_S$ impacts or is applied to the first pin 180 to a location of the second pin 182 about which the sheer force $F_S$ will rotate.

$M_{FM}$ and $M_S$ are set equal to one another, resulting in the following Equation (2):

$$F_S = (F_M * L_M)/L_{180}$$

Shear strength V for each of the first and second pins 180, 182 and a cross-sectional area $A_{PIN}$ for each of the first and second pins 180, 182 may be determined using the following Equation (3):

$$F_S = V * A_{PIN}$$

Values of shear strength V for various materials are well known. Various combinations of shear strength V and cross-sectional area $A_{PIN}$ for each of the first and second pins 180, 182 may be substituted into Equation (3). Shear force $F_S$ sufficient to shear the first or second pin 180, 182 is known from solving Equation (2) and is referred to herein as: (i) a shear force threshold for each of the first and second pins 180, 182; and (ii) the yield stress threshold for the adapter 150. Preferably, a large cross-sectional area $A_{PIN}$ is selected for the first and second pins 180, 182 to account for degrading effects of repeated application-induced stresses or fatigue at the first and second pins 180, 182. Hence, the shear force threshold for each of the first and second pin 180, 182 separately or the yield stress threshold for the adapter 150 is designed so that the first and second pins 180, 182 fail prior to structural integrity damage occurring at the operator's backrest 34.

It is further contemplated that the shear force threshold for each of the pins 180, 182 may be designed via experimentation using actual boom assemblies (e.g., by applying one or more external forces to actual boom assemblies to allow each of the pins 180, 182 to be designed so that each pin 180, 182 yields or fails prior to structural integrity damage occurring at the operator's backrest 34). Hence, the pins 180, 182 are designed so that when one or more external forces are applied to a boom assembly sufficient to cause internal stresses in each of the pins 180, 182 equal to or in excess of the yield stress threshold of each pin 180, 182, the pin 180, 182 fails prior to structural integrity damage occurring at the operator's backrest. The pins 180, 182 may also be designed via one or more suitable computer modelling techniques such that each of the pins 180, 182 fails prior to structural integrity damage occurring at the operator's backrest.

With reference to FIGS. 26-28 and 40, the upper boom portion 104 may be subjected to an external impact force, i.e., exemplary force $F_1$, at an angle to the first wall 104A-1 of the upper boom portion 104 and generally extending toward the forks 16. When a horizontal component of the external force $F_1$ (indicated by line h) creates one or more internal forces within the adapter 150 equal to or in excess of the yield force threshold of the adapter 150, the adapter 150 yields or fails, and the upper element 152 of the adapter 150, along with the upper boom portion 104 coupled thereto, are displaced toward the forks 16 (referred to herein as a first shear state). The yield force threshold of the adapter 150 may equal the shear force threshold for each of the first and second pins 180, 182.

As the upper element 152 begins to displace or bend due to the external force $F_1$ acting on the first wall 104A-1 of the upper boom portion 104, the hinge barrel 164 coupled to the upper support body 156 exerts an internal shear force on the first pin 180 due to the upper support body 156 bending or rotating with the upper boom portion 104. The first pin 180 may be a shear pin that is comprised of one or more materials and may have a structure/geometry, such that the first pin 180 (also referred to herein as a first shear pin) has a shear force threshold or yield force threshold, as discussed above. The first pin 180 may resist rotation of the upper element 152 in the first bending direction 250, and prior to breaking, the first pin 180 may absorb at least a portion of the energy resulting from the impact and displacement of the upper boom portion 104. When the upper boom portion 104 is subjected to the external force $F_1$ having a sufficient magnitude to cause one or more internal forces in the adapter 150 to equal or exceed the yield force threshold of the adapter 150, i.e., the external force $F_1$ on the upper boom portion 104 causes the hinge barrel 164 to create an internal shear force on the first pin 180 equal to or in excess of the shear force threshold or yield force threshold of the first pin 180, the first pin 180 is caused to break or be sheared apart and fail, as indicated by broken pin 180' in FIG. 27. The first pin 180 may break at a location(s) positioned adjacent to the hinge barrel 164. Thus, the first pin 180 fails before one or more external forces applied to the upper boom portion 104 cause damage to, or failure of, the structural integrity of the operator's backrest 34.

As shown in FIGS. 27 and 28, after the first pin 180 breaks, the upper element 152 rotates relative to the lower element 158 about an axis $A_1$ of the second pin 182 in the first bending direction 250 toward the forks 16. The first gas spring 176 acts as a dampener and provides resistance to rotation of the upper element 152 in the first bending direction 250. As the first extension 156-1 rotates with the upper support body 156, the first arm 172 is held in place by (i) engagement between the linear section 172-1 and the first stop 186; and (ii) a remaining portion of the broken pin 180' in engagement with one of the hinge barrels 168 and the aperture of the first arm 172, causing the first gas spring 176 to be compressed between the first extension 156-1 and the first end 172-2 of the first arm 172. Fluid, such as a gas comprising air, within a cylinder (not labeled) of the first gas spring 176 resists the compression caused by a piston or ram moving into the cylinder, such that the first gas spring 176 absorbs at least a portion of the energy resulting from the impact and displacement of the upper boom portion 104. The first gas spring 176 helps to slow and eventually stop the motion of the upper boom portion 104 and helps to control deflection of the upper boom portion 104 when the boom assembly 100 enters the first shear state. The amount of resistance provided by the first gas spring 176 may be selected as desired depending upon the type, size, etc. of gas spring provided.

When the upper element 152 moves in the first bending direction 250, the second extension 156-2 also rotates with the upper support body 156, and the second arm 174 and the second gas spring 178 rotate freely about the axis $A_1$ of the second pin 182, in which the second pin 182 remains intact. As shown in FIG. 28, the linear section 174-1 of the second arm 174 disengages and moves away from the second stop 188. The adapter 150 is configured such that the upper boom portion 104 remains connected to the base mount 102 after the first pin 180 fails. In particular, the upper element 152, and the upper boom portion 104 coupled thereto, remain connected or attached to the lower element 158 via the second gas spring 178, the second arm 174, and the second pin 182 in engagement with the respective hinge barrels 166, 170 of the upper and lower support bodies 156, 162, thereby preventing or minimizing damage to the truck 10, the base mount 102 and the upper boom portion 104, the accessory 300, and/or adjacent personnel or objects.

Figure 29:
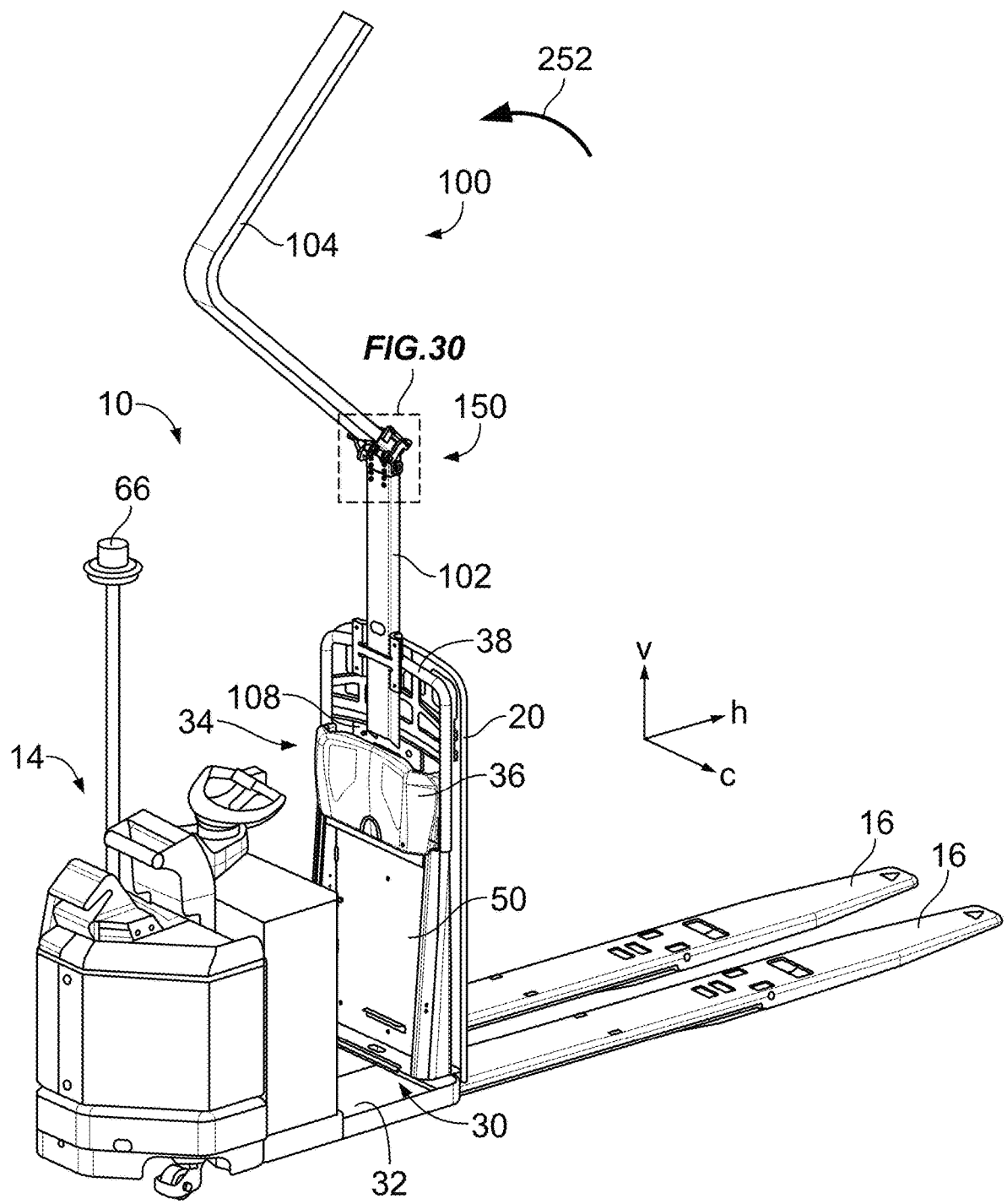
FIG. 29 is a perspective view of a materials handling vehicle comprising a boom assembly with the adapter of FIGS. 7-13 in a second shear state, in accordance with the present disclosure.

With reference to FIGS. 29, 30, and 40, the upper boom portion 104 may be subjected to an external impact force, i.e., exemplary force $F_2$, in a direction generally toward the power unit 14. When the force $F_2$ acting on the upper boom portion 104 creates one or more internal forces within the adapter 150 equal to or in excess of the yield force threshold of the adapter 150, the adapter 150 yields or fails, causing the upper element 152 of the adapter 150, along with the upper boom portion 104 coupled thereto, to be displaced toward the power unit 14 (referred to herein as a second shear state).

As the upper element 152 begins to displace or bend due to the external force $F_2$, the hinge barrel 166 coupled to the upper support body 156 exerts an internal shear force on the second pin 182 due to the upper support body 156 bending or rotating with the upper boom portion 104. The second pin 182 may comprise a shear pin, and as described above with respect to the first pin 180 in FIGS. 27 and 28, the second pin 182 (also referred to herein as a second shear pin) may have a shear force threshold or yield force threshold, see Equations (2) and (3), determined by the one or more materials comprising the second pin 182 and/or a structure/geometry of the second pin 182. The second pin 182 may resist rotation of the upper element 152 in the second bending direction 252, and prior to breaking, the second pin 182 may absorb at least a portion of the energy resulting from the impact and displacement of the upper boom portion 104. When the upper boom portion 104 is subjected to the external force $F_2$ having a sufficient magnitude to cause one or more internal forces in the adapter 150 to equal or exceed the yield force threshold of the adapter 150, i.e., the external force $F_2$ acting on the upper boom portion 104 causes the hinge barrel 166 to create an internal shear force on the second pin 182 equal to or in excess of the shear force threshold or yield force threshold of the second pin 182, the second pin 182 is caused to break or be sheared apart and fail, as indicated by broken pin 182' in FIG. 30. The second pin 182 may break at a location(s) positioned adjacent to the hinge barrel 170. Thus, the second pin 182 fails before one or more external forces applied to the upper boom portion cause damage to, or failure of, the structural integrity of the operator's backrest 34.

After the second pin 182 breaks, the upper element 152 then rotates relative to the lower element 158 about an axis $A_2$ of the first pin 180 in the second bending direction 252 toward the power unit 14. As described above with respect to the first gas spring 176, the second gas spring 178 acts as a dampener and provides resistance to rotation of the upper element 152 in the second bending direction 252. As the second extension 156-2 rotates with the upper support body 156, the second arm 174 is held in place by (i) engagement between the linear section 174-1 and the second stop 188; and (ii) a remaining portion of the broken pin 182' in engagement with one of the hinge barrels 170 and the aperture of the second arm 174, causing the second gas spring 178 to be compressed between the second extension 156-2 and the first end 174-2 of the second arm 174. Fluid, such as a gas comprising air, within a cylinder (not labeled) of the first gas spring 176 resists the compression caused by a piston or ram moving into the cylinder, such that the second gas spring 178 absorbs at least a portion of the energy resulting from the impact and displacement of the upper boom portion 104. The second gas spring 178 helps to slow and eventually stop the motion of the upper boom portion 104 and helps to control deflection of the upper boom portion 104 of the boom assembly 100 when the boom assembly 100 enters the second shear state. The amount of resistance provided by the second gas spring 178 may be selected as desired depending upon the type, size, etc. of gas spring provided.

When the upper element 152 moves in the second bending direction 252, the first extension 156-1 also rotates with the upper support body 156, and the first arm 172 and the second gas spring 178 rotate freely about the axis $A_2$ of the first pin 180, in which the second pin 182 remains intact. As shown in FIG. 30, the linear section 172-1 of the first arm 172 disengages and moves away from the first stop 186. The adapter 150 is configured such that the upper boom portion 104 remains connected to the base mount 102 after the second pin 182 fails. In particular, the upper element 152, and the upper boom portion 104 coupled thereto, remain attached to the lower element 158 via the first gas spring 176, the first arm 172, and the first pin 180, thereby preventing or minimizing damage to the truck 10, the base mount 102 and upper boom portion 104, the accessory 300, and/or adjacent personnel or objects.

Failure of the Adapter Comprising Coupling Plate(s)

Figure 16:
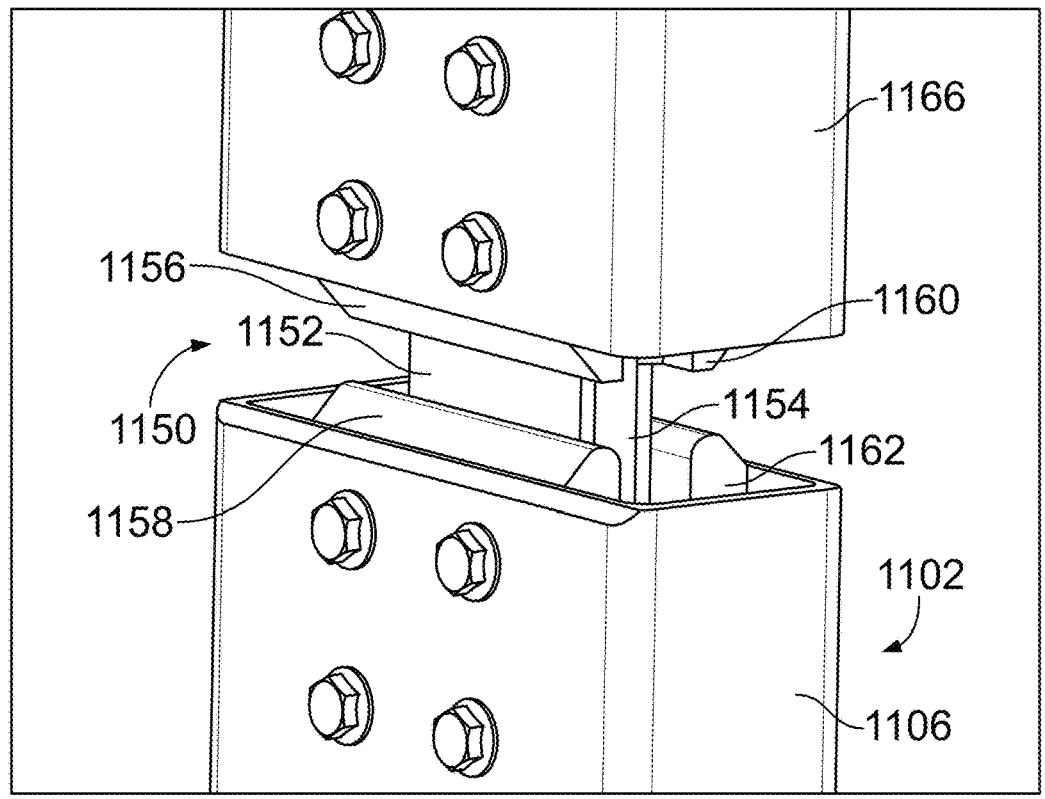
FIG. 16 is a detailed perspective view of the portion of the boom assembly and the adapter illustrated in FIGS. 14 and 15 following assembly.
Figure 17:
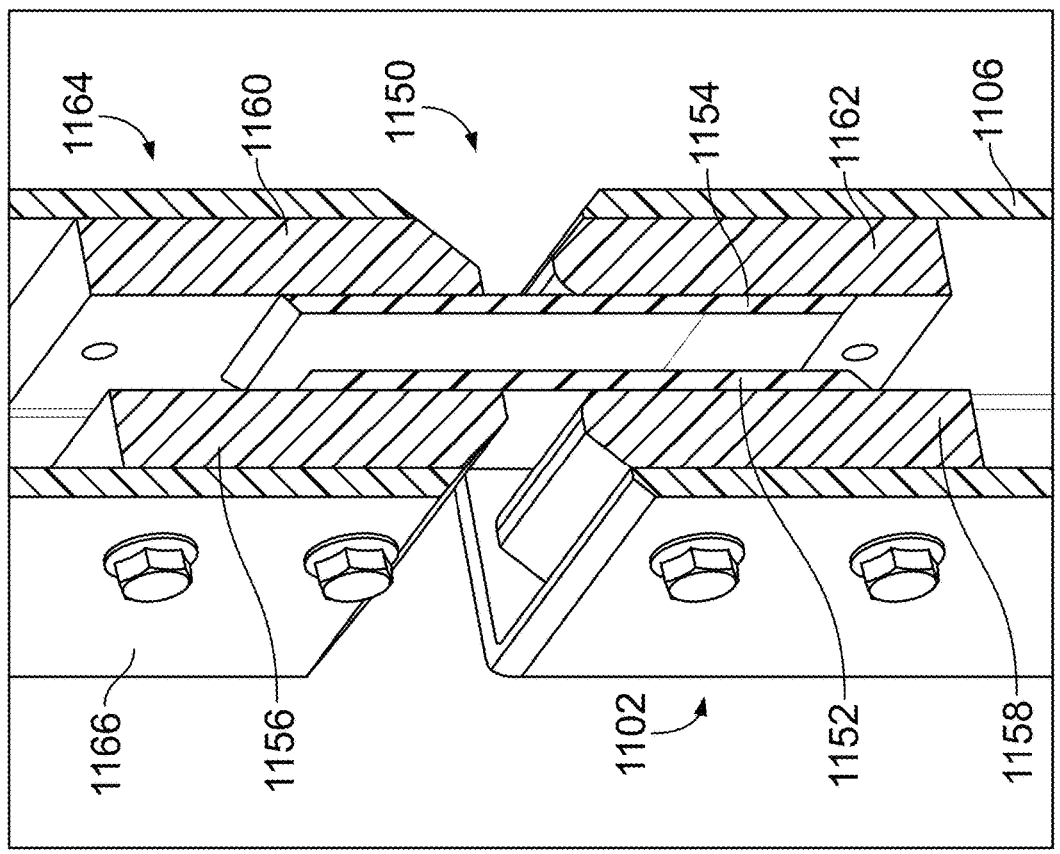
FIG. 17 is a cross-sectional view taken through a center of the adapter in FIG. 16.
Figure 43:
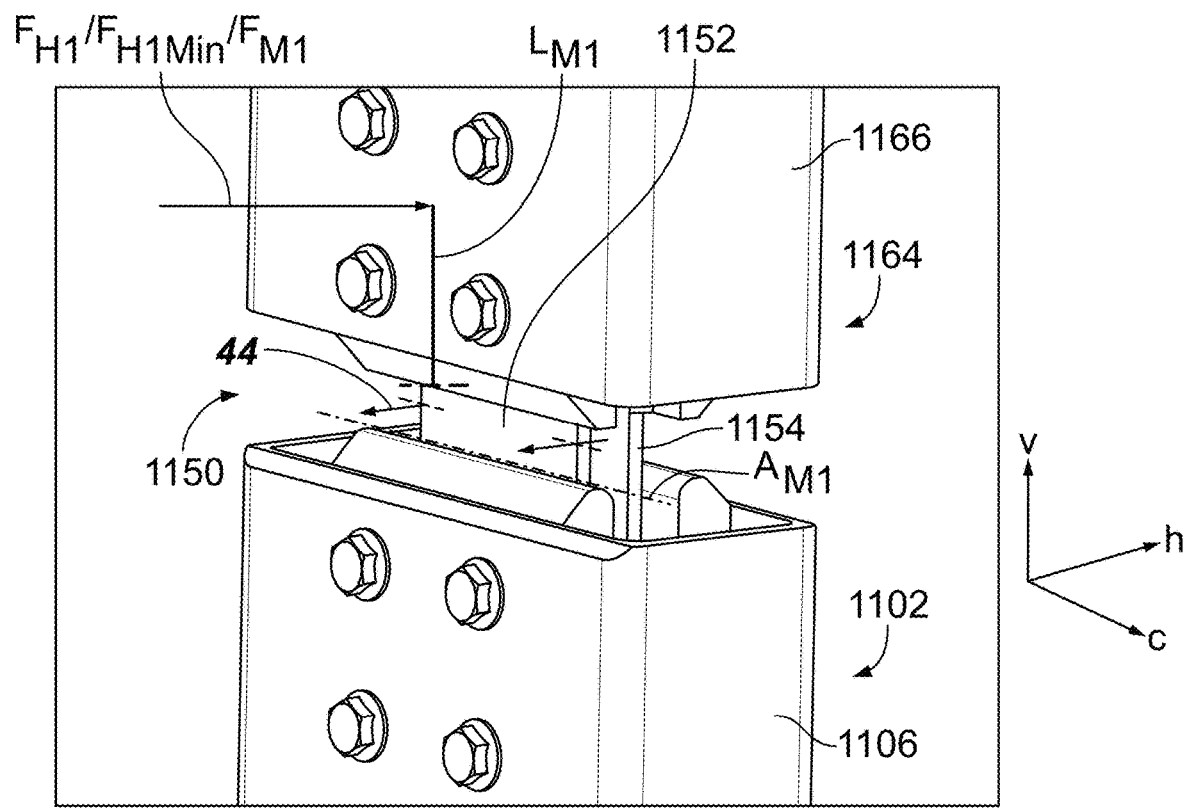
FIG. 43 is a perspective view of the adapter of FIG. 16.
Figure 45:
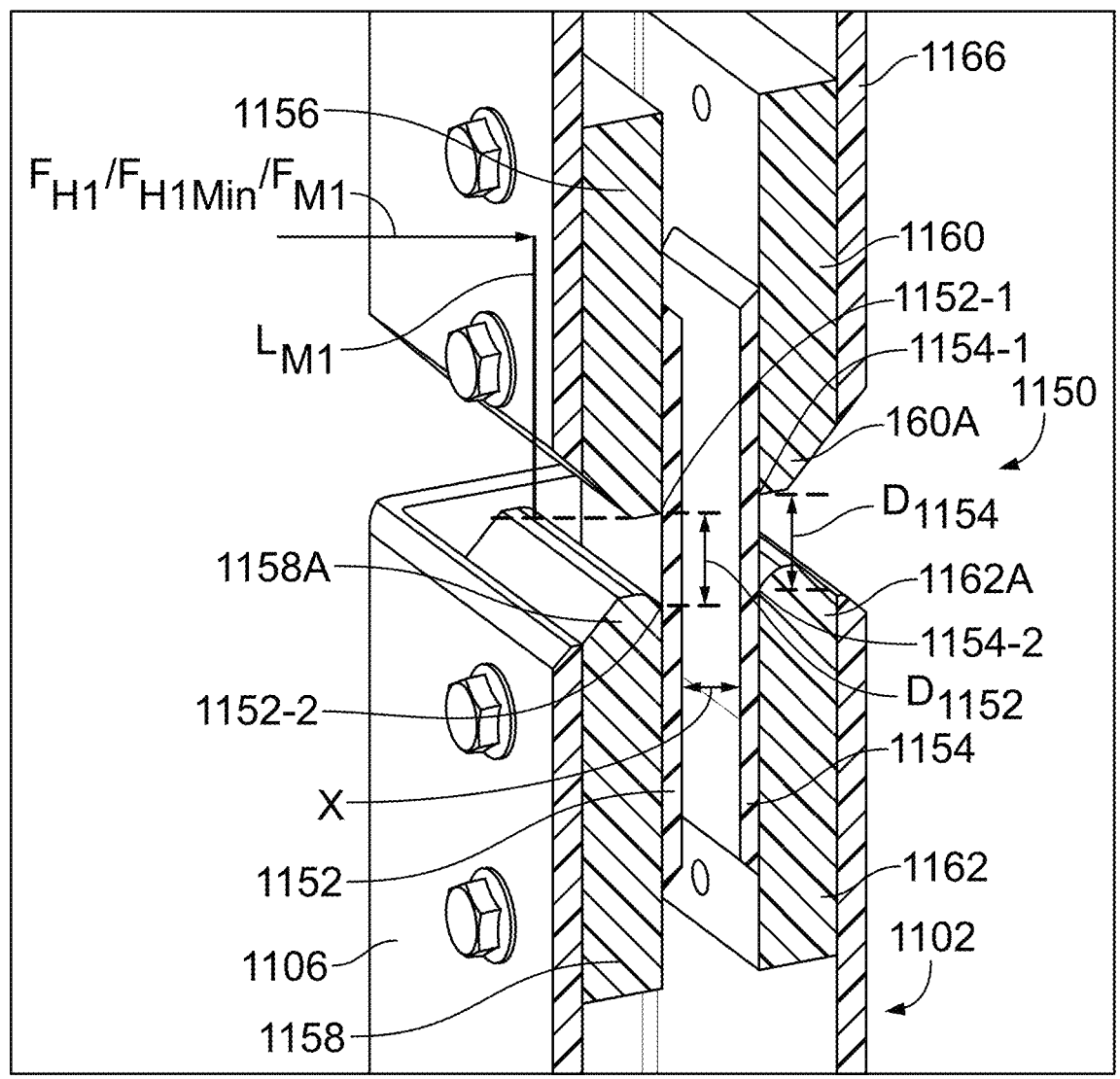
FIG. 45 is a cross-sectional view taken through a center of the adapter in FIG. 43.

With reference to the adapter 1150 illustrated in FIGS. 16 and 17, the force $F_{H1Min}$ may be applied to a section of the upper boom portion 1104, specifically to a section of the connector 1164, which location where the force $F_{H1Min}$ is applied is spaced a distance from a top of an unsupported coupling plate section, i.e., a respective location 1152-1, 1154-1 at which the first and second coupling plates 1152, 1154 extend beyond the first and second upper plate mounts 1156, 1160, which distance from where the force $F_{H1Min}$ is applied to the respective location 1152-1, 1154-1 is equal to length $L_{M1}$, as shown in FIGS. 41, 43, and 45. Using the modified force $F_{M1}$ instead of the force $F_{H1Min}$, a moment $M_{FM1}$ of the modified force $F_{M1}$ about an axis $A_{M1}$ at one of (or at a point midway between) the locations 1152-2, 1154-2, where the first and second coupling plates 1152, 1154 and upper end portions 1158A, 1162A of the first and second lower plate mounts 1158, 1162 meet equals a magnitude of the modified force $F_{M1}$ (i.e., its component parallel to the horizontal axis h) times the length $L_{M1}$ plus a length $D_{1152}$ or $D_{1154}$ extending from where the modified force $F_{M1}$ impacts or is applied to the upper boom portion 1104/connector 1164 to a location on one of (or at a point midway between) the locations 1152-2, 1154-2.

The moment $M_{FM1}$ corresponding to the modified force $F_{M1}$ may be expressed in the following Equation (4):

$$M_{FM1} = M_{local} + M_{global}$$

Where:

$$M_{local} = F_{M1} * D;$$

$$M_{global} = F_{M1} * L_{M1};$$

and

D is the length of an unsupported distance $D_{1152}$ of the first coupling plate 1152 between the first upper and lower plate mounts 1156, 1158 or the length of an unsupported distance $D_{1154}$ of the second coupling plate 1154 between the second upper and lower plate mounts 1160, 1162. Hence $D=D_{1152}$; $D=D_{1154}$; and $D_{1152}=D_{1154}$. Length D is selected so that the coupling plates 1152 and 1154 have sufficient length to bend without fracturing or cracking.

$L_{M1}$ is a lever arm distance from the impact force $F_{M1}$ to one of (or a point midway between) the locations 1152-1, 1154-1, where the first and second coupling plates 1152, 1154 and lower end portions 1156A, 1160A of the first and second upper plate mounts 1156, 1160 meet.

Total stresses $\sigma_{total}$ occurring within each one of the coupling plates 1152, 1154 when the modified force $F_{M1}$ impacts on the upper boom portion 1104/the connector 1164, may be calculated from the following Equation (5):

$$\sigma_{total} = \sigma_{axial\ couple} + \sigma_{local\ bending} + \sigma_{global\ bending}$$

Where:

$$\sigma_{axial\ couple} = \frac{F_{M1} * L_{M1} * (1 - DF)}{A_{plate} * x}$$

-continued $$\sigma_{local} = \frac{F_{m1} * D}{2 * Z}$$

$$\sigma_{global} = \frac{DF * F_{m1} * L_{m1}}{2 * Z}$$

X is a distance between the first and second coupling plates 1152, 1154 in a direction parallel to the h axis. Distance X is selected so that the first and second coupling plates 1152, 1154 do not contact during bending.

$L_{M1}$ is a lever arm distance from the impact force $F_{M1}$ to one of (or a point midway between) the locations 1152-1, 1154-1.

D is the length of an unsupported distance $D_{1152}$ of the first coupling plate 1152 between the first upper and lower plate mounts 1156, 1158 or the length of an unsupported distance $D_{1154}$ of the second coupling plate 1154 between the second upper and lower plate mounts 1160, 1162.

Figure 44:
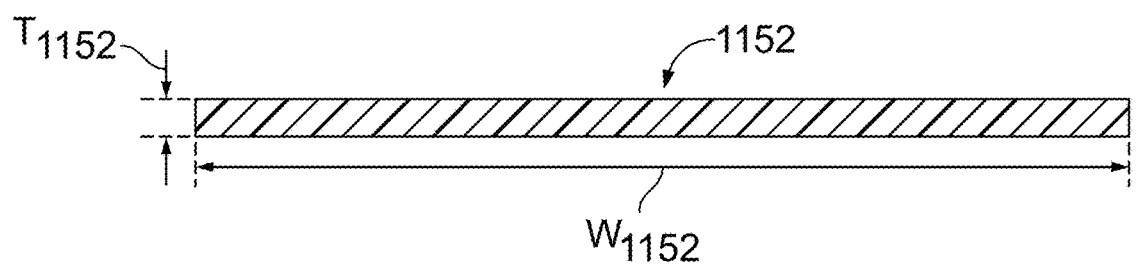
FIG. 44 is a cross-sectional view taken along line 44-44 in FIG. 43.

$A_{plate}$ is the cross-sectional area of each of the first and second coupling plates 1152, 1154, i.e., determined by multiplying a first dimension $T_{1152}$ times a second dimension $W_{1152}$, see FIG. 44, in which only the dimensions $T_{1152}$ and $W_{1152}$ are illustrated for the first coupling plate 1152. However, plate 1154, in the illustrated embodiment, has the same cross section and, hence, the same dimensions $T_{1152}$ and $W_{1152}$.

DF=moment distribution factor having a value between 0 and 1 and, in the illustrated embodiment, equals 0.5 since both coupling plates 1152, 1154 are identical.

Z=a section modulus for each of the coupling plates 1152, 1154, which can be determined based on the geometry of each plate 1152, 1154.

The total stresses $\sigma_{total}$ occurring within each one of the coupling plates 1152, 1154 when the modified force $F_{M1}$ impacts on the upper boom portion 1104/the connector 1164 may be set equal to a yield strength of the material from which each of the coupling plates 1152, 1154 is formed, such as a specific grade of steel. Yield strengths for such materials are well known. When the total stresses $\sigma_{total}$ occurring in each one of the coupling plates 1152, 1154 equals the yield strength $\sigma_{yield\ strength}$ of the material from which the coupling plate 1152, 1154 is formed, each coupling plate 1152, 1154 will fail or yield, i.e., permanently deform or bend. The yield strength $\sigma_{yield\ strength}$ of the material from which each coupling plate 1152, 1154 is formed is equal to a yield stress threshold for each plate 1152, 1154. Setting total stresses $\sigma_{total}$ equal to the yield strength $\sigma_{yield\ strength}$ of the material from which the coupling plate 1152, 1154 is formed may be expressed by the following Equation (6):

$$\sigma_{yield\ strength} = \sigma_{total} = F_{m1} * \left( \frac{L_{m1} * (1 - DF)}{A_{plate} * X} + \frac{(L_{M1} * DF + D)}{2 * Z} \right)$$

For rectangular coupling plates 1152, 1154, Z may be determined from the following Equation (7).

$$Z = \frac{T_{1152} * A_{plate}}{6}$$

As noted above, coupling plate 1154, in the illustrated embodiment, has the same cross section as coupling plate 1152 and, hence, the same dimensions $T_{1152}$ and $W_{1152}$. Accordingly, Equation (7) may also be used to determine Z for the coupling plate 1154. As noted above, length D is selected so that the coupling plates 1152, 1154 bend and do not fracture and distance X is selected so that the coupling plates 1152, 1154 do not contact during bending. As also noted above, the cross-sectional area $A_{plate}$ of each of the plates 1152, 1154 may be determined by multiplying the first dimension $T_{1152}$ times the second dimension $W_{1152}$. As the distance X increases, an overall stiffness of the coupling element (i.e., the first and second coupling plates 1152, 1154) increases, i.e., an amount of force necessary to bend the coupling plates 1152, 1154 increases. Hence, various combinations of the first dimension $T_{1152}$, the cross-sectional area $A_{plate}$ ($T_{1152}*W_{1152}$) for each coupling plate 1152, 1154, and the distance X may be substituted into Equations (6) and (7) and appropriate values for the first and second dimensions $T_{1152}$ and $W_{1152}$ and, hence, the cross sectional area $A_{plate}$ and the distance X are selected. Preferably, the cross sectional area $A_{plate}$ is selected to be sufficiently large to minimize deflection of the upper boom portion 1104 and maximize resiliency to prevent fatigue of the first and second coupling plates 1152, 1154. Using Equations (6) and (7), each coupling plate 1152, 1154 is designed so that the coupling plate 1152, 1154 fails when the modified force $F_{M1}$ is applied to the upper boom portion 1104/the connector 1164 at the location illustrated in FIGS. 41, 43, and 45, or a moment is generated by a force F applied anywhere along the upper boom portion 1104 and having a moment arm extending to any location on the backrest 34, in which the moment generated by that force F is equal to or greater than the moment $M_{FM1}$. Hence, both coupling plates 1152, 1154 will fail or yield prior to structural integrity damage occurring at the operator's backrest 34.

Determining the modified force $F_{M1}$ and the corresponding moment $M_{FM1}$ may be found using finite element analysis methods so as to allow the first and second dimensions $T_{1152}$ and $W_{1152}$ and the cross sectional area $A_{plate}$ and the distance X to be calculated from Equations (4) and (5).

It is further contemplated that the yield stress threshold for each of the coupling plates 1152, 1154 may be designed via experimentation using actual boom assemblies (e.g., by applying one or more external forces to actual boom assemblies to allow each of the coupling plates 1152, 1154 to be designed so that each coupling plate 1152, 1154 yields or fails prior to structural integrity damage occurring at the operator's backrest 34). Hence, the coupling plates 1152, 1154 are designed so that when one or more external forces are applied to a boom assembly sufficient to cause internal stresses in each of the coupling plates 1152, 1154 equal to or in excess of the yield stress threshold of each coupling plate 1152, 1154, the coupling plate 1152, 1154 fails prior to structural integrity damage occurring at the operator's backrest. The coupling plates 1152, 1154 may also be designed via one or more suitable computer modelling techniques such that each of the coupling plates 1152, 1154 fails prior to structural integrity damage occurring at the operator's backrest or any other element of the truck 10.

Figure 31:
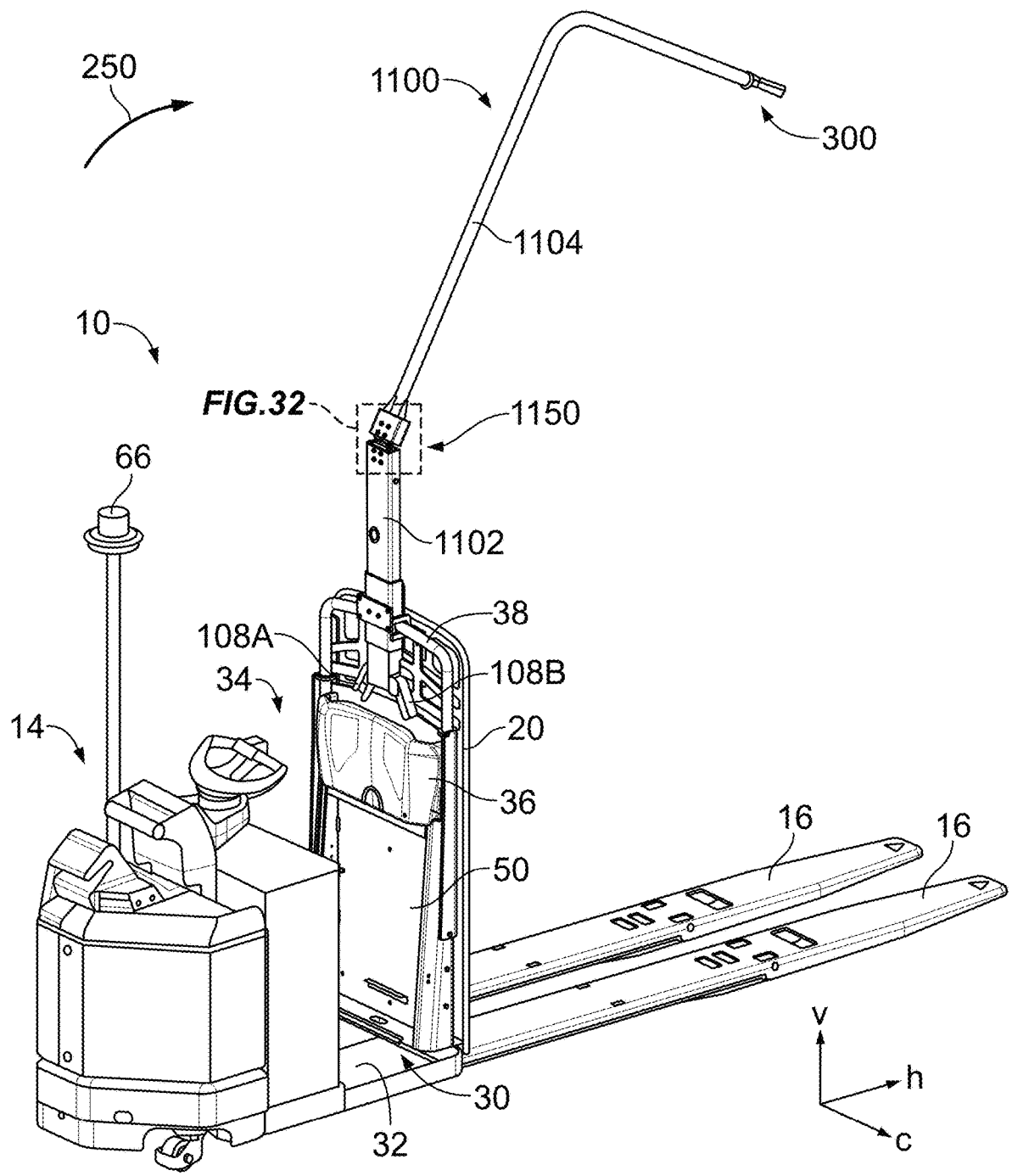
FIG. 31 is a perspective view of a materials handling vehicle comprising a boom assembly with the adapter of FIG. 16 in a first failed state, in accordance with the present disclosure.
Figure 32:
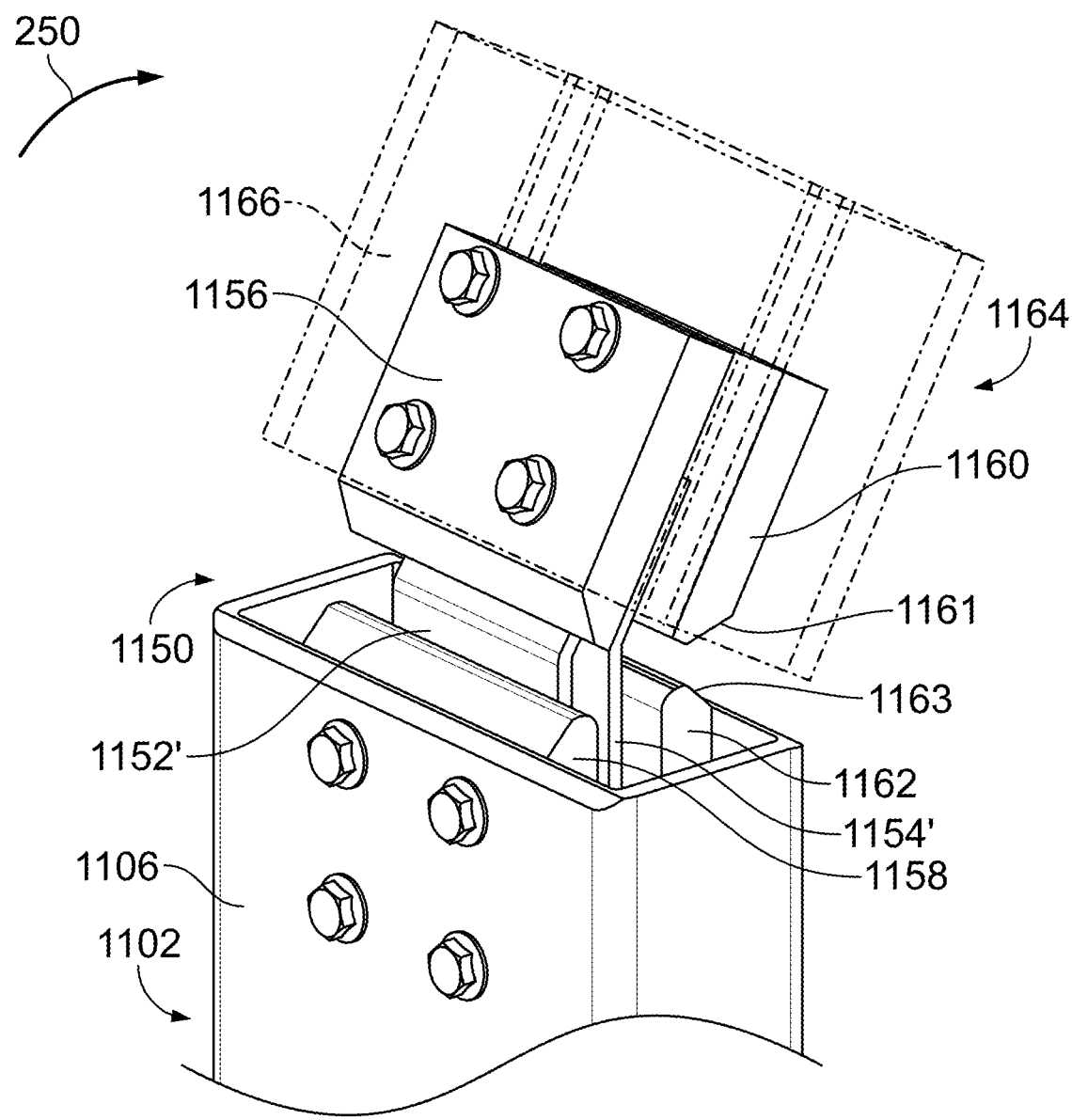
FIG. 32 is a detailed perspective view of the adapter of FIG. 31 and a portion of the boom assembly.

As shown in FIG. 40, the upper boom portion 1104 may be subjected to an external impact force, i.e., exemplary force $F_1$, at an angle to the first wall 1104A-1 of the upper boom portion 1104 and generally extending toward the forks 16. When a horizontal component of the external force $F_1$ (indicated by line h) acting on the first wall 1104A-1 of the upper boom portion 1104 creates internal stresses in the first and second coupling plates 1152, 1154, equal to or in excess of the yield stress threshold, i.e., the yield strength $\sigma_{yield\ strength}$ of the material from which each coupling plate 1152, 1154 is formed, the adapter 1150 yields or fails, and the connector 1164, along with the upper boom portion 1104 coupled thereto, are displaced toward the forks 16 (referred to herein as a first failed state), as shown in FIGS. 31 and 32. In other words, application of the external force $F_1$ to the upper boom portion 1104 causes displacement of the connector 1164 in the first bending direction 250, and when the magnitude of the external force $F_1$ is sufficient to cause internal stresses in each of the first and second coupling plates 1152, 1154 to equal or exceed the yield stress threshold of the first and second coupling plates 1152, 1154 (i.e., the external force $F_1$ on the upper boom portion 1104 causes the connector 1164 to create stresses in each of the first and second coupling plates 1152, 1154 equal to or in excess of a yield stress threshold of each first and second coupling plates 1152, 1154), the first and second coupling plates 1152, 1154 fail and begin to plastically deform, i.e., bend, in the first bending direction 250, as indicated by bent first and second coupling plates 1152', 1154' in FIG. 32. The first and second coupling plates 1152, 1154 bend about an axis (not shown) that is parallel to axis c (see FIG. 31).

A yield stress threshold of the adapter 1150 may equal the yield stress threshold for each of first and second coupling plates 1152, 1154, i.e., the yield strength $\sigma_{yield\ strength}$ of the material from which each coupling plate 1152, 1154 is formed. Failure and deformation of the first and second coupling plates 1152, 1154 allows the connector 1164, along with the upper boom portion 1104 coupled thereto, to rotate or be displaced in the first bending direction 250, i.e., toward the forks 16 (in FIG. 32, the upper boom portion 1104 is not shown (see FIG. 31) and the lower element 1166 of the connector 1164 is shown with dashed lines to illustrate the internal structure of the adapter 1150). The first and second coupling plates 1152, 1154 may be formed from the same material, e.g., a metal such as steel, and may have the same structure/geometry, such that the first and second coupling plates 1152, 1154 each have the same yield stress threshold. The first and second dimensions $T_{1152}$ and $W_{1152}$ and the cross sectional area $A_{plate}$ of each coupling plate 1152, 1154, the distance X and the material from which each of the coupling plates 1152, 1154 is formed, which material has a given yield strength $\sigma_{yield\ strength}$ defining the yield stress threshold of each of the first and second coupling plates 1152, 1154, may be selected, such that the first and second coupling plates 1152, 1154 fail or yield before the one or more external forces applied to the upper boom portion 1104 cause damage to, or failure of, the structural integrity of the operator's backrest 34. Thus, the first and second coupling plates 1152, 1154 act as a moment limiter for the operator's backrest 34 thereby ensuring that the coupling plates 1152, 1154 fail prior to the backrest 34.

In examples, each coupling plate 1152, 1154 may be formed from steel, have a first dimension $T_{1152}$ of from about ⅛ inch to about ⅜ inch, a second dimension $W_{1152}$ from about 2.0 inches to about 5.0 inches, a cross sectional area $A_{plate}$ from about ¼ inch² to about 1.875 inch², a distance X between the coupling plates 1152, 1154 from about 0.5 to about 2.0 inches, and a length D from about ⅜ inch to about 2.0 inches.

The first and second coupling plates 1152, 1154 may plastically deform to allow controlled movement of the upper boom portion 1104 to a final deformed angular position relative to the base mount 1102, as shown in FIGS. 31 and 32. The second upper and lower plate mounts 1160, 1162 provide a first stop that limits rotation of the connector 1164, and the upper boom portion 1104 coupled thereto, in the first bending direction 250. The connector 1164 is depicted in FIGS. 31 and 32 as having rotated by about 45 degrees from a normal operating position with respect to the main body 1106 of the base mount 1102. A lower surface of the second upper plate mount 1160 may comprise a chamfered edge 1161, and an upper surface of the second lower plate mount 1162 may comprise a corresponding chamfered edge 1163. If the connector 1164 continues rotating in the first bending direction 250 beyond about 45 degrees, the chamfered edge 1161 of the second upper plate mount 1160 engages the chamfered edge 1163 of the second lower plate mount 1162, with engagement between the chamfered edges 1161, 1163 acting as the first stop to halt rotation of the connector 1164 beyond about 90 degrees. The first and second coupling plates 1152, 1154 may also be used with the base mount 1102 and upper boom portion 1104 described in detail with respect to FIGS. 36 and 38, in which a portion of the base mount 1102 and the upper boom portion 1104 form first and second stops.

The first and second coupling plates 1152, 1154 may resist rotation of the connector 1164 in the first bending direction 250 and may absorb at least a portion of the energy resulting from the impact to slow and eventually stop the displacement of the upper boom portion 1104. The amount of resistance provided by the first and second coupling plates 1152, 1154 may be selected based on the shape, geometry, and/or material of the plates 1152, 1154, as well as the configuration of the coupling plates 1152, 1154 with respect to each other and/or with respect to the upper and lower plate mounts 1156, 1160 and 1158, 1162 (e.g., distances X, $D_{1152}$, and $D_{1154}$, as described above). The adapter 1150 is configured such that upon removal of the one or more external forces, i.e., force $F_1$, causing the one or more internal stresses in the first and second coupling plates 1152, 1154 equal to or in excess of the yield stress threshold of the first and second coupling plates 1152, 1154 resulting in plastic deformation of the first and second coupling plates 1152, 1154, the plastically deformed first and second coupling plates 1152, 1154 further hold the upper boom portion 1104 at the final deformed angular position to prevent free-falling over of the upper boom portion 1104. As shown in FIG. 32, the first and second coupling plates 1152', 1154' plastically deform/bend upon failure but typically do not break or fracture, such that the first and second coupling plates 1152', 1154' remain connected/attached to connector 1164 and the base mount 1102, thereby preventing or minimizing damage to the truck 10, the base mount 1102 and the upper boom portion 1104, the accessory 300, and/or adjacent personnel or objects. Even at very high magnitudes of the impact force $F_1$ occurring at the upper boom portion 1104, both coupling plates 1152', 1154' will remain coupled to the connector 1164 and the base mount 1102 as the object imparting the impact force $F_1$ moves over or past the upper boom portion 1104, i.e., the adapter 1150 is fixedly coupled to the upper boom portion 1104 via the connector 1164 and the base mount 1102 and has sufficient strength to remain coupled to the upper boom portion 1104 and the base mount 1102, as the coupling plates 1152', 1154' will yield or deflect before the upper and lower plate mounts 1156, 1160 and 1158, 1162 and/or the coupling plates 1152', 1154' separate from one another or from the upper boom portion 1104 or the base mount 1102. Further, the angle of deflection of the first and second coupling plates 1152', 1154' will stabilize at the final deformed angular position once the object imparting the impact force $F_1$ is no longer in contact with the upper boom portion 1104, i.e., the first and second coupling plates 1152', 1154' have sufficient rigidity that the weight of the upper boom portion 1104 will have little or no impact on the amount of deformation occurring at the first and second coupling plates 1152', 1154' after the impact force has been removed. Hence, the plastically deformed first and second coupling plates 1152', 1154' hold the upper boom portion 1104 at the final deformed angular position in which the plates 1152', 1154' are located when the impact force is removed, i.e., the upper boom portion 1104 is held in a fixed position and the first and second coupling plates 1152', 1154' do not further deform or move angularly relative to the base mount 1102 after the impact force has been removed and the first and second coupling plates 1152', 1154' have stabilized, thereby preventing free-falling over of the upper boom portion 1104.

Figure 33:
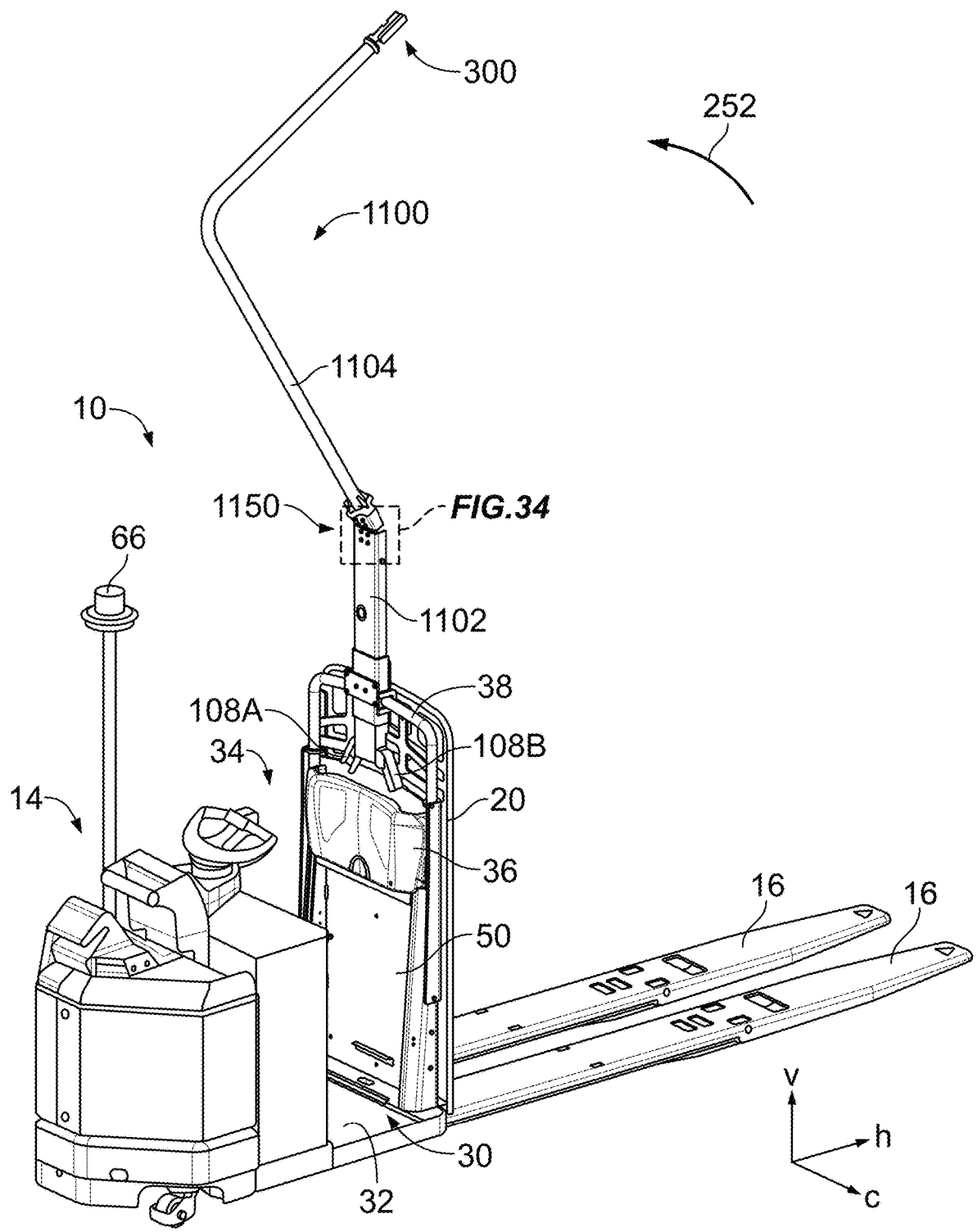
FIG. 33 is a perspective view of a materials handling vehicle comprising a boom assembly with the adapter of FIG. 16 in a second failed state, in accordance with the present disclosure.
Figure 34:
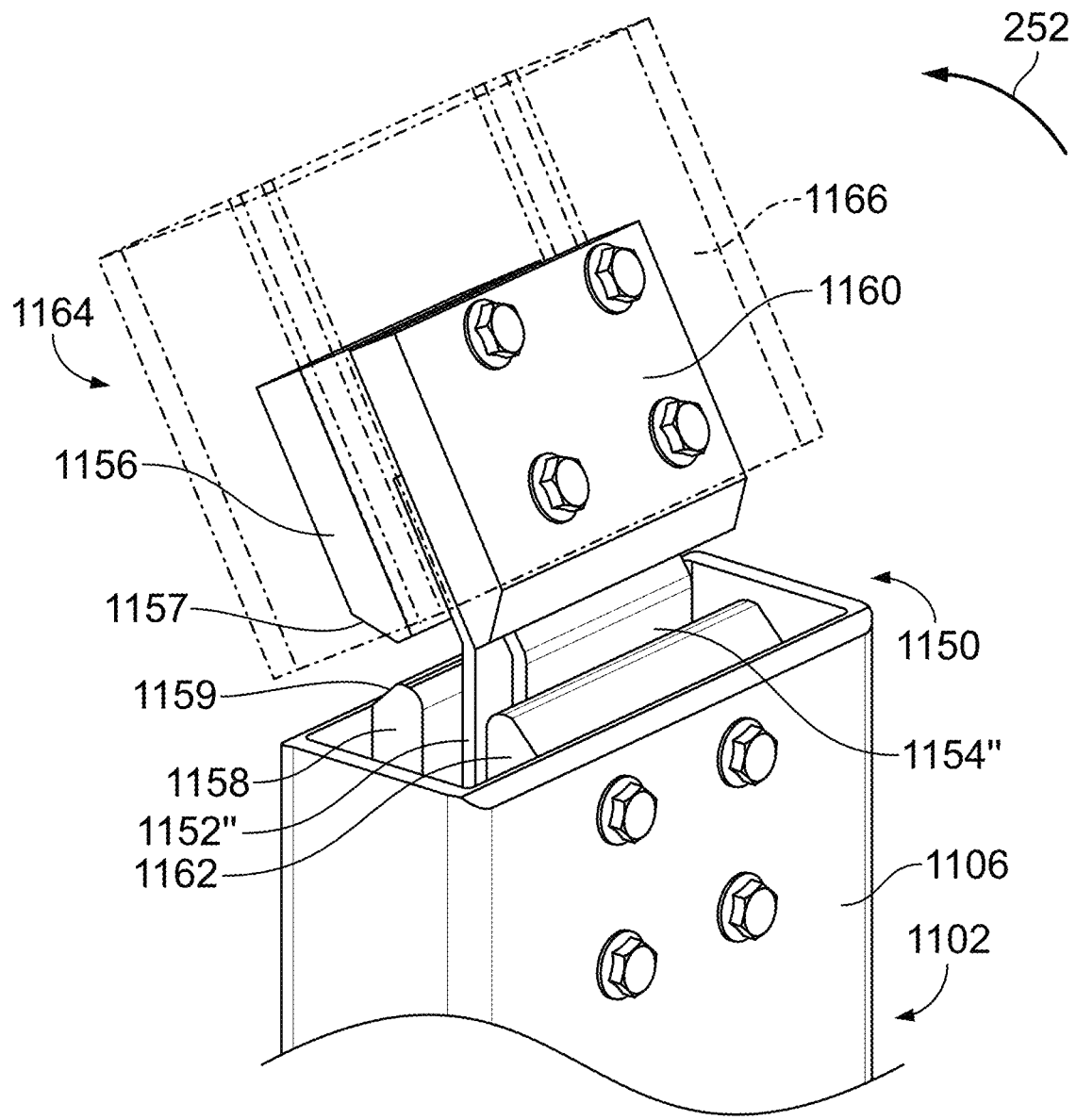
FIG. 34 is a detailed perspective view of the adapter of FIG. 33 and a portion of the boom assembly.

As shown in FIG. 40, the upper boom portion 1104 may be subjected to an external impact force, i.e., exemplary force $F_2$, in a direction generally toward the power unit 14. When the force $F_2$ acting on the second wall 1104A-2 of the upper boom portion 1104 creates one or more internal stresses in the first and second coupling plates 1152, 1154 equal to or in excess of the yield stress threshold of the first and second coupling plates 1152, 1154, the adapter 1150 yields or fails, and the connector 1164, along with the upper boom portion 1104 coupled thereto, are displaced toward the power unit 14 (referred to herein as a second failed state), as shown in FIGS. 33 and 34. In other words, application of the external force $F_2$ to the upper boom portion 1104 causes displacement of the connector 1164 in the second bending direction 252, and when the magnitude of the external force $F_2$ is sufficient to cause one or more internal stresses in each of the first and second coupling plates 1152, 1154 to equal or exceed the yield stress threshold of the first and second coupling plates 1152, 1154 (i.e., the external force $F_2$ on the upper boom portion 1104 causes the connector 1164 to create stresses in each of the first and second coupling plates 1152, 1154 equal to or in excess of a yield stress threshold of each first and second coupling plates 1152, 1154), the first and second coupling plates 1152, 1154 fail and begin to plastically deform, i.e., bend, in the second bending direction 252, as indicated by bent first and second coupling plates 1152", 1154" in FIG. 34. The first and second coupling plates 1152, 1154 bend about an axis (not shown) that is parallel to axis c (see FIG. 33).

A yield stress threshold of the adapter 1150 may equal the yield stress threshold for each of first and second coupling plates 1152, 1154, i.e., the yield strength $\sigma_{yield\ strength}$ of the material from which each coupling plate 1152, 1154 is formed. Failure and deformation of the first and second coupling plates 1152, 1154 allows the connector 1164, along with the upper boom portion 1104 coupled thereto, to rotate or be displaced in the second bending direction 252, i.e., toward the power unit 14 (in FIG. 34, the upper boom portion 1104 is not shown (see FIG. 33), and the lower element 1166 of the connector 1164 is shown with dashed lines to illustrate the internal structure of the adapter 1150). As described herein, the material(s) and/or structure/geometry of the first and second coupling plates 1152, 1154 may be selected so that the first and second coupling plates 1152, 1154 have a yield stress threshold that allows the first and second coupling plates 1152, 1154 to begin failing before the one or more external forces applied to the upper boom portion 1104 cause damage to, or failure of, the structural integrity of the operator's backrest 34, such that the first and second coupling plates 1152, 1154 act as a moment limiter for the operator's backrest 34.

The first and second coupling plates 1152, 1154 may permanently and plastically deform to allow controlled movement of the upper boom portion 1104 to a final deformed angular position relative to the base mount 1102, as shown in FIGS. 33 and 34. The first upper and lower plate mounts 1156, 1158 provide a second stop that limits rotation of the connector 1164, and the upper boom portion 1104 coupled thereto, in the second bending direction 252. The connector 1164 in FIGS. 33 and 34 is depicted as having rotated by about 45 degrees from a normal operating position with respect to the main body 1106 of the base mount 1102. A lower surface of the first upper plate mount 1156 may comprise a chamfered edge 1157, and an upper surface of the first lower plate mount 1158 may comprise a corresponding chamfered edge 1159. If the connector 1164 continues rotating in the second bending direction 252 beyond about 45 degrees, the chamfered edge 1157 of the first upper plate mount 1156 engages the chamfered edge 1159 of the first lower plate mount 1158, with engagement between the chamfered edges 1157, 1159 acting as the second stop to halt rotation of the connector 1164 beyond about 90 degrees. The first and second coupling plates 1152, 1154 may also be used with the base mount 1102 and upper boom portion 1104 described in detail with respect to FIGS. 36 and 38, in which a portion of the base mount 1102 and the upper boom portion 1104 form first and second stops.

The first and second coupling plates 1152, 1154 may resist rotation of the connector 1164 in the second bending direction 252 and may absorb at least a portion of the energy resulting from the impact to slow and eventually stop the displacement of the upper boom portion 1104. The amount of resistance provided by the first and second coupling plates 1152, 1154 may be selected based on the shape, geometry, and/or material selected for coupling plates 1152, 1154 and the configuration of the coupling plates 1152, 1154 with respect to each other and/or with respect to the upper and lower plate mounts 1156, 1160 and 1158, 1162. The adapter 1150 is configured such that upon removal of the one or more external forces, i.e., force $F_2$, causing the one or more internal stresses in the first and second coupling plates 1152, 1154 equal to or in excess of the yield stress threshold of the first and second coupling plates 1152, 1154 resulting in plastic deformation of the coupling plates 1152, 1154, the plastically deformed first and second coupling plates 1152, 1154 further hold the upper boom portion 1104 at the final deformed angular position to prevent free-falling over of the upper boom portion 1104. As shown in FIG. 34, the first and second coupling plates 1152", 1154" plastically deform/bend upon failure but typically do not break or fracture, such that the first and second coupling plates 1152", 1154" remain connected/attached to connector 1164 and the base mount 1102, thereby preventing or minimizing damage to the truck 10, the base mount 1102 and the upper boom portion 1104, the accessory 300, and/or adjacent personnel or objects. Even at very high magnitudes of the impact force $F_2$ occurring at the upper boom portion 1104, both coupling plates 1152", 1154" will remain coupled to the connector 1164 and the base mount 1102 as the object imparting the impact force $F_2$ moves over or past the upper boom portion 1104, i.e., the adapter 1150 is fixedly coupled to the upper boom portion 1104 via the connector 1164 and the base mount 1102 and has sufficient strength to remain coupled to the upper boom portion 1104 and the base mount 1102, as the coupling plates 1152", 1154" will yield or deflect before the upper and lower plate mounts 1156, 1160 and 1158, 1162 and/or the coupling plates 1152", 1154" separate from one another or from the upper boom portion 1104 or the base mount 1102. Further, the angle of deflection of the first and second coupling plates 1152", 1154" will stabilize at the final deformation angle once the object imparting the impact force $F_2$ is no longer in contact with the upper boom portion 104, i.e., the first and second coupling plates 1152", 1154" have sufficient rigidity that the weight of the upper boom portion 1104 will have little or no impact on the amount of deformation occurring at the first and second coupling plates 1152", 1154" after the impact force has been removed. Hence, the plastically deformed first and second coupling plates 1152", 1154" hold the upper boom portion 1104 at the final deformed angular position in which the plates 1152", 1154" are located when the impact force is removed, i.e., the upper boom portion 1104 is held in a fixed position and the first and second coupling plates 1152", 1154" do not further deform or move angularly relative to the base mount 1102 after the impact force has been removed and the first and second coupling plates 1152", 1154" have stabilized, thereby preventing free-falling over of the upper boom portion 1104.

Failure of the Adapter Comprising Coupling Bar(s)

Figure 46:
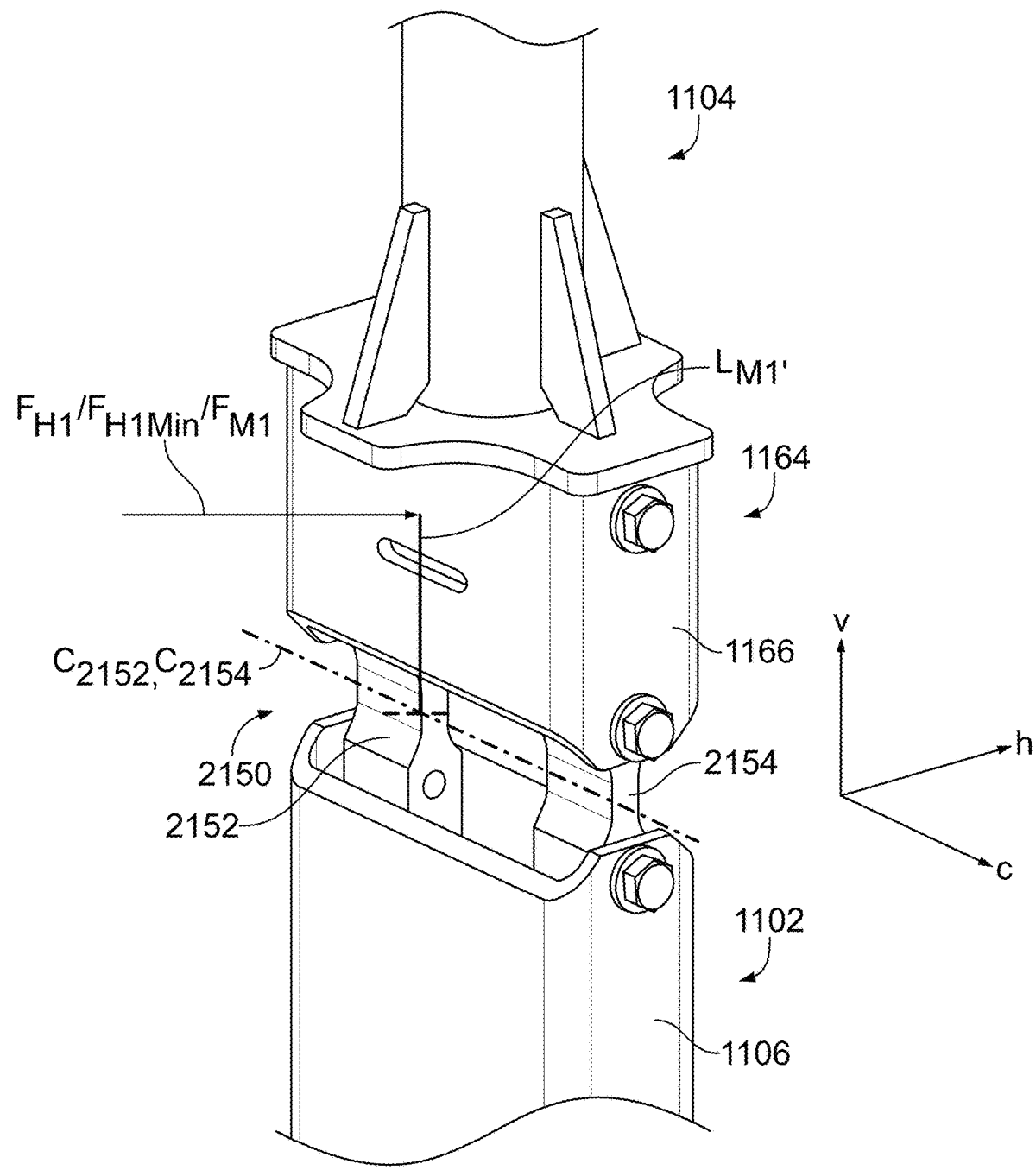
FIG. 46 is a perspective view of the adapter of FIG. 22.

With reference to the adapter 2150 illustrated in FIG. 22, the force $F_{H1Min}$ corresponding to the moment $M_{H1i}$ having the lowest value from all values of the moment $M_{H1i}$ calculated is applied to a section of the upper boom portion 1104, specifically to a section of the connector 1164, which location where the force $F_{H1Min}$ is applied is spaced a distance from an approximate center $C_{2152}$, $C_{2154}$ of the respective middle section 2170, 2172 of the first and second coupling bars 2152, 2154 equal to length $L_{M1'}$, as shown in FIGS. 41 and 46. Using the modified force $F_{M1}$ instead of the force $F_{H1Min}$, which force $F_{M1}$ is presumed to be applied at the same location on the upper boom portion 1104 as the force $F_{H1Min}$, a moment $M_{FM1}$ of the modified force $F_{M1}$ about an axis passing through the center $C_{2152}$, $C_{2154}$ of the first and second coupling bars 2152, 2154 equals a magnitude of the modified force $F_{M1}$ (i.e., its component parallel to the horizontal axis h) times the length $L_{M1'}$ extending from where the modified force $F_{M1}$ impacts or is applied to the connector 1164 to the center $C_{2152}$, $C_{2154}$ of the first and second coupling bars 2152, 2154.

The total stresses $\sigma_{total}$ occurring within each of the first and second coupling bars 2152, 2154, when the modified force $F_{M1}$ is applied to the upper boom portion 1104/connector 1164 at the location illustrated in FIGS. 41 and 46, may be set equal to a yield strength of the material from which each of the coupling bars 2152, 2154 is formed, such as a specific grade of steel. Yield strengths for such materials are well known. When the total stresses $\sigma_{total}$ occurring in each one of the coupling bars 2152, 2154 equals the yield strength $\sigma_{yield\ strength}$ of the material from which the coupling bar 2152, 2154 is formed, each coupling bar 2152, 2154 will fail or yield, i.e., permanently deform or bend. The yield strength $\sigma_{yield\ strength}$ of the material from which each coupling bar 2152, 2154 is formed is equal to a yield stress threshold for each coupling bar 2152, 2154, which also equals a yield stress threshold for the adapter 2150. Setting total stresses $\sigma_{total}$ equal to the yield strength $\sigma_{yield\ strength}$ of the material from which each coupling bar 2152, 2154 is formed may be expressed by the following Equation (8):

$$\sigma_{total} = \sigma_{yield\ strength} = 0.5 \times F_{M1} \times L_{M1'}/(Z_{Bar})$$

where $\sigma_{total} = \sigma_{yield\ strength} =$ a yield strength of the material(s) comprising each of the first and second coupling bars 2152, 2154, such as steel; and
$Z_{Bar}$=section modulus of the middle section 2170, 2172 of each of the first and second coupling bars 2152, 2154.

$Z_{Bar}$ may be determined for a middle section 2170, 2172 of each of the first and second coupling bars 2152, 2154 from the following Equation (9).

$$Z_{Bar} = \frac{W * A_{bar}}{6}$$

When the first and second coupling bars 2152, 2154 have the same geometry and are made from the same material, they will each have the same section modulus $Z_{Bar}$. The width W for the middle section 2170 for the first coupling bar 2152 equals width $W_{2170}$ and the width W for the middle section 2172 for the second coupling bar 2154 equals width $W_{2172}$. The cross-sectional area $A_{bar}$ for the middle section 2170 of the first coupling bar 2152 may be determined by multiplying the width $W_{2170}$ of the middle section 2170 of the first coupling bar 2152 by the depth $D_{2170}$ of the middle section 2170 of the first coupling bar 2152. The cross-sectional area $A_{bar}$ of the middle section 2172 for the second coupling bar 2154 may be determined by multiplying the width $W_{2172}$ of the middle section 2172 of the second coupling bar 2152 by the depth $D_{2172}$ of the middle section 2172 of the second coupling bar 2154.

Hence, various combinations of the width W and the cross sectional area $A_{plate}$ for each coupling bar 2152, 2154 may be substituted into Equations (8) and (9) and appropriate values for the width W and the cross sectional area $A_{bar}$ are selected. Preferably, the cross sectional area $A_{bar}$ is selected to be sufficiently large to minimize deflection of the upper portion and maximize resiliency to prevent fatigue of the first and second coupling bars 2152, 2154. Using Equations (8) and (9), each coupling bar 2152, 2154 is designed so that the coupling bar 2152, 2154 fails when the modified force $F_{M1}$ is applied to the upper boom portion 1104/the connector 1164 at the location illustrated in FIGS. 41 and 46, or a moment is generated by a force F applied anywhere along the upper boom portion 1104 and having a moment arm extending to any location on the backrest 34, in which the moment generated by that force F is equal to or greater than the moment $M_{FM1}$. Hence, both coupling bars 2152, 2154 will fail or yield prior to structural integrity damage occurring at the operator's backrest 34.

Determining the modified force $F_{M1}$ and the corresponding moment $M_{FM1}$ may be found using finite element analysis methods so as to allow the width W and the cross sectional area $A_{plate}$ for each coupling bar 2152, 2154 to be calculated from Equations (8) and (9).

It is further contemplated that the shear force threshold for each of the pins 180, 182 and the yield stress threshold for each of the coupling plates 1152, 1154 or the bars 2152, 2154 may be designed via experimentation using actual boom assemblies (e.g., by applying one or more external forces to actual boom assemblies to allow each of the pins 180, 182, the coupling plates 1152, 1154, and the bars 2152, 2154 to be designed so that each pin 180, 182, coupling plate 1152, 1154, and bar 2152, 2154 yields or fails prior to structural integrity damage occurring at the operator's backrest 34). Hence, the pins 180, 182, the coupling plates 1152, 1154, and the bars 2152, 2154 are designed so that when one or more external forces are applied to a boom assembly sufficient to cause internal stresses in each of the pins 180, 182, the coupling plates 1152, 1154, and the bars 2152, 2154 equal to or in excess of the yield stress threshold of each pin 180, 182, coupling plate 1152, 1154, and bar 2152, 2154, pin 180, 182, coupling plate 1152, 1154, and bar 2152, 2154 fails prior to structural integrity damage occurring at the operator's backrest. The pins 180, 182, the coupling plates 1152, 1154, and the bars 2152, 2154 may also be designed via one or more suitable computer modelling techniques such that each of the pins 180, 182, the coupling plates 1152, 1154, and the bars 2152, 2154 fails prior to structural integrity damage occurring at the operator's backrest 34.

Figure 35:
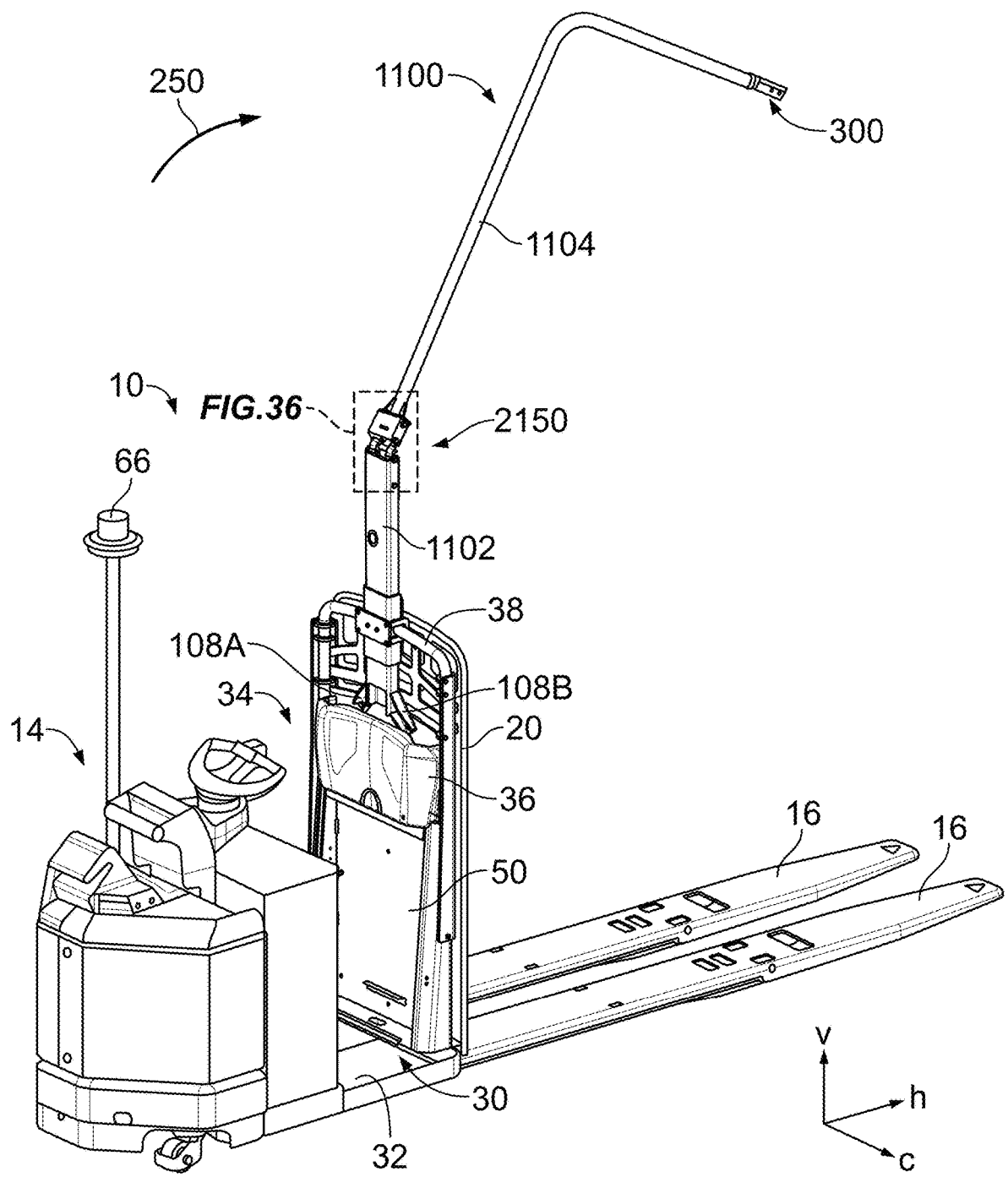
FIG. 35 is a perspective view of a materials handling vehicle comprising a boom assembly with the adapter of FIG. 22 in a first failed state, in accordance with the present disclosure.
Figure 36:
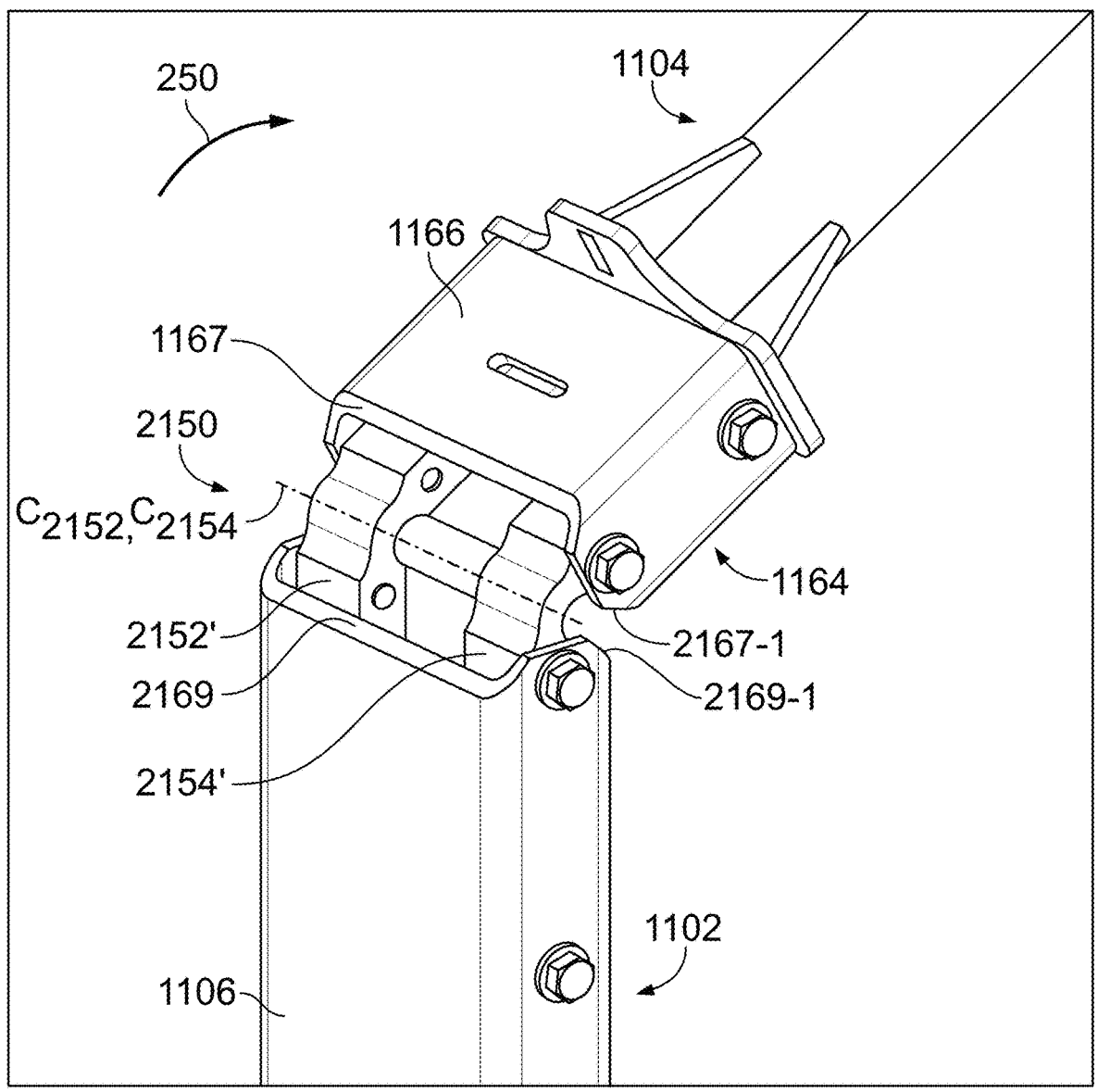
FIG. 36 is a detailed perspective view of the adapter of FIG. 35 and a portion of the boom assembly.

As shown in FIG. 40, the upper boom portion 1104 may be subjected to an external impact force, i.e., exemplary force $F_1$, at an angle to the first wall 1104A-1 of the upper boom portion 1104 and generally extending toward the forks 16. When a horizontal component of the external force $F_1$ (indicated by line h) acting on the first wall 1104A-1 of the upper boom portion 1104 creates internal stresses in the first and second coupling bars 2152, 2154, equal to or in excess of the yield stress threshold of each of the first and second coupling bars 2152, 2154, i.e., equal to or in excess of the yield strength $\sigma_{yield\ strength}$ of the material from which each coupling bar 2152, 2154 is formed, the adapter 2150 yields or fails and enters the first failed state, and the connector 1164, along with the upper boom portion 1104 coupled thereto, are displaced toward the forks 16, as shown in FIGS. 35 and 36. In other words, application of the external force $F_1$ to the upper boom portion 1104 may cause displacement of the connector 1164 in the first bending direction 250, and when the magnitude of the external force $F_1$ is sufficient to cause one or more internal stresses in each of the first and second coupling bars 2152, 2154 to equal or exceed the yield stress threshold of each of the first and second coupling bars 2152, 2154 (i.e., the external force $F_1$ on the upper boom portion 1104 causes the connector 1164 to create stresses in the first and second coupling bars 2152, 2154 equal to or in excess of the yield stress threshold of each of the first and second coupling bars 2152, 2154), the first and second coupling bars 2152, 2154 fail and begin to plastically deform, i.e., bend, in the first bending direction 250, as indicated by bent first and second coupling bars 2152', 2154' in FIG. 36. A yield stress threshold of the adapter 2150 may equal the yield stress threshold for each of the first and second coupling bars 2152, 2154. Failure and deformation of the first and second coupling bars 2152, 2154 allows the connector 1164, along with the upper boom portion 1104 coupled thereto, to rotate or be displaced in the first bending direction 250, i.e., toward the forks 16.

The first and second coupling bars 2152, 2154 may be formed from the same material, e.g., a metal such as steel, and may have the same structure/geometry, such that the first and second coupling bars 2152, 2154 each have the same yield stress threshold. The respective width $W_{2170}$, $W_{2172}$ and depth $D_{2170}$, $D_{2172}$ of the middle section 2170, 2172 of each of the first coupling bar 2152 and the second coupling bar 2154, the cross sectional area $A_{bar}$ of the middle section 2170, 2172 of each coupling bar 2152, 2154, and the material from which each of the coupling bars 2152, 2154 is formed, which material has a given yield strength $\sigma_{yield\ strength}$ defining the yield stress threshold of the first and second coupling bars 2152, 2154 may be selected, such that the first and second coupling bars 2152, 2154 fail or yield before the one or more external forces applied to the upper boom portion 104 cause damage to, or failure of, the structural integrity of the operator's backrest 34. In the example shown, the first and second coupling bars 2152, 2154 may bend at a location adjacent to the respective center $C_{2152}$, $C_{2154}$.

The first and second coupling bars 2152, 2154 plastically deform to allow controlled movement of the upper boom portion 1104 to a final deformed angular position relative to the base mount 1102, as shown in FIGS. 35 and 36. A first portion of an upper end surface of the base mount 1102, i.e., a first portion 2169-1 of an upper end surface 2169 of the base mount 1102, and a first portion of a lower end surface of the upper boom portion 1104, i.e., a first portion 2167-1 of a lower end surface 2167 of the lower element 1166 of the connector 1164, provide a first stop that limits rotation of the connector 1164, and the upper boom portion 1104 coupled thereto, in the first bending direction 250. The connector 1164 is depicted in FIGS. 35 and 36 as having rotated by about 45 degrees from a normal operating position with respect to the main body 1106 of the base mount 1102. The first portion 2167-1 of the lower end surface 2167 of the lower element 1166 may comprise a sloped edge, and the first portion 2169-1 of the upper end surface 2169 of the base mount 1102 may comprise a corresponding sloped edge. If the connector 1164 continues rotating in the first bending direction 250 beyond about 45 degrees, the sloped edge of the first portion 2167-1 of the lower end surface 2167 engages the sloped edge of the first portion 2169-1 of the upper end surface 2169, with engagement between the sloped edges acting as the first stop to halt rotation of the connector 1164 beyond about 90 degrees.

The first and second coupling bars 2152, 2154 may resist rotation of the connector 1164 in the first bending direction 250 and may absorb at least a portion of the energy resulting from the impact to slow and eventually stop the displacement of the upper boom portion 1104. The amount of resistance provided by the first and second coupling bars 2152, 2154 may be selected based on the material and/or geometry. The adapter 2150 is configured such that upon removal of the one or more external forces, i.e., force $F_1$, causing the one or more internal stresses in the first and second coupling bars 2152, 2154 to equal or exceed the yield stress threshold of the first and second coupling bars 2152, 2154, the first and second coupling bars 2152, 2154 may hold the upper boom portion 1104 at the final deformed angular position to prevent free-falling over of the upper boom portion 1104. As shown in FIG. 36, the first and second coupling bars 2152', 2154' plastically deform/bend upon failure and are designed not to break or fracture when typical or expected one or more external forces, i.e., force $F_1$ strike the upper boom portion 1104 such that the first and second coupling bars 2152', 2154' remain connected/attached to connector 1164 and the base mount 1102, thereby preventing or minimizing damage to the truck 10, the base mount 1102 and the upper boom portion 1104, the accessory 300, and/or adjacent personnel or objects. Even at very high magnitudes of the impact force $F_1$ occurring at the upper boom portion 1104, both coupling bars 2152', 2154' will remain coupled to the connector 1164 and the base mount 1102 as the object imparting the impact force $F_1$ moves over or past the upper boom portion 1104, i.e., the adapter 2150 is fixedly coupled to the upper boom portion 1104 via the connector 1164 and the base mount 1102 and has sufficient strength to remain coupled to the upper boom portion 1104 and the base mount 1102, as the coupling bars 2152', 2154' will yield or deflect before the coupling bars 2152', 2154' separate from the upper boom portion 1104 and/or the base mount 1102. Further, the angle of deflection of the first and second coupling bars 2152', 2154' will stabilize at the final angular position once the object imparting the impact force $F_1$ is no longer in contact with the upper boom portion 1104, i.e., the first and second coupling bars 2152', 2154' have sufficient rigidity that the weight of the upper boom portion 1104 will have little or no impact on the amount of deformation occurring at the first and second coupling bars 2152', 2154' after the impact force has been removed. Hence, the plastically deformed first and second coupling bars 2152', 2154' hold the upper boom portion 1104 at the final deformed angular position in which the coupling bars 2152', 2154' are located when the impact force is removed, i.e., the upper boom portion 1104 is held in a fixed position and the first and second coupling bars 2152', 2154' do not further deform or move angularly relative to the base mount 1102 after the impact force has been removed and the first and second coupling bars 2152', 2154' have stabilized, thereby preventing free-falling over of the upper boom portion 1104.

Figure 37:
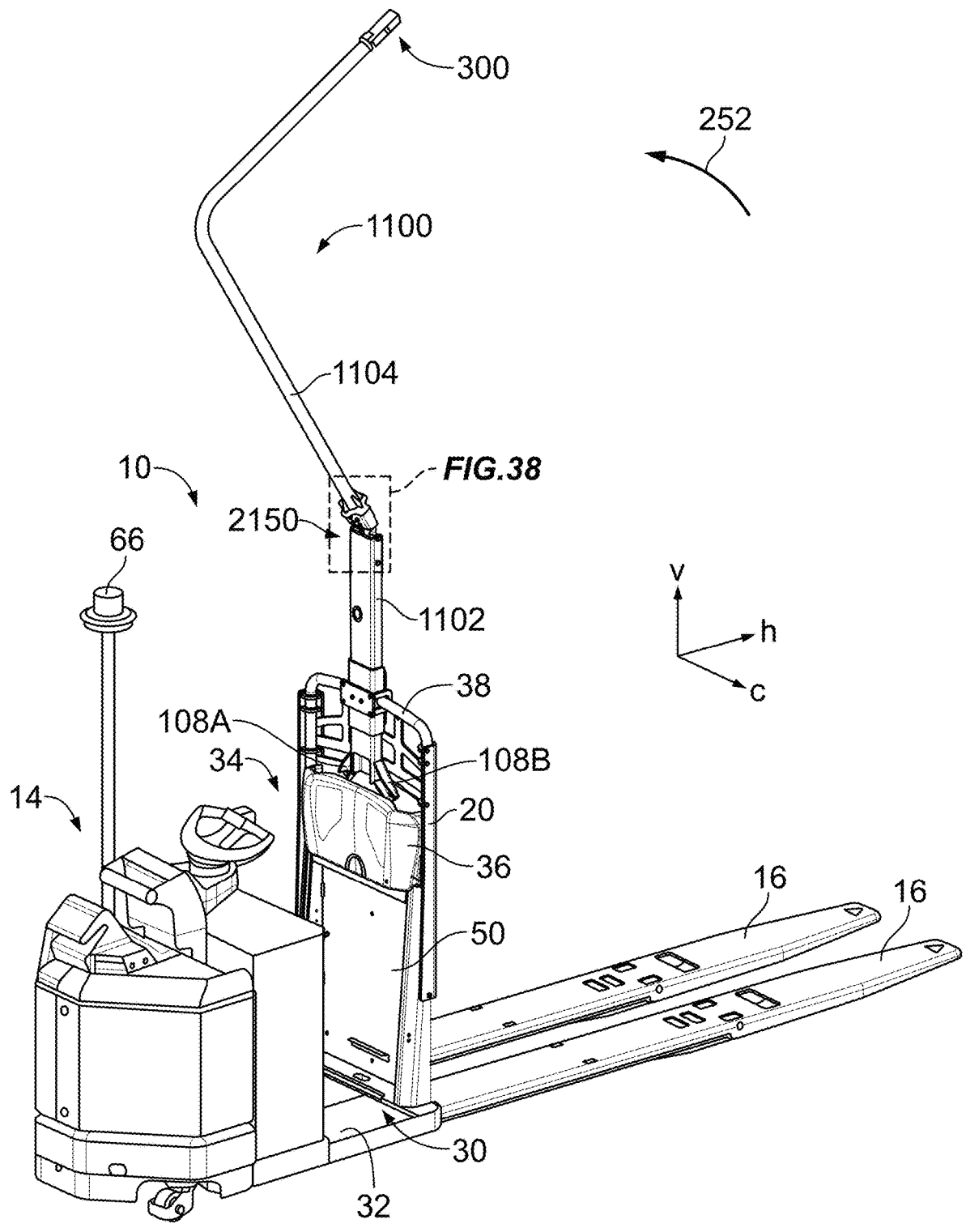
FIG. 37 is a perspective view of a materials handling vehicle comprising a boom assembly with the adapter of FIG. 22 in a second failed state, in accordance with the present disclosure.
Figure 38:
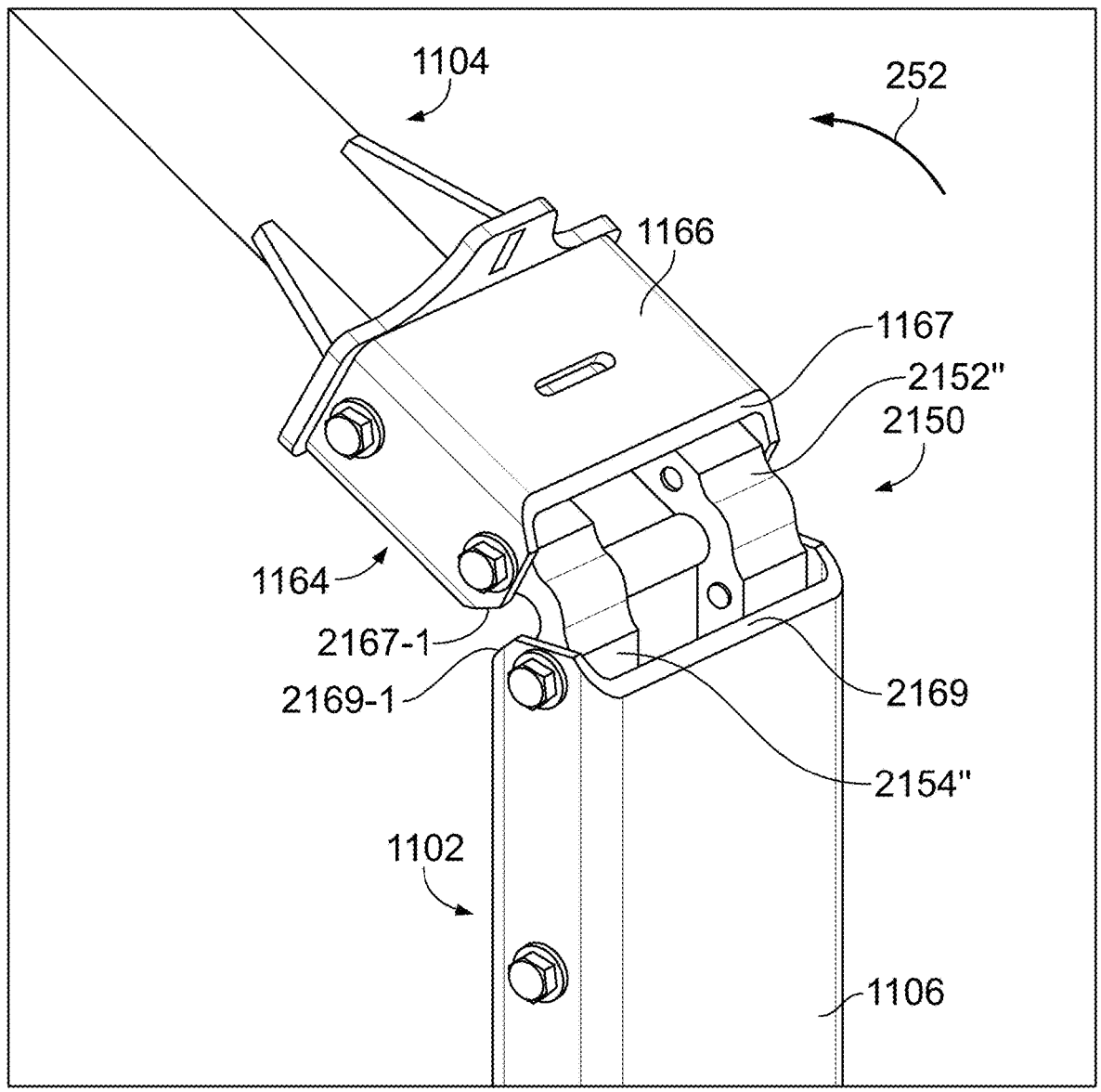
FIG. 38 is a detailed perspective view of the adapter of FIG. 37 and a portion of the boom assembly.

As shown in FIG. 40, the upper boom portion 1104 may be subjected to an external impact force, i.e., exemplary force $F_2$, in a direction generally toward the power unit 14. When the force $F_2$ acting on the second wall 1104A-2 of the upper boom portion 1104 creates one or more internal stresses in the first and second coupling bars 2152, 2154 equal to or in excess of the yield stress threshold of the first and second coupling bars 2152, 2154, the adapter 2150 yields or fails and enters the second failed state, and the connector 1164, along with the upper boom portion 1104 coupled thereto, are displaced toward the power unit 14, as shown in FIGS. 37 and 38. In other words, application of the external force $F_2$ to the upper boom portion 1104 causes displacement of the connector 1164 in the second bending direction 252, and when the magnitude of the external force $F_2$ is sufficient to cause one or more internal stresses in the first and second coupling bars 2152, 2154 to equal or exceed the yield stress threshold of the first and second coupling bars 2152, 2154 (i.e., the external force $F_2$ on the upper boom portion 1104 causes the connector 1164 to create stresses in the first and second coupling bars 2152, 2154 equal to or in excess of the respective yield stress threshold of each of the first and second coupling bars 2152, 2154), the first and second coupling bars 2152, 2154 fail and begin to plastically deform, i.e., bend, in the second bending direction 252, as indicated by bent first and second coupling bars 2152", 2154" in FIG. 38. Failure and deformation of the first and second coupling bars 2152, 2154 allows the connector 1164, along with the upper boom portion 1104 coupled thereto, to rotate or be displaced in the second bending direction 252, i.e., toward the power unit 14.

As described herein, the material(s) and/or structure/geometry of the first and second coupling bars 2152, 2154 may be selected so that the first and second coupling bars 2152, 2154 have a yield stress threshold that allows the first and second coupling bars 2152, 2154 to begin failing before the one or more external forces applied to the upper boom portion 1104 cause damage to, or failure of, the structural integrity of the operator's backrest 34. In the example shown, the first and second coupling bars 2152, 2154 may bend at a location adjacent to the respective center $C_{2152}$, $C_{2154}$. Hence, the yield stress threshold of the first and second coupling bars 2152, 2154 may be designed so that the adapter 2150 yields or fails before one or more external forces applied to the upper boom portion 1104 cause an element or component of the truck 10, i.e., the operator's backrest 34, to which the boom assembly 1100 is coupled to fail. The boom assembly 1100 is considered to comprise the structure, i.e., the first and second brackets 116A, 116B and the first and second flanges 108A, 108B, for coupling the base mount 1102 to the truck 10.

The first and second coupling bars 2152, 2154 plastically deform to allow controlled movement of the upper boom portion 1104 to a final deformed angular position relative to the base mount 1102, as shown in FIGS. 37 and 38. A second portion of the upper end surface of the base mount 1102, i.e., a second portion 2169-2 of the upper end surface 2169 of the base mount 1102, and a second portion of the lower end surface of the upper boom portion 1104, i.e., a second portion 2167-2 of the lower end surface 2167 of the lower element 1166 of the connector 1164, provide a second stop that limits rotation of the connector 1164, and the upper boom portion 1104 coupled thereto, in the second bending direction 252. The connector 1164 is depicted in FIGS. 23 and 24 as having rotated by about 45 degrees from a normal operating position with respect to the main body 1106 of the base mount 1102. The second portion 2167-2 of the lower surface 2167 of the lower element 1166 may comprise a sloped edge, and the second portion 2169-2 of the upper end surface 2169 of the base mount 1102 may comprise a corresponding sloped edge. If the connector 1164 continues rotating in the second bending direction 252 beyond about 45 degrees, the sloped edge of the second portion 2167-2 of the lower surface 2167 engages the sloped edge of the second portion 2169-2 of the upper end surface 2169, with engagement between the sloped edges acting as the second stop to halt rotation of the connector 1164 beyond about 90 degrees.

The first and second coupling bars 2152, 2154 may resist rotation of the connector 1164 in the second bending direction 252 and may absorb at least a portion of the energy resulting from the impact to slow and eventually stop the displacement of the upper boom portion 1104. The amount of resistance provided by the first and second coupling bars 2152, 2154 may be selected based on the material and/or geometry. The adapter 2150 is configured such that upon removal of the one or more external forces, i.e., force $F_2$, causing the one or more internal stresses in the first and second coupling bars 2152, 2154 equal to or in excess of the yield stress threshold of the first and second coupling bars 2152, 2154, the first and second coupling bars 2152, 2154 hold the upper boom portion 1104 at the final deformed angular position to prevent free-falling over of the upper boom portion 1104. As shown in FIG. 38, the first and second coupling bars 2152", 2154" plastically deform/bend upon failure but do not break or fracture, such that the first and second coupling bars 2152", 2154" remain connected/attached to connector 1164 and the base mount 1102, thereby preventing or minimizing damage to the truck 10, the base mount 1102 and the upper boom portion 1104, the accessory 300, and/or adjacent personnel or objects. Even at very high magnitudes of the impact force $F_2$ occurring at the upper boom portion 1104, both coupling bars 2152", 2154" will remain coupled to the connector 1164 and the base mount 1102 as the object imparting the impact force $F_2$ moves over or past the upper boom portion 1104, i.e., the adapter 2150 is fixedly coupled to the upper boom portion 1104 via the connector 1164 and the base mount 1102 and has sufficient strength to remain coupled to the upper boom portion 1104 and the base mount 1102, as the coupling bars 2152", 2154" will yield or deflect before the coupling bars 2152", 2154" separate from the upper boom portion 1104 and/or the base mount 1102. Further, the angle of deflection of the first and second coupling bars 2152", 2154" will stabilize at the final deformed angular position once the object imparting the impact force $F_2$ is no longer in contact with the upper boom portion 1104, i.e., the first and second coupling bars 2152", 2154" have sufficient rigidity that the weight of the upper boom portion 1104 will have little or no impact on the amount of deformation occurring at the first and second coupling bars 2152", 2154" after the impact force has been removed. Hence, the plastically deformed first and second coupling bars 2152", 2154" hold the upper boom portion 1104 at the final deformed angular position in which the coupling bars 2152", 2154" are located when the impact force is removed, i.e., the upper boom portion 1104 is held in a fixed position and the first and second coupling bars 2152", 2154" do not further deform or move angularly relative to the base mount 1102 after the impact force has been removed and the first and second coupling bars 2152", 2154" have stabilized, thereby preventing free-falling over of the upper boom portion 1104.

Positioning of the Adapter

With reference to FIG. 39, the length $L_3$ of the main body 106, 1106 of the base mount 102, 1102 may be adjusted or configured to place or locate the adapter 150, 1150, 2150 at a desired height $H_1$ above the forks 16 and the operator's platform 32. The height $H_1$ may be based in part on the operator height $H_2$ for a $95^{th}$ percentile adult male. In particular, the height $H_1$ may be greater than the operator height $H_2$ to ensure that the adapter 150, 1150, 2150 is located high enough above the operator that the upper boom portion 104, 1104 does not contact the operator upon failure of the adapter 150, 1150, 2150. For example, the operator height $H_2$ may be 75 inches, and the height $H_1$ may be 84 inches.

Positioning the adapter 150, 1150, 2150 at the height $H_1$ may also help to prevent damage to the truck 10, the boom assembly 100, 1100, the accessory 300, and/or adjacent personnel and objects by ensuring that when the adapter 150, 1150, 2150 enters the first or second failed state, the upper boom portion 104, 1104 remains clear of the rest of the truck 10, including, for example, the antenna 66, the forks 16, and/or a load positioned on the forks 16, and remains clear of adjacent objects and personnel. The upper boom portion 104, 1104 may deflect relative to the base mount 102, 1102, i.e., relative to the vertical axis v, in the first bending direction 250 toward the forks 16 by an angle $\alpha_1$, in which the angle $\alpha_1$ is greater than 0 degrees and up to about 90 degrees. The upper boom portion 104, 1104 may deflect relative to the base mount 102, 1102, i.e., relative to the vertical axis v, in the second bending direction 252 toward the power unit 14 by an angle $\alpha_2$, in which the angle $\alpha_2$ is greater than 0 degree and up to about 90 degrees. In the examples shown in FIGS. 7 and 9 where the boom assembly 100, 1100 is depicted in the first and second failed states, respectively, the upper boom portion 104, 1104 is illustrated as being deflected at an angle of approximately 45 degrees with respect to the base mount 102, 1102.

The adapter 150, 1150, 2150 and the components thereof may be modular or interchangeable, such that upon failure, the adapter 150, 1150, 2150 may be removed and replaced and the boom assembly 100, 1100 may be reassembled. For example, with reference to the example shown in FIG. 8, the broken pin 180' may be removed from the adapter 150 and replaced with a new pin. With reference to the examples shown in FIGS. 10 and 11, the upper and lower plate mounts 1156, 1160 and 1158, 1162 and the bent first and second coupling plates 1152', 1154' of the adapter 1150 or the bent first and second coupling bars 2152', 2154' of the adapter 2150 may be removed and replaced. Because the adapter 150, 1150, 2150 yields to impact forces applied to the boom assembly 100, 1100, the adapter 150, 1150, 2150 as described herein may help to prevent damage to the base mount 102, 1102, the upper boom portion 104, 1104, and/or the accessory 300, thereby reducing the cost of replacement, preventing or minimizing the need to repair the truck 10, and reducing the amount of down time before the truck 10 can resume normal operations.

Integrity Monitoring System

Figure 47A:
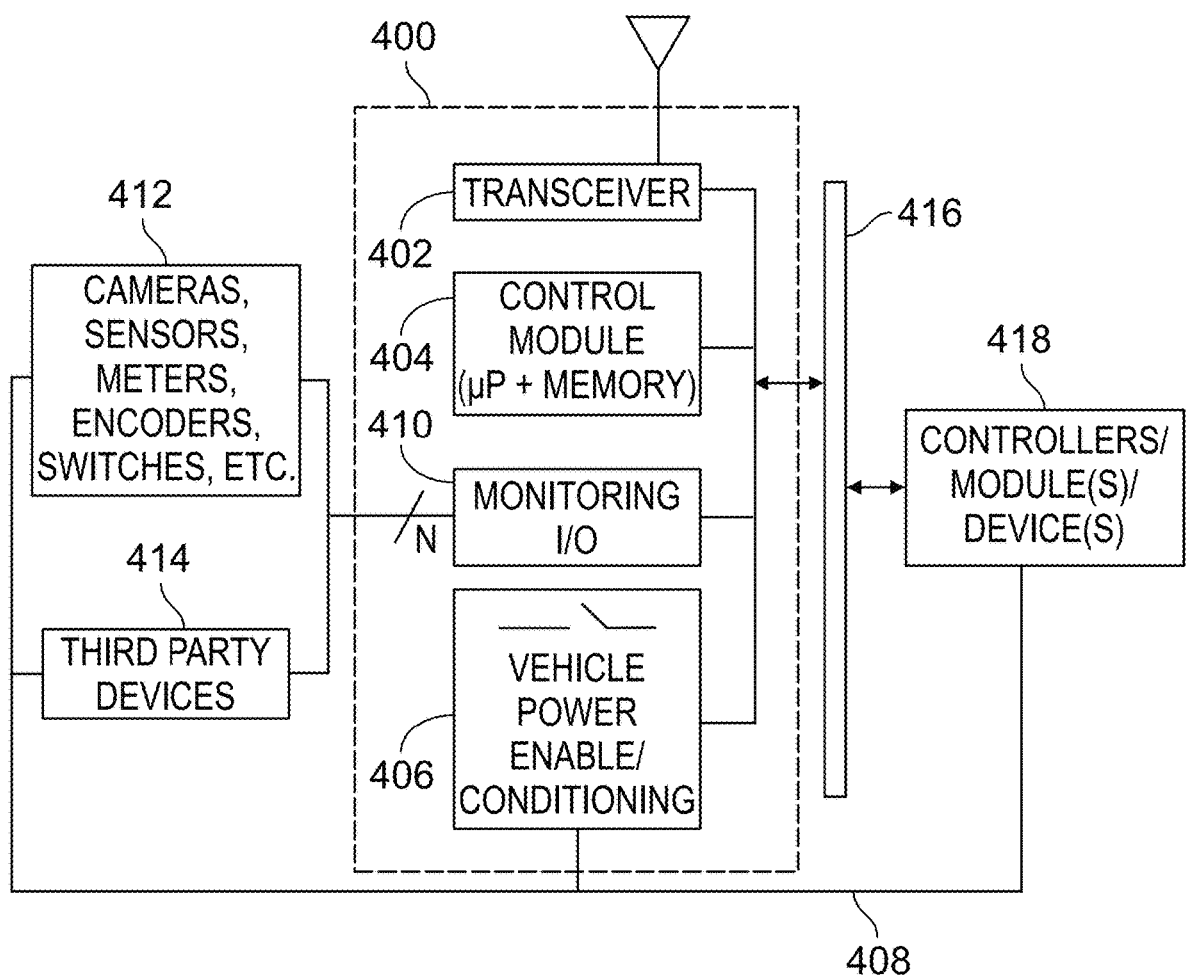
FIG. 47A is a block diagram of a system of electronics on a materials handling vehicle in accordance with the present disclosure.

Referring to FIG. 47A, the truck 10 (see FIGS. 1A and 1B) may include a processing device 400 that is implemented as a special purpose, particular computer that mounts to or is otherwise integrated with the truck 10. The processing device 400 comprises the necessary circuitry to implement wireless communication, data and information processing, and wired (and optionally wireless) communication to components of the truck 10. As a few illustrative examples, the processing device 400 includes a transceiver 402 for wireless communication. Although a single transceiver 402 is illustrated for convenience, in practice, one or more wireless communication technologies may be provided. The transceiver 402 may communicate with a remote server (not shown) and may also optionally support other wireless communication, such as cellular, Bluetooth, infrared (IR) or any other technology or combination of technologies. For instance, using a cellular to IP bridge the transceiver 402 can use a cellular signal to communicate directly with the remote server.

The processing device 400 also comprises a control module 404 having a processor coupled to memory for implementing computer instructions, including computer-implemented processes, or aspects thereof, as set out and described more fully herein. The control module 404 communicates with the components set forth in FIG. 47A, making the processing device 400 a particular machine different from a general-purpose computer. For instance, the control module 404 may utilize the transceiver 402 to exchange information with the remote server for controlling operation of the truck 10, for remotely storing information extracted from the truck 10, etc.

The processing device 400 further includes power enabling circuitry 406 controlled by the control module 404 to selectively enable or disable the truck 10 (or alternatively, to selectively enable or disable specific control modules or vehicle functions such as hydraulic, traction, etc.). For instance, the control module 404 can control the vehicle power enabling circuitry 406 to provide power to the truck 10, select components of the truck 10, select vehicle functions, etc. via power line 408, e.g., based upon operator login, detected geo-features, etc.

Still further, the processing device 400 includes a monitoring input output (I/O) module 410 to communicate via wired or wireless connection to peripheral devices attached to or otherwise mounted on the truck 10, such as sensors, meters, encoders, switches, etc. (collectively represented by reference numeral 412). The module 410 may also be connected to other devices, e.g., third party devices 414 such as RFID scanners, displays, meters or other devices. This allows the control module 404 to obtain and process information monitored on the truck 10.

The processing device 400 is coupled to and/or communicates with other vehicle system components via a suitable vehicle network bus 416. The vehicle network bus 416 is any wired or wireless network, bus or other communications capability that allows electronic components of the truck 10 to communicate with each other. As an example, the vehicle network bus 416 may comprise a controller area network (CAN) bus, Local Interconnect Network (LIN), time-triggered data-bus protocol (TTP) or other suitable communication technology.

Utilization of the vehicle network bus 416 enables seamless integration of the control module 404 and other components of the processing device 400 into native electronics of the truck 10. In the example configuration, the control module 404 of the processing device 400 connects with, understands and is capable of communication with native vehicle electronic components, such as traction controllers, hydraulic controllers, modules, devices, bus enabled sensors, displays, lights, light bars, sound generating devices, headsets, microphones, haptic devices, etc. (collectively referred to by reference 418).

Figure 47B:
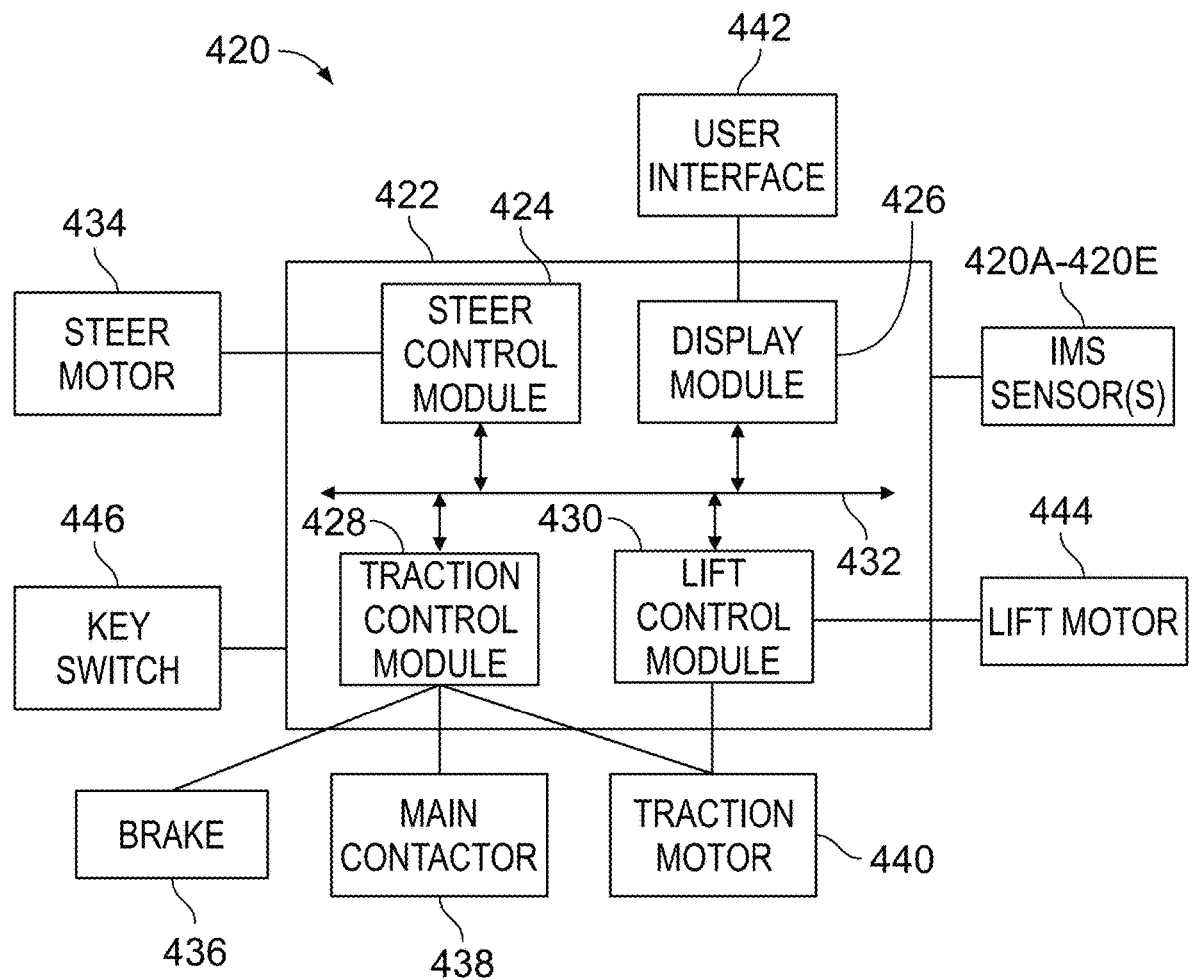
FIG. 47B is a block diagram of operational modules comprising an integrity monitoring system in accordance with the present disclosure.

FIG. 47B illustrates various operational modules of the truck 10 (see FIGS. 1A and 1*i*). The modules illustrated in FIG. 47B may comprise software code stored in memory that may be controlled, read and manipulated by, for example, the control module 404 of FIG. 47A. The truck 10 may comprise an integrity monitoring system (IMS) 420 that monitors a state of the boom assembly 100, 1100 (see FIGS. 1A and 1B) to determine when the upper boom portion 104, 1104 has deflected and is no longer aligned with the base mount 102, 1102. The IMS 420 may include a main module 422 with a steer control module 424, a display module 426, a traction control module 428, and a lift control module 430 that are coupled to and communicate via a network bus 432. Although the IMS 420 is depicted as including modules 424, 426, 428, 430, it may be understood that the IMS 420 may include fewer modules or additional modules (not shown). Alternatively, the IMS 420 may be implemented as a separate module (not shown).

The steer control module 424 is coupled to and communicates with a steer motor 434 that controls a position of the steerable drive wheel 22 (see FIG. 39). The traction control module 428 is coupled to and communicates with a brake 436, a main contactor 438, and a traction motor 440 to control speed and directions of movement of the truck 10. The display module 426 is coupled to and communicates with a user interface 442 to display information to an operator of the truck 10. The lift control module 430 is coupled to and communicates with a lift motor 444 to control lifting and lowering of the load handling assembly 12 (see FIGS. 1A and 1B). A key switch 446 is coupled to the main module 422 and allows the truck 10 to be turned off and on. The IMS 420 comprises one or more sensors 420A-420E.

Figure 48:
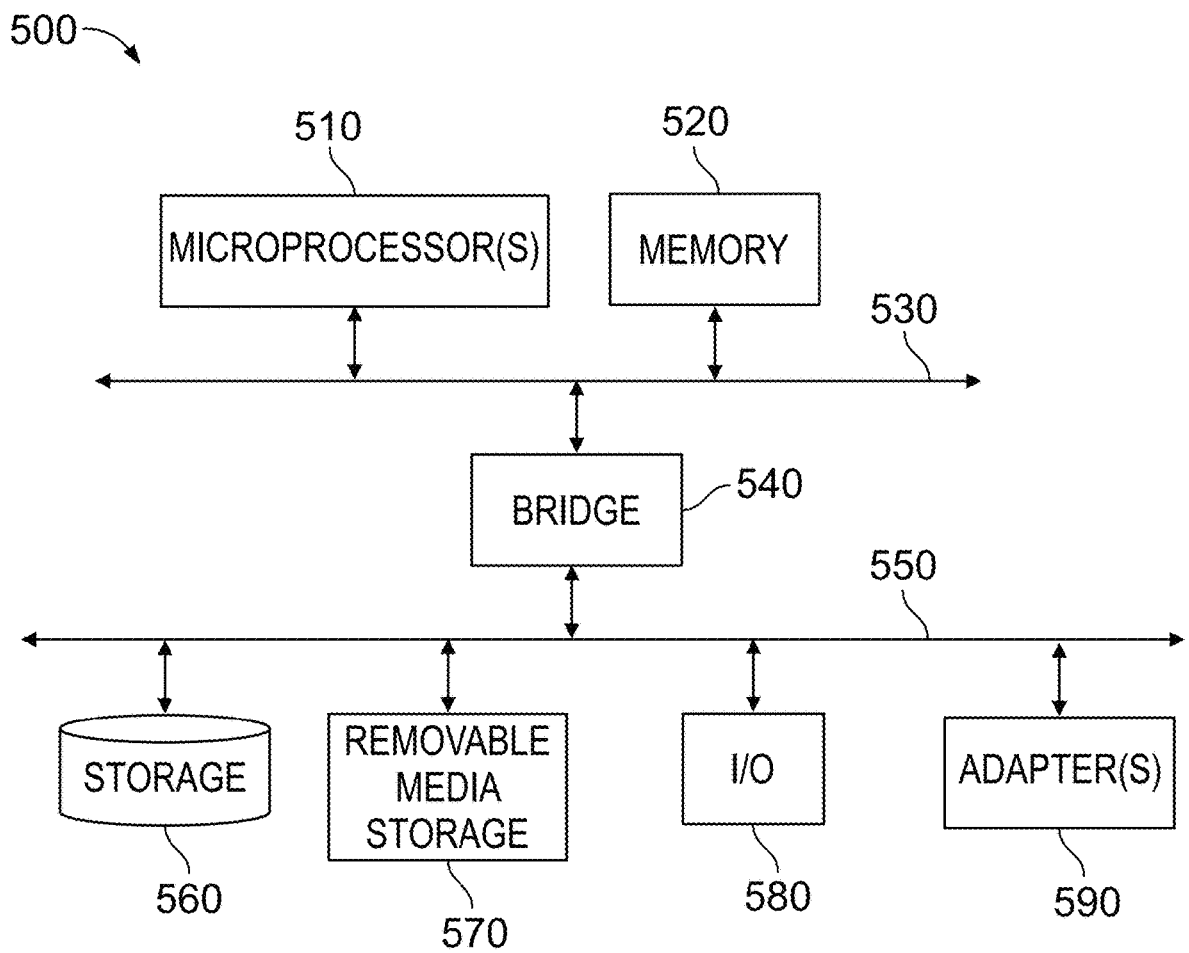
FIG. 48 is a block diagram of a computer processing system capable of implementing any of the systems, modules, or methods (or subsets thereof) described herein, in accordance with the present disclosure.

Referring to FIG. 48, a schematic block diagram illustrates an exemplary computer system 500 for implementing the various processes described herein, e.g., implementing any of the modules 424, 426, 428, 430 of FIG. 47B. The exemplary computer system 500 comprises one or more (hardware) electronic microprocessors 510 and corresponding (hardware) memory 520 (e.g., random access memory and/or read only memory) that are connected to a system bus 530. The one or more microprocessors 510 may include a single processor, a symmetric multiprocessor system, or other configuration including a plurality of processors connected to the system bus 530. Information may be passed between the system bus 530 and a local bus 550 by a suitable bridge 540 to communicate with various input/output devices. For instance, the local bus 550 may be used to interface peripherals with the one or more microprocessors 510, such as storage 560 (e.g., hard disk drives)); removable media storage device(s) 570 (e.g., flash drives, DVD-ROM drives, CD-ROM drives, floppy drives, etc.); I/O devices 580 (e.g., the user interface 442 of FIG. 47B, etc.); and one or more network adapters 590. The network adapters 590, where provided, allow the microprocessor 510 to communicate across one or more of the vehicle network systems (e.g., bus 432 of FIG. 47B). In this regard, example adapters 590 may comprise Bluetooth®, Ethernet, CAN bus, RS422, LIN Bus, WiFi, cellular, etc. This list of peripherals is presented by way of illustration, and is not intended to be limiting. Other peripheral devices may be suitably integrated into the computer system 500. The memory 520, storage 560, removable media insertable into the removable media storage 570, or combinations thereof may be used to implement the methods, configurations, interfaces and other aspects set out and described herein.

The microprocessor(s) 510 control operation of the exemplary computer system 500. Moreover, one or more of the microprocessor(s) 510 execute computer readable code (e.g., stored in the memory 520, storage 560, removable media insertable into the removable media storage 570, or combinations thereof—collectively or individually, computer-program products) that instructs the microprocessor(s) 510 to implement the methods and processes herein. The computer readable code may be stored for instance, in the memory 520, storage 560, removable media storage device(s) 570, or other suitable tangible storage medium accessible by the microprocessor(s) 510. The memory 520 may also function as a working memory, e.g., to store data, an operating system, etc. A "controller," as used in the claims may include the microprocessor(s) 510 or the system 500.

The methods and processes herein may be implemented as a machine-executable method executed on a computer system, e.g., one or more general computing devices, a particular computing device such as the processing device 400 of FIG. 47A, or combinations thereof. Thus, the exemplary computer system or components thereof can implement processes and/or computer-implemented processes stored on one or more computer-readable storage devices as set out in greater detail herein. Other computer configurations may also implement the processes and/or computer-implemented processes stored on one or more computer-readable storage devices as set out in greater detail herein. Computer-program code for carrying out operations for aspects of the present disclosure may be written in any combination of one or more programming languages. The program code may execute entirely on the computer system 500 or partly on the computer system 500. In the latter scenario, a remote computer may be connected to the computer system 500 through any type of network connection, e.g., using the network adapter 590 of the computer system 500.

In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums. A computer-readable signal medium is a transitory propagating signal per se. A computer-readable signal medium may include computer readable program code embodied therein, for example, as a propagated data signal in baseband or as part of a carrier wave. More specifically, a computer-readable signal medium does not encompass a computer-readable storage medium. A computer-readable storage medium is a tangible device/hardware that can retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media.

Specific examples (a non-exhaustive list) of the computer-readable storage medium include the following: a hard disk, a random-access memory (RAM), a read-only memory (ROM), an erasable programmable read-only memory (EPROM), Flash memory, a portable computer storage device, an optical storage device such as a compact disc read-only memory (CD-ROM) or digital video disk (DVD), or any suitable combination of the foregoing. In particular, a computer-readable storage medium includes computer-readable hardware such as a computer-readable storage device, e.g., memory. Here, a computer-readable storage device and computer-readable hardware are physical, tangible implementations that are non-transitory. By non-transitory, it is meant that, unlike a transitory propagating signal per se, which will naturally cease to exist, the contents of the computer-readable storage device or computer-readable hardware that define the claimed subject matter persists until acted upon by an external action. For instance, program code loaded into random access memory (RAM) is deemed non-transitory in that the content will persist until acted upon, e.g., by removing power, by overwriting, deleting, modifying, etc. Moreover, since hardware comprises physical element(s) or component(s) of a corresponding computer system, hardware does not encompass software, per se.

As shown in FIGS. 1A and 1B, the sensors 420A-420E of the IMS 420 may be associated with the boom assembly 100, 1100 and/or the truck 10 and may be placed at one or more locations. The illustrated locations of the sensors 420A-420E are by way of example only, and it may be understood that the sensors 420A-420E may be placed at different locations. For example, the truck 10 may comprise one or more sensors (not shown) that are located within the compartment 44. In addition, one or more of the sensors 420A-420E may be co-located at a single location, e.g., within a single sensor device. The IMS 420 may also comprise a greater or smaller number of sensors 420A-420E than is depicted in FIGS. 1A and 1B.

The sensors 420A-420E are each configured to sense one or more parameters, e.g., velocity, acceleration, position, strain, and orientation related to the upper boom portion 104 to detect or indicate when or that the upper boom portion 104, 1104 has deflected and is no longer aligned with the base mount 102, 1102. As described herein, each of the sensors 420A-420E are further configured to generate at least one signal based on sensing a corresponding parameter, which signals are transmitted to the IMS 420 for processing.

Figure 49:
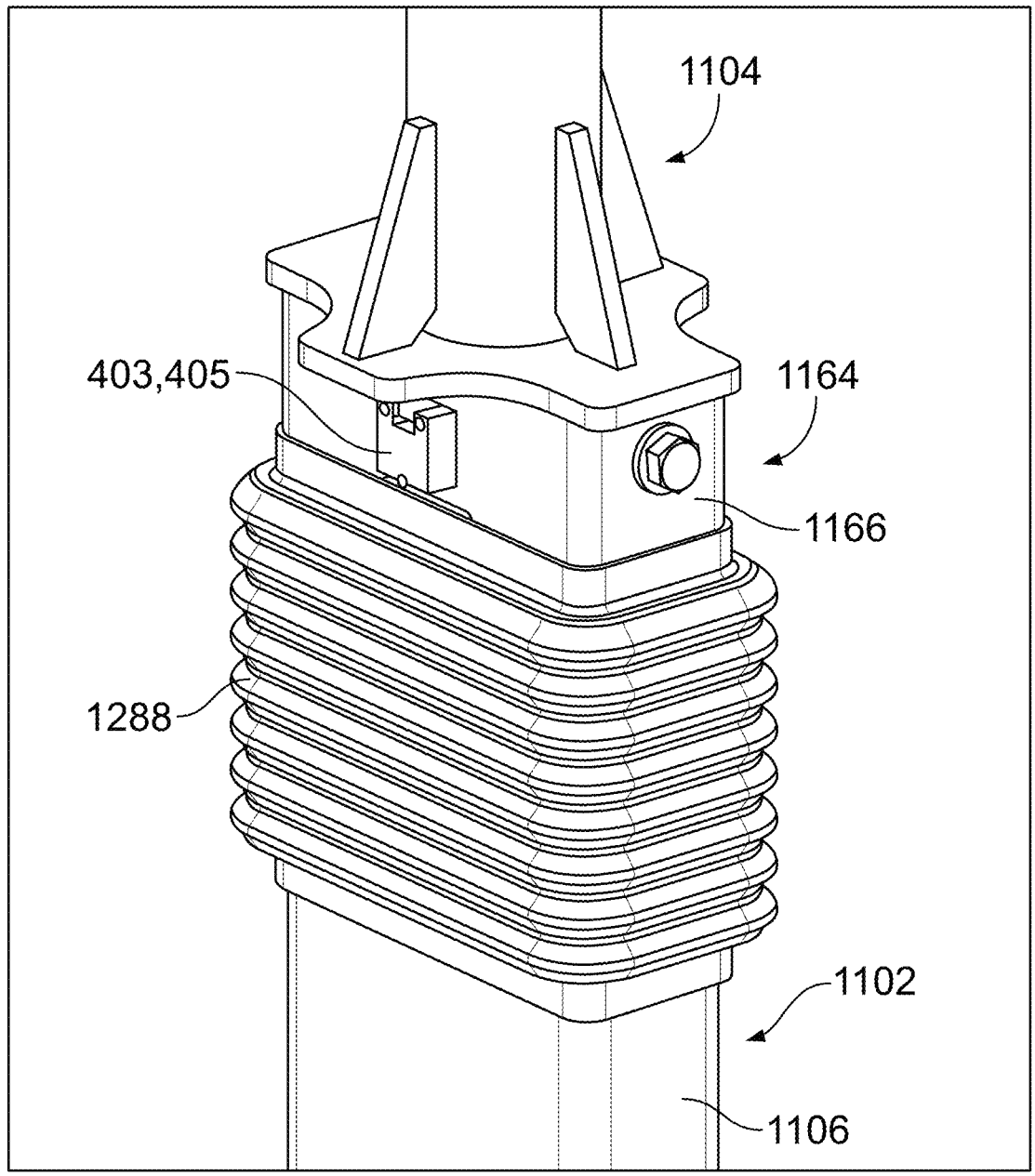
FIG. 49 is a perspective view of a portion of a boom assembly and an adapter comprising at least one sensor in accordance with the present disclosure.

One or more of the sensors 420A-420E may detect an angular velocity of the upper boom portion 104, 1104, in which the angular velocity exceeding a corresponding predetermined threshold is indicative of the upper boom portion 104, 1104 being subjected to one or more external forces sufficient to cause the adapter 150, 1150, 2150 to yield, such that the upper boom portion 104, 1104 moves to a deformed position relative to the base mount 102, 1102 and is no longer aligned with the base mount 102, 1102. During normal operation of the truck 10, the upper boom portion 104, 1104 experiences vibration and other minor movements that may affect the angular velocity measurement. In some examples, these angular velocity values may be filtered out, e.g., via a low pass filter, so that only values exceeding the predetermined threshold cause the IMS 420 to take action. That is, when the sensed angular velocity exceeds the predetermined threshold, the processor determines that the upper boom portion 104, 1104 has deflected or yielded relative to the base mount 102, 1102. With reference to FIG. 49, the one or more sensors 420A-420E may comprise a gyroscope 405 that is associated with the upper boom portion 1104, e.g., attached to the lower element 1166 of the connector 1164 or attached to any other location along the length of the upper boom portion 1104, and may measure the angular motion, i.e., angular velocity, of the upper boom portion 104, 1104. In some examples, the gyroscope 405 may be a separate sensor device, and in other examples, the gyroscope 405 may be part of a single sensor device that comprises another sensor 420A-420E, e.g., an accelerometer 403 as described herein. While the example shown in FIG. 49 includes the adapter 2150 comprising coupling bars 2152, 2154, the gyroscope 405 may also be used with the boom assembly 100 and the adapters 150, 1150 as described herein.

One or more of the sensors 420A-420E may comprise one or more strain gauges (not shown) that senses a strain level in the adapter 1150, 2150. For example, in an illustrated embodiment, the strain gauge may sense a strain level in one or more coupling members, in which the strain level exceeding a corresponding predetermined threshold is indicative of the upper boom portion 1104 being subjected to one or more external forces sufficient to cause the adapter 1150, 2150 to yield, such that the upper boom portion 1104 moves to a deformed position relative to the base mount 1102 and is no longer aligned with the base mount 1102. For example, with reference to the adapters 1150, 2150 shown in FIGS. 4-6, 10, and 11, the strain gauge may likewise be positioned directly on one or both of the first and second coupling plates 1152, 1154 or one or both of the first and second coupling bars 2152, 2154 so as to sense the strain level in one or both of the first and second coupling plates 1152, 1154 or one or both of the first and second coupling bars 2152, 2154. During normal operation of the truck 10, the upper boom portion 104, 1104 experiences vibration and other minor movements that may cause the coupling plates 1152, 1154, or the coupling bars 2152, 2154 to experience strain. These strain levels are relatively low and may be filtered out, e.g., via a low pass filter, so that only values exceeding the predetermined threshold cause the IMS 420 to take action.

One or more of the sensors 420A-420E may detect a change in a position of the upper boom portion 104, 1104 relative to a predetermined reference, in which the change in position exceeding a corresponding predetermined threshold is indicative of the upper boom portion 104, 1104 no longer being aligned with the base mount 102, 1102. For example, one or more of the sensors 420A-420E may comprise an imaging device, such as a camera. The imaging device may be the accessory 300 and/or may include one or more separate imaging devices associated with the upper boom portion 104, 1104, e.g., at the location indicated by sensor 420A in FIGS. 1A and 1B, such that the imaging device is positioned at a predetermined height above the forks 16. A field of view of the imaging device or a portion thereof may define a bounding box extending in a direction parallel to the c and h axes that includes at least a portion of the forks 16 (see FIGS. 1A and 1B). The bounding box includes one or more targets, e.g., one or more landmarks, flags, or markers, associated with the forks 16 or another component of the truck 10, e.g., the load backrest 20 and/or the operator's backrest 34. The one or more targets each have a predefined location in the bounding box. During normal operation of the truck 10, the upper boom portion 104, 1104 experiences vibration and other minor movements that may affect the location of the one or more targets in the bounding box. A reference image may be generated that includes an average of the location(s) of the one or more targets across several images obtained over a time period, which serves as the predetermined reference and establishes a baseline to account for noise and jitter that occur during normal operation of the truck 10. A location of the one or more targets in a current image may be compared to the location of the one or more targets in the reference image, and when a change between the two locations exceeds a predetermined threshold, this change is indicative of the upper boom portion 104, 1104 being subjected to one or more external forces sufficient to cause the adapter 150, 1150, 2150 to yield, such that the upper boom portion 104, 1104 moves to a deformed or deflected position relative to the base mount 102, 1102 and is no longer aligned with the base mount 102, 1102. In some examples with multiple targets, each target may be assigned a weight that is used in determining whether the change exceeds the predetermined threshold, e.g., to account for the presence of a load on the forks 16 that may obstruct one or more of the targets.

Figure 51:
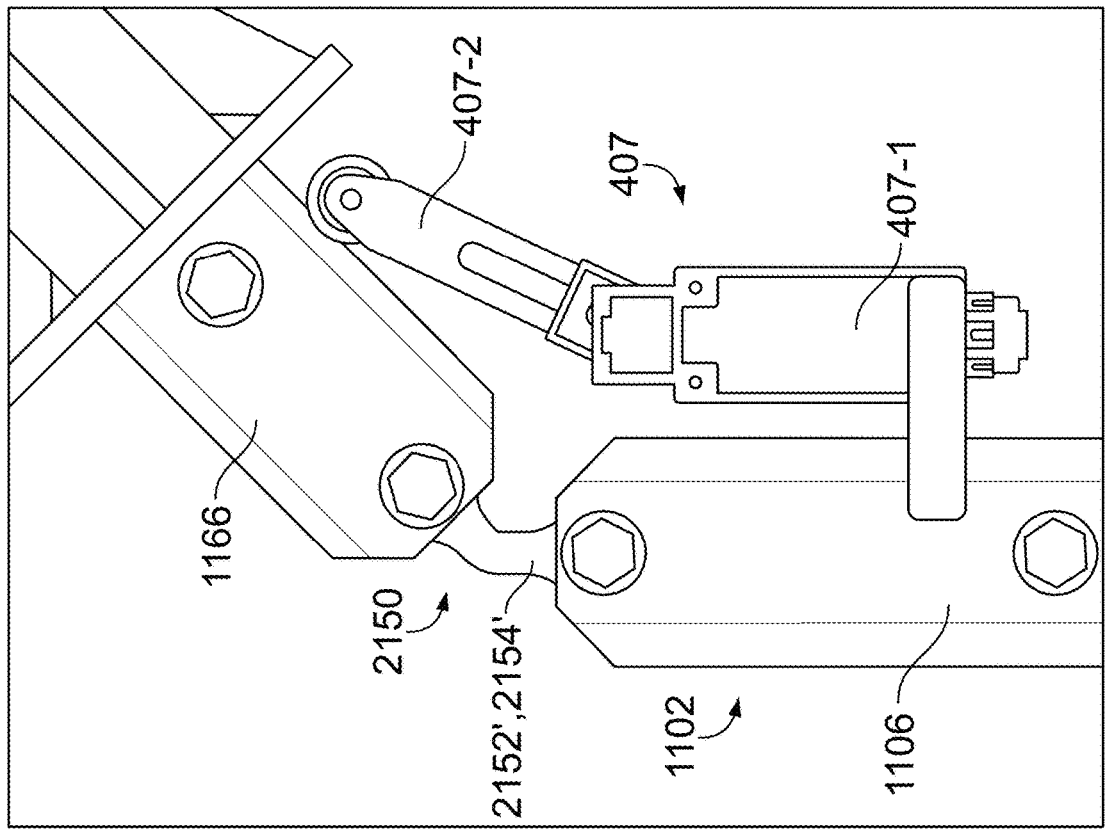
FIGS. 50 and 51 are side views of a portion of a boom assembly and an adapter comprising a limit switch before and after failure in accordance with the present disclosure.
Figure 50:
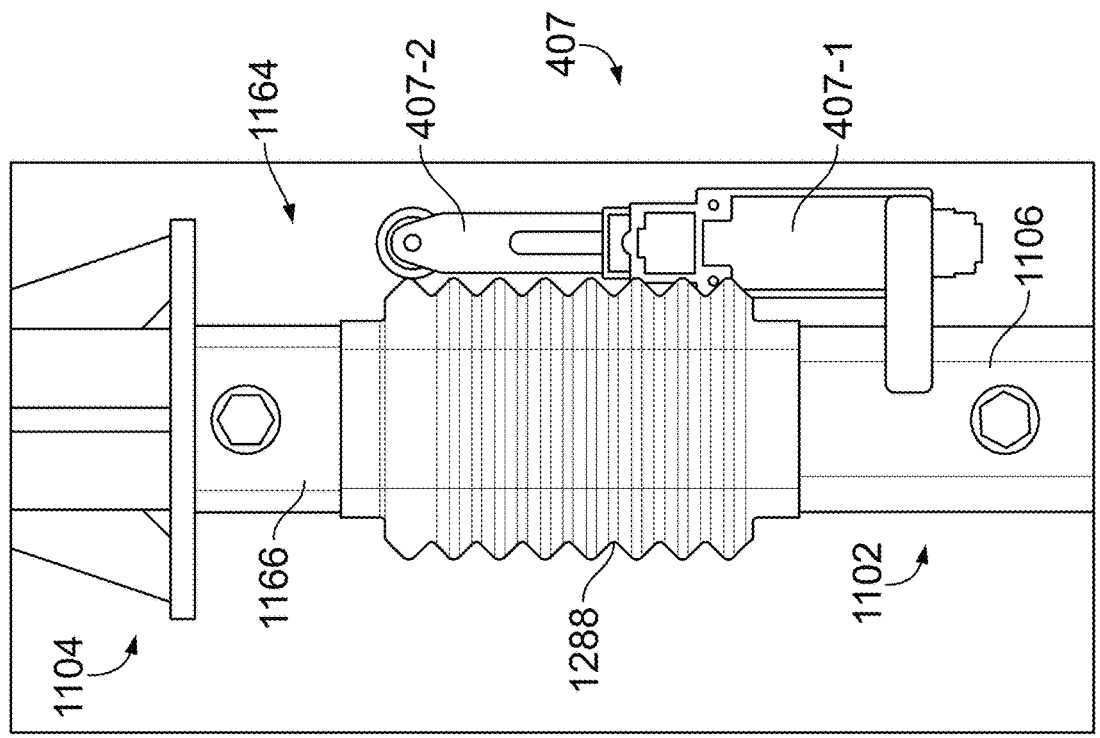

With reference to FIGS. 50 and 51, the one or more sensors 420A-420E (see FIGS. 1A and 1B) that detect a change in a position of the upper boom portion 1104 relative to a predetermined reference may include one or more limit switches 407. In the example shown, the limit switch 407 comprises a main switch body 407-1 and a lever 407-2. The main switch body 407-1 is coupled to the main body 1106 of the base mount 1102 via a bracket (not labeled) or other suitable attachment means, and the lever 407-2 is positioned adjacent to the lower element 1166 of the connector 1164. During normal operation of the truck 10, the lever 407-2 is in an upright position as shown in FIG. 50, which upright position may be used as the predetermined reference. As shown in FIG. 51, when the upper boom portion 1104 deflects relative to the base mount 1102, the lower element 1166 of the connector 1164 contacts, and causes movement of, the lever 407-2 toward a deflected position. The current position of the lever 407-2 is compared to the position of the lever 407-2 during normal operation of the truck 10, and when a difference between the positions exceeds a predetermined threshold, this difference is indicative of the upper boom portion 1104 being subjected to one or more external forces sufficient to cause the adapter 2150 to yield and the coupling bars 2152', 2154' to plastically deform, such that the upper boom portion 1104 moves to a deformed position relative to the base mount 1102 and is no longer aligned with the base mount 1102. For example, the predetermined threshold may be set to a distance corresponding to a deflection of the upper boom portion 1104 relative to the base mount 1102 of 45 degrees, such that detection of a distance exceeding this value is indicative of the upper boom portion 1104 having deflected such that the upper boom portion 1104 is no longer aligned with the base mount 1102. The limit switch 407 may be configured such that movement of the lever 407-2 from the upright position shown in FIG. 50 to the deflected position shown in FIG. 51 causes the limit switch 407 to move from a closed position generating, for example, a high signal, to an open position generating, for example, a low signal. It is also contemplated that a second limit switch (not shown) may be positioned on an opposing side of the main body 1106 of the base mount 1102 to sense deflection of the upper boom portion 1104 in a direction opposite to the direction illustrated in FIG. 51. While the example shown in FIG. 51 includes the adapter 2150 with coupling bars 2152', 2154', the limit switch 407 may also be used with the boom assembly 100 and the adapters 150, 1150 as described herein.

Figure 53:
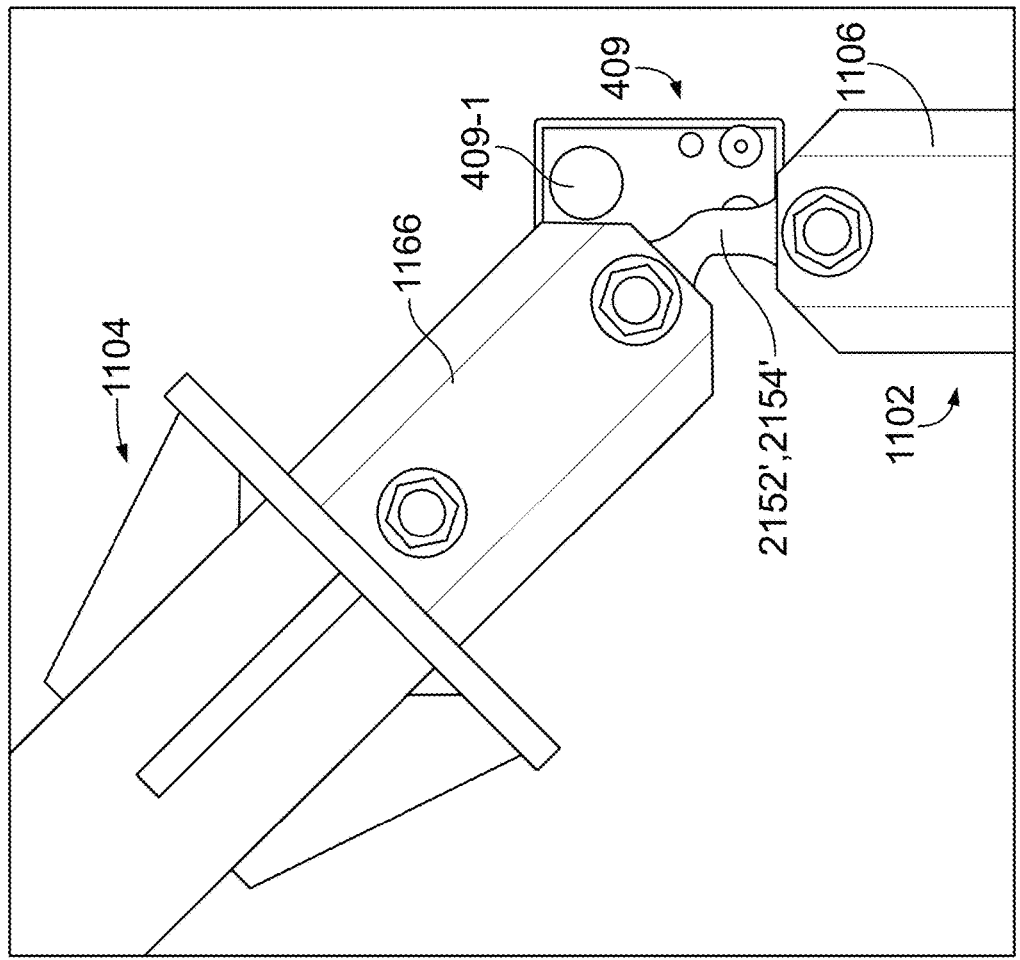
FIGS. 52 and 53 are side views of a portion of a boom assembly and an adapter comprising a proximity sensor before and after failure in accordance with the present disclosure.
Figure 52:
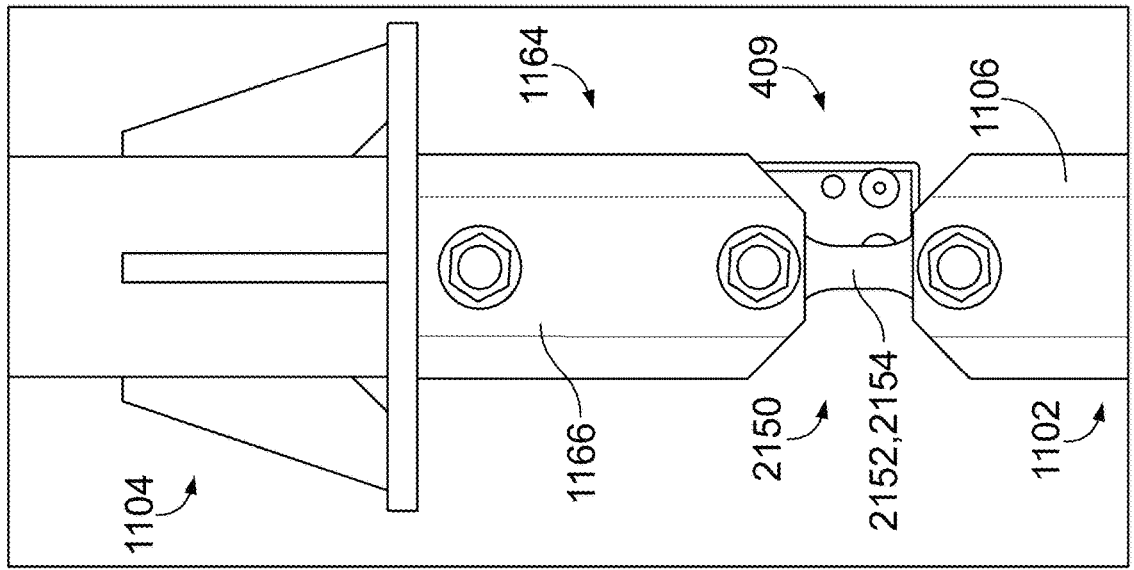

With reference to FIGS. 52 and 53, the one or more sensors 420A-420E (see FIGS. 1A and 1B) that detect a change in a position of the upper boom portion 1104 relative to a predetermined reference may include a proximity sensor. In the example shown, the proximity sensor comprises an optical sensor 409 that is positioned adjacent to the lower element 1166 of the connector 1164. The optical sensor 409 may be coupled to the main body 1106 of the base mount 1102. The optical sensor 409 may comprise an emitter 409-1 that transmits a beam of light (visible or invisible) toward the lower element 1166. During normal operation of the truck 10, the lower element 1166 is located within a path of the light emitted by the emitter 409-1, such that light is reflected back toward the optical sensor 409. In some examples, the optical sensor 409 may also include an internal receiver (not labeled) that receives the reflected light to indicate a presence of the lower element 1166. In other examples, a separate receiver (not shown) may be positioned opposite the emitter 409-1 such as on the lower element 1166, and when the lower element 1166 is in the normal operating position, the beam of light from the emitter 409-1 is sensed by the receiver, such that the separate receiver receives the output from the emitter 409-1 and the presence of the lower element 1166 is indicated. In both examples, the amount of light received may be used as the predetermined reference. When the upper boom portion 1104 deflects relative to the base mount 1102 as shown in FIG. 53, the lower element 1166 is no longer located in the path of the light, such that light is no longer reflected back to the internal receiver in the optical sensor 409 and/or light is no longer received by the separate receiver. When a change in the amount of reflected light and/or received light exceeds a predetermined threshold, this change is indicative of the upper boom portion 1104 being subjected to one or more external forces sufficient to cause the adapter 2150 to yield and the coupling bars 2152', 2154' to plastically deform, such that the upper boom portion 1104 moves to a deformed position relative to the base mount 1102 and is no longer aligned with the base mount 1102. While the example shown in FIG. 51 includes the adapter 2150 with coupling bars 2152', 2154', the limit switch 407 may also be used with the adapter 150, 1150 as described herein. In addition, it may be understood that the proximity sensor may include any type of suitable sensor, including an inductive proximity sensor, a capacitive proximity sensor, a magnetic proximity sensor (e.g., a Hall effect sensor), etc.

The one or more sensors 420A-420E that detect a change in a position of the upper boom portion 104, 1104 relative to a predetermined reference may include an inclination sensor (not shown) that measures an amount of tilt or inclination of the upper boom portion 104, 1104. With reference to FIGS. 1A and 1B, in some examples, the inclination sensor may include at least one first inclination sensor located on the upper boom portion 104, 1104 (e.g., one or more of sensors 420A-420C), in which case the inclination of the upper boom portion 104, 1104 may be measured with respect to gravity. In other examples, the inclination sensor may further include at least one second inclination sensor located on the base mount 102, 1102 or the truck 10 (e.g., sensors 420D and/or 420E), in which case the inclination of the upper boom portion 104, 1104 may be determined based on the position of the first inclination sensor relative to the second inclination sensor. During normal operation of the truck 10, the upper boom portion 104, 1104 has a first angle with respect to gravity or with respect to the second inclination sensor. For example, prior to failure, the upper boom portion 104, 1104 is upright, such that the first angle between the sensor 420C and (i) gravity; or (ii) with respect to sensor 420D should be approximately zero or another initial value. For example, when only a single inclination sensor is provided, the first angle may be calibrated when the truck 10 is not moving and the upper boom portion 104, 1104 is aligned with the base mount 102, 1102. The current angle of the upper boom portion 104, 1104 is compared to the first angle of the upper boom portion 104, 1104 during normal operation of the truck 10, and when a difference between the angles meets or exceeds a predetermined threshold, this difference is indicative of the upper boom portion 104, 1104 being subjected to one or more external forces sufficient to cause the adapter 150, 1150, 2150 to yield, such that the upper boom portion 104, 1104 moves to a deformed position relative to the base mount 102, 1102 and is no longer aligned with the base mount 102, 1102. The signal for the sensed current angle may be filtered to remove noise/jitter. For example, the predetermined threshold may be set to any angle, e.g., an angle of 45 degrees, such that when the difference between the first angle and the current angle meets or exceeds this threshold value, this is indicative of the upper boom portion 104, 1104 having deflected and no longer being aligned with the base mount 102, 1102. If only the first inclination sensor associated with the upper boom portion 104, 1104 is used, the first inclination sensor may incorrectly detect a failure if the truck 10 is traveling along an incline. To prevent the sensor from incorrectly detecting a failure, the predetermined threshold may be set to a greater angle to include a grade limit, e.g., 10 degrees, of the truck 10.

The one or more sensors 420A-420C may detect an acceleration of the upper boom portion 104, 1104, in which the acceleration exceeding a corresponding predetermined threshold is indicative of the upper boom portion 104, 1104 being subjected to one or more external forces sufficient to cause the adapter 150, 1150, 2150 to yield, such that the upper boom portion 104, 1104 moves to a deformed position relative to the base mount 102, 1102 and is no longer aligned with the base mount 102, 1102. For example, with reference to FIG. 49, one or more of the sensors 420A-420C may comprise an accelerometer 403 that is associated with the upper boom portion 1104, e.g., attached to the lower element 1166 of the connector 1164, and may measure the acceleration of the upper boom portion 104, 1104 in one or more axes. In an example, the accelerometer 403 may generate acceleration signals used by a processor on the truck 10 (e.g., microprocessor 510 shown in FIG. 48) to generate acceleration values, from which the processor can determine if the adapter 150, 1150, 2150 has yielded or failed. Because the upper boom portion 104, 1104 is very rigid, the accelerometer 403 may be mounted anywhere along the length of the upper boom portion 104, 1104 and generate signals sufficient to detect adapter failure. The accelerometer 403 on the upper boom portion 104, 1104 senses the total acceleration of the upper boom portion 104, 1104 relative to ground.

Figure 54:
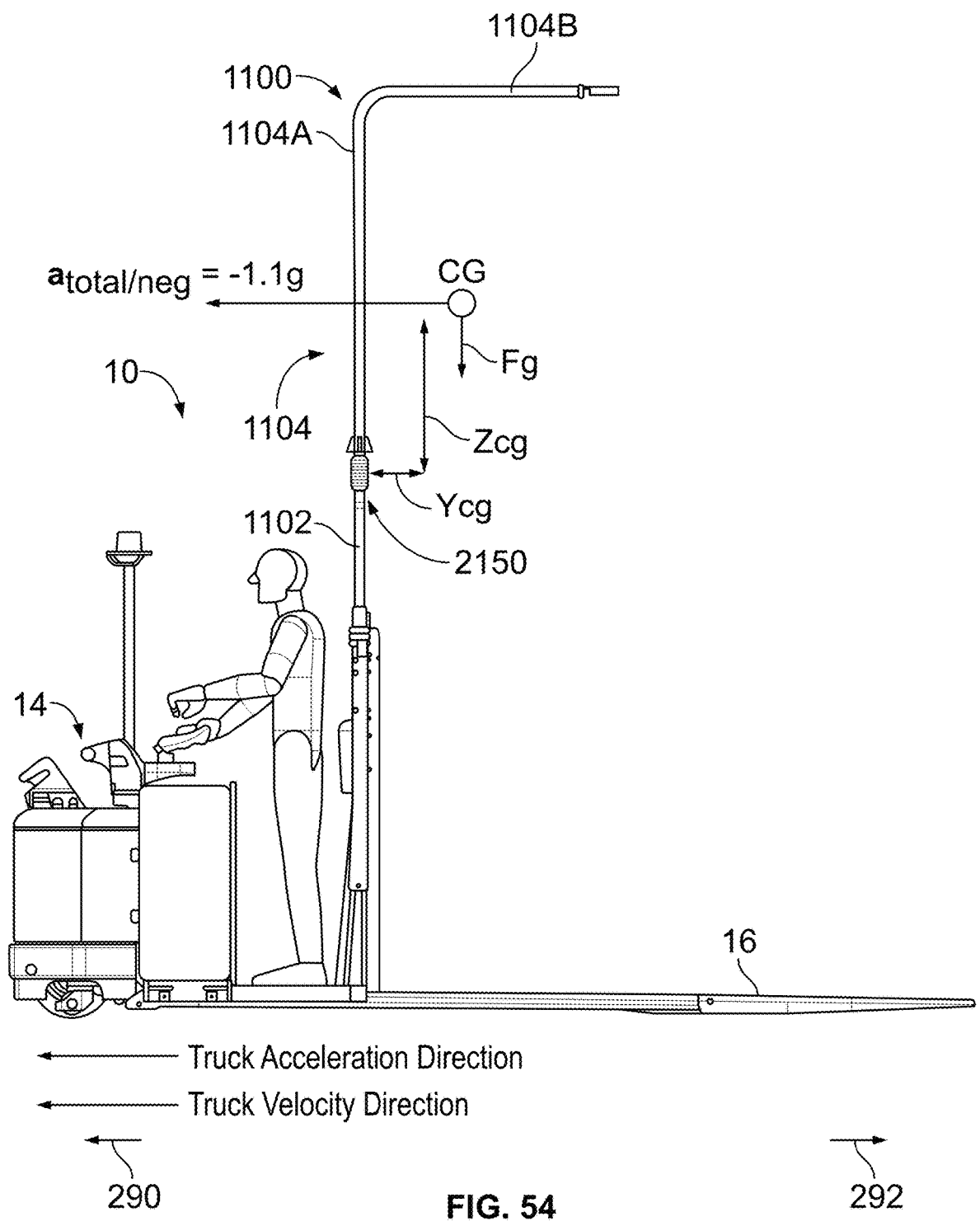
FIGS. 54-60 are side views of a materials handling vehicle comprising a boom assembly with an adapter in accordance with the present disclosure.
Figure 56:
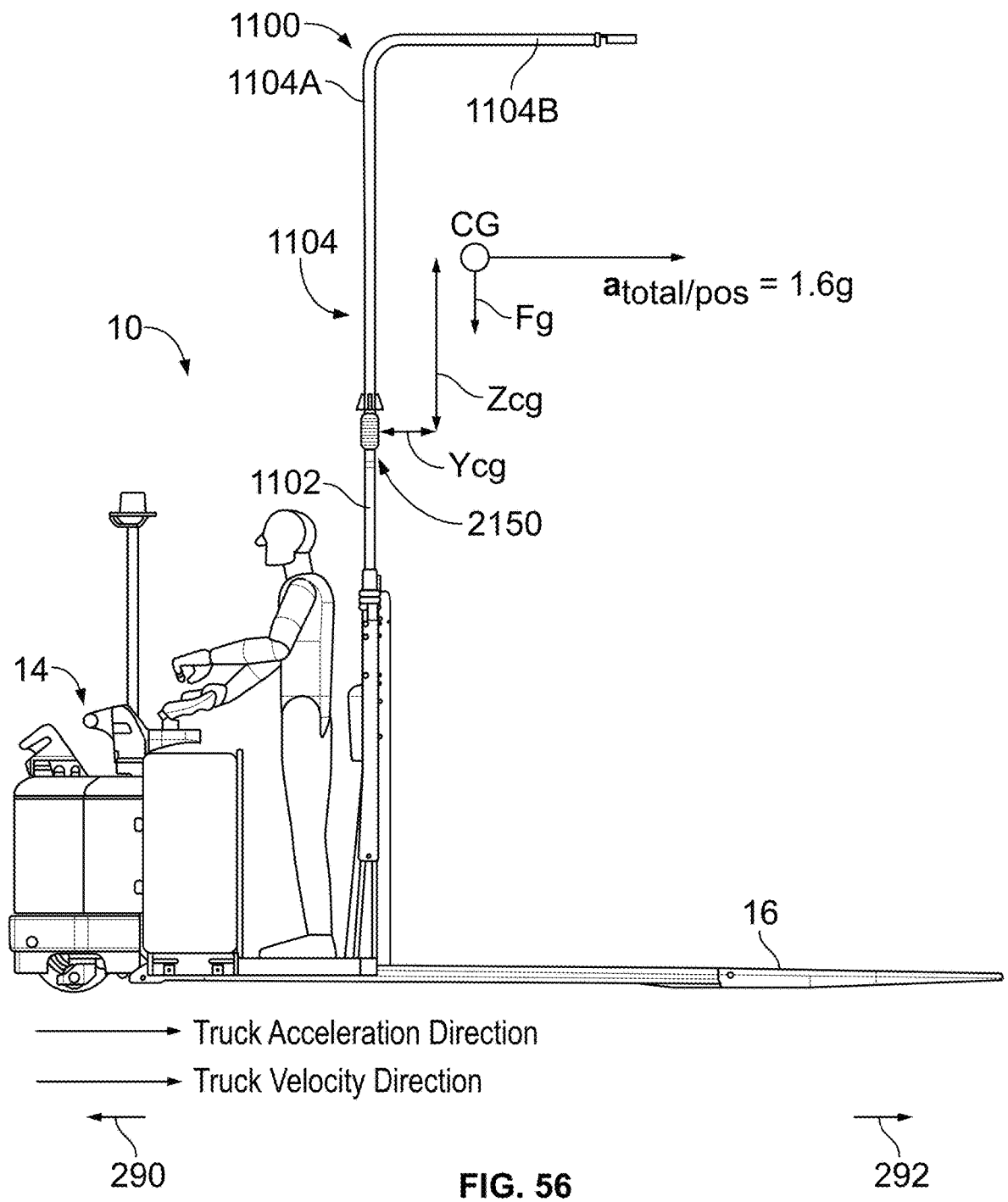

With reference to the example shown in FIGS. 54 and 56, acceleration of the upper boom portion 1104 may occur when the truck 10 accelerates in either a power unit first direction 290 or a forks first direction 292. Forces acting on the upper boom portion 1104 causing it to accelerate may include a force applied by the truck 10 to the upper boom portion 1104 during acceleration of the truck 10, a force applied by the truck 10 to the upper boom portion 1104 during deceleration of the truck 10, and an impact force striking the upper boom portion 1104. If the total acceleration of the upper boom portion 1104 is greater than a threshold total acceleration, the adapter 2150 will fail. If the magnitude of the total deceleration of the upper boom portion 1104 is greater than a magnitude of a threshold total acceleration, the adapter 2150 will fail. Although the following description is provided with respect to the adapter 2150 comprising the first and second coupling bars 2152, 2154, it may be understood that similar calculations may be performed for the adapter 150 comprising the first and second shear pins 180, 182 (see FIG. 8) and the adapter 1150 comprising the first and second coupling plates 1152, 1154 (see FIG. 16).

Figure 55:
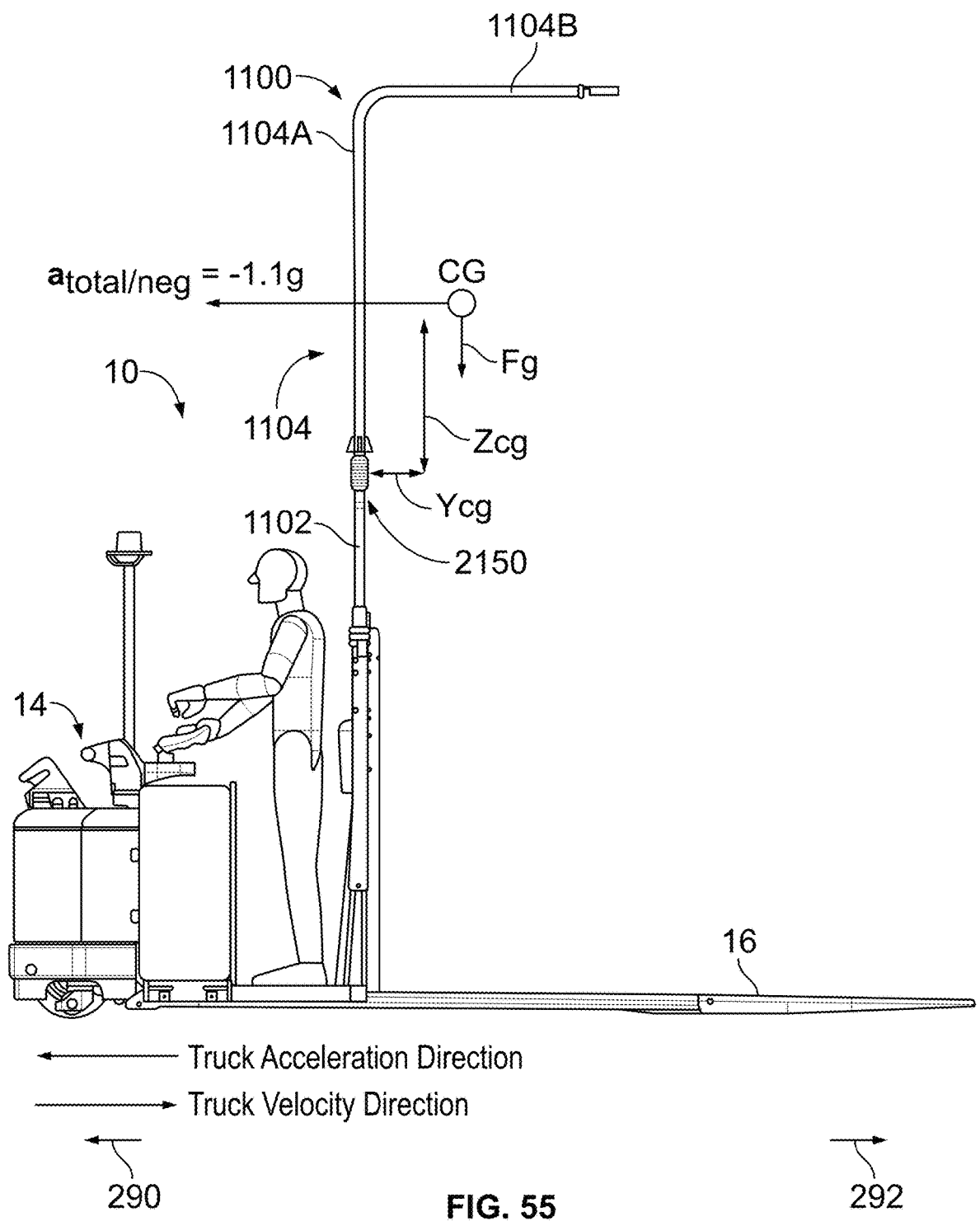

With reference to FIGS. 54 and 55, it is possible to estimate a first threshold total acceleration $a_{TotalNeg}$, when the total acceleration of the upper boom portion 1104 is in the power unit first direction 290 or the total deceleration of the upper boom portion 1104 is in the forks first direction 292 (i.e., acceleration in the power unit first direction), sufficient to cause failure of the adapter, using the following Equation (10) for moments occurring at the adapter 2150, in which the adapter 2150 comprises the first and second coupling bars 2152, 2154:

$$(0.5)m_{upper}a_{TotalNeg}(z_{cg}) = \sigma Z - (0.5)F_g y_{cg}$$

Figure 57:
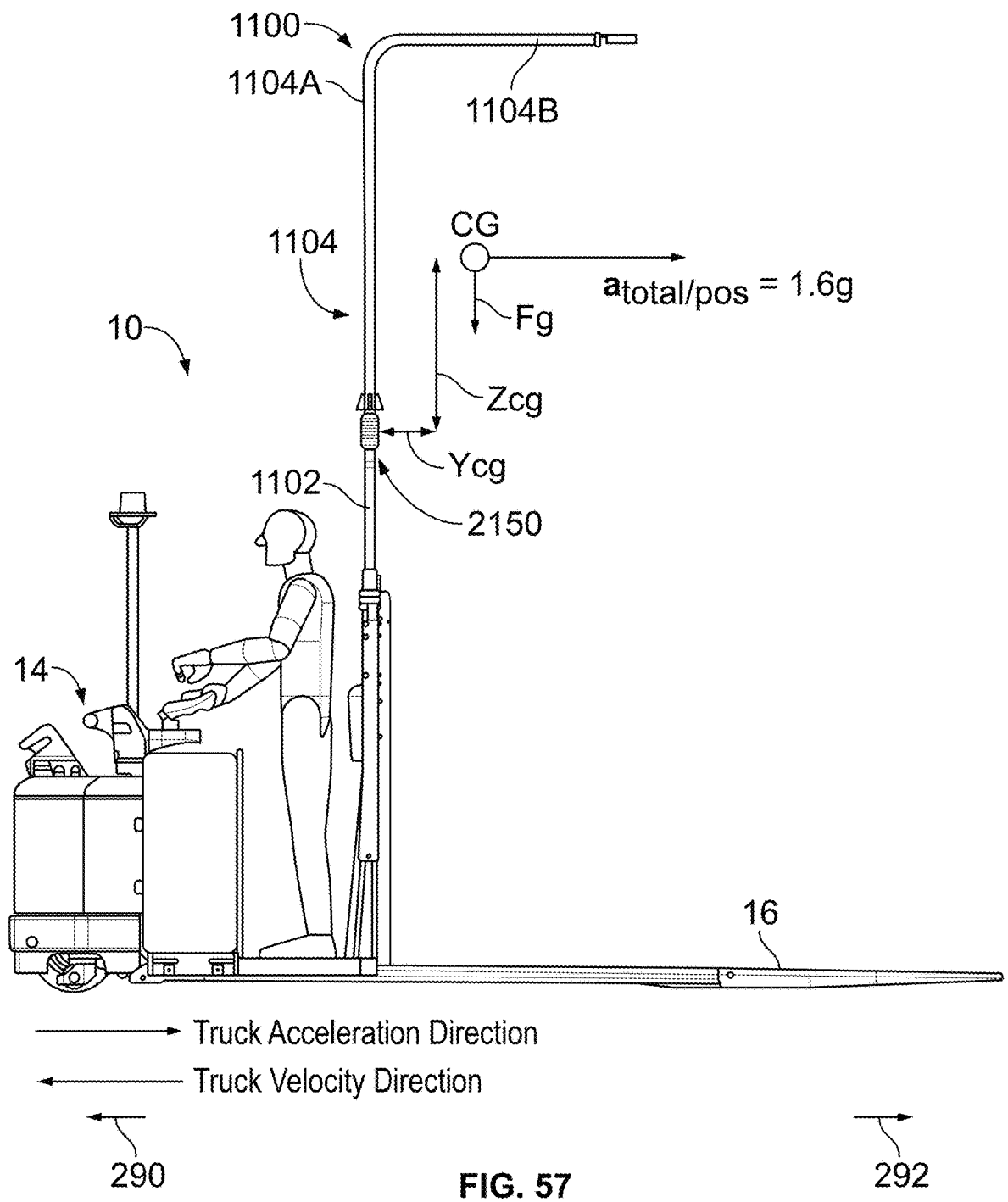

With reference to FIGS. 56 and 57, it is possible to estimate a second threshold total acceleration $a_{TotalPos}$, when the total acceleration of the upper boom portion 1104 is in the forks first direction 292 or the total deceleration of the upper boom portion 1104 is in the power unit first direction 290 (i.e., acceleration in the forks first direction 292), sufficient to cause failure of the adapter 2150, using the following Equation (11) for moments occurring at the adapter 2150, in which the adapter 2150 comprises the first and second coupling bars 2152, 2154:

$$(0.5)m_{upper}a_{TotalPos}(z_{cg}) = \sigma Z + (0.5)F_g y_{cg}$$

in which
$z_{cg}$ is a lever arm extending from a center of gravity CG of the upper boom portion 1104 normal to a plane formed by axes c and h and containing an axis passing through the centers $C_{2152}$, $C_{2154}$ of the first and second coupling bars 2152, 2154 (see FIG. 46);
$y_{cg}$ is a lever arm extending from the center of gravity CG of the upper boom portion 1104 to the first section 1104A of the upper boom portion 1104 and is parallel to axis h;
$F_g$=Force (N) generated by the weight of the upper boom portion 1104;
$m_{upper}$=mass (kg) of the upper boom portion 1104;
Z=section modulus of one bar 2152 or 2154; and
σ=bending stress of one bar 2152 or 2154.

In the above Equations (10) and (11), the first term ((0.5) $F_g y_{cg}$) is a moment of a force $F_g$ from half of the weight of the upper boom portion 1104. The second term ((0.5) $m_{upper}a_{upper}(z_{cg})$) is a moment resulting from half of the mass of the upper boom portion 1104 accelerating due to the truck 10 accelerating and causing the upper boom portion 1104 to accelerate and/or an impact force striking the upper boom portion 1104 causing the upper boom portion 1104 to accelerate.

The bending stress a may be set equal to a yield strength of the material from which each of the coupling bars 2152, 2154 is formed, such as a specific grade of steel from which each coupling bar 2152, 2154 is formed. Yield strengths for such materials are well known. When the bending stress a occurring in each one of the coupling bars 2152, 2154 equals the yield strength $\sigma_{yield\ strength}$ of the material from which each coupling bar 2152, 2154 is formed, each coupling bar 2152, 2154 will fail or yield, i.e., permanently deform or bend. The section modulus Z can be calculated from the geometry of each coupling bar 2152, 2154 and, in the illustrated embodiment, is determined using Equation (7) above, which is set out again below:

$$Z_{Bar} = \frac{W * A_{bar}}{6}$$

The width W for the middle section 2170 of the first coupling bar 2152 equals width $W_{2170}$ shown in FIG. 21, and the width W for the middle section 2172 of the second coupling bar 2154 equals width $W_{2172}$ shown in FIG. 19. The cross-sectional area $A_{bar}$ for the middle section 2170 of the first coupling bar 2152 may be determined by multiplying the width $W_{2170}$ of the middle section 2170 of the first coupling bar 2152 by the depth $D_{2170}$ (see FIG. 19) of the middle section 2170 of the first coupling bar 2152. The cross-sectional area $A_{bar}$ of the middle section 2172 for the second coupling bar 2154 may be determined by multiplying the width $W_{2172}$ of the middle section 2172 of the second coupling bar 2152 by the depth $D_{2172}$ of the middle section 2172 of the second coupling bar 2154 (see FIG. 19).

Equation (10) is solved for the first threshold total acceleration $a_{TotalNeg}$ causing the adapter 2150 to fail when the total acceleration of the upper boom portion 1104 is in a direction towards the power unit 14 and equal to the first threshold total acceleration such that the upper boom portion 1104 fails and rotates in a clockwise direction, as viewed in FIG. 54. Each of the coupling bars 2152, 2154 will fail when the total acceleration measured by the accelerometer 403 (see FIG. 49) is in the power unit first direction 290 and equal to or greater than the first threshold total acceleration $a_{TotalNeg}$. Each of the coupling bars 2152, 2154 will also fail when the total deceleration measured by the accelerometer 403 is in the forks first direction 292 (i.e., acceleration in the power unit first direction 290) and the magnitude of the deceleration is equal to or greater than the magnitude of the first threshold total acceleration $a_{TotalNeg}$.

Equation (11) is solved for the second threshold total acceleration $a_{TotalPos}$ causing the adapter 2150 to fail when the total acceleration of the upper boom portion 1104 is in a direction towards the forks 16 and equal to the second threshold total acceleration such that the upper boom portion 1104 rotates in a counter-clockwise direction, as viewed in FIG. 56. Each of the coupling bars 2152, 2154 will fail when the acceleration measured by the accelerometer 403 is in the forks first direction 292 and equal to or greater than the second threshold total acceleration $a_{TotalPos}$. Each of the coupling bars 2152, 2154 will also fail when the total deceleration measured by the accelerometer 403 is in the power unit first direction 290 (i.e., acceleration in the forks first direction 292) and the magnitude of the deceleration is equal to or greater than the magnitude of the second threshold total acceleration $a_{Totalpos}$.

In an example, it is presumed that the threshold total acceleration $a_{TotalNeg}$ is calculated using Equation (10) to equal −1.1 g, where "g" is the acceleration due to gravity or 9.8 meter/second². When the total acceleration of the upper boom portion 1104 is negative and has a magnitude equal to or greater than 1.1 g, the processor determines that the adapter 2150 has failed. Acceleration in the power unit first direction 290 is defined as being negative.

In a further example, it is presumed that the threshold total acceleration $a_{TotalPos}$ is calculated using Equation (11) to equal 1.6 g. When the total acceleration of the upper boom portion 1104 is positive and has a magnitude equal to or greater than 1.6 g, the processor determines that the adapter 2150 has failed.

Based on signals from a traction control module on the truck 10, the processor on the truck 10 knows if the truck 10 is accelerating in a direction toward the power unit 14 or the forks 16. Prior to an impact force striking the upper boom portion 1104, the upper boom portion 1104 is accelerating in the same direction as the truck 10. When an impact force strikes the upper boom portion 1104, the impact force accelerates the upper boom portion 1104.

The accelerometer 403 is initially calibrated regarding sign. The accelerometer 403 can be calibrated to assign a positive sign to acceleration values sensed when the upper boom portion 1104 is accelerating in the forks first direction 292 or decelerating in the power unit first direction 290. The accelerometer 403 can also be calibrated to assign a negative sign to acceleration values sensed when the upper boom portion 1104 is accelerating in the power unit first direction 290 or decelerating in the forks first direction 292.

Figure 58:
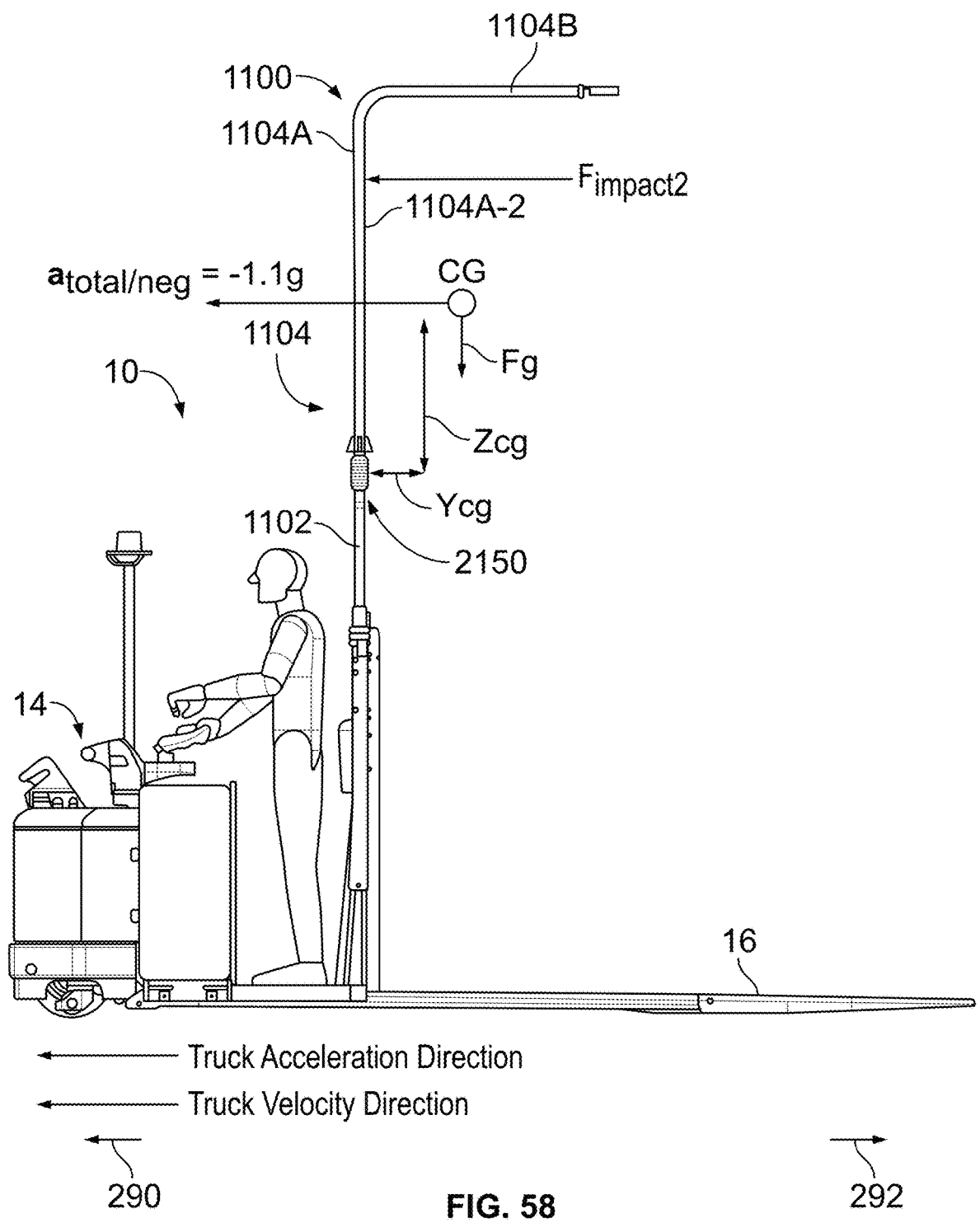

In an example, in FIG. 58, the truck 10 is accelerating in the power unit first direction 290. An impact force $F_{impact2}$ strikes the second wall 1104A-2 of the first section 1104A of the upper boom portion 1104 and accelerates the upper boom portion 1104 in the direction toward the power unit 14. The total acceleration on the upper boom portion 1104 is sensed by the accelerometer 403 to be −1.1 g. Since the total acceleration sensed by the accelerometer 403 is negative, the processor compares the magnitude of the total acceleration value to the magnitude of the first threshold total acceleration $a_{TotalNeg}$, which, in this example, is 1.1 g. Since the magnitude of the sensed total acceleration of the upper boom portion 1104 equals 1.1 g, which equals the magnitude of the first threshold total acceleration $a_{TotalNeg}$, namely, 1.1 g, the processor indicates that the adapter 2150 has yielded or failed.

Figure 59:
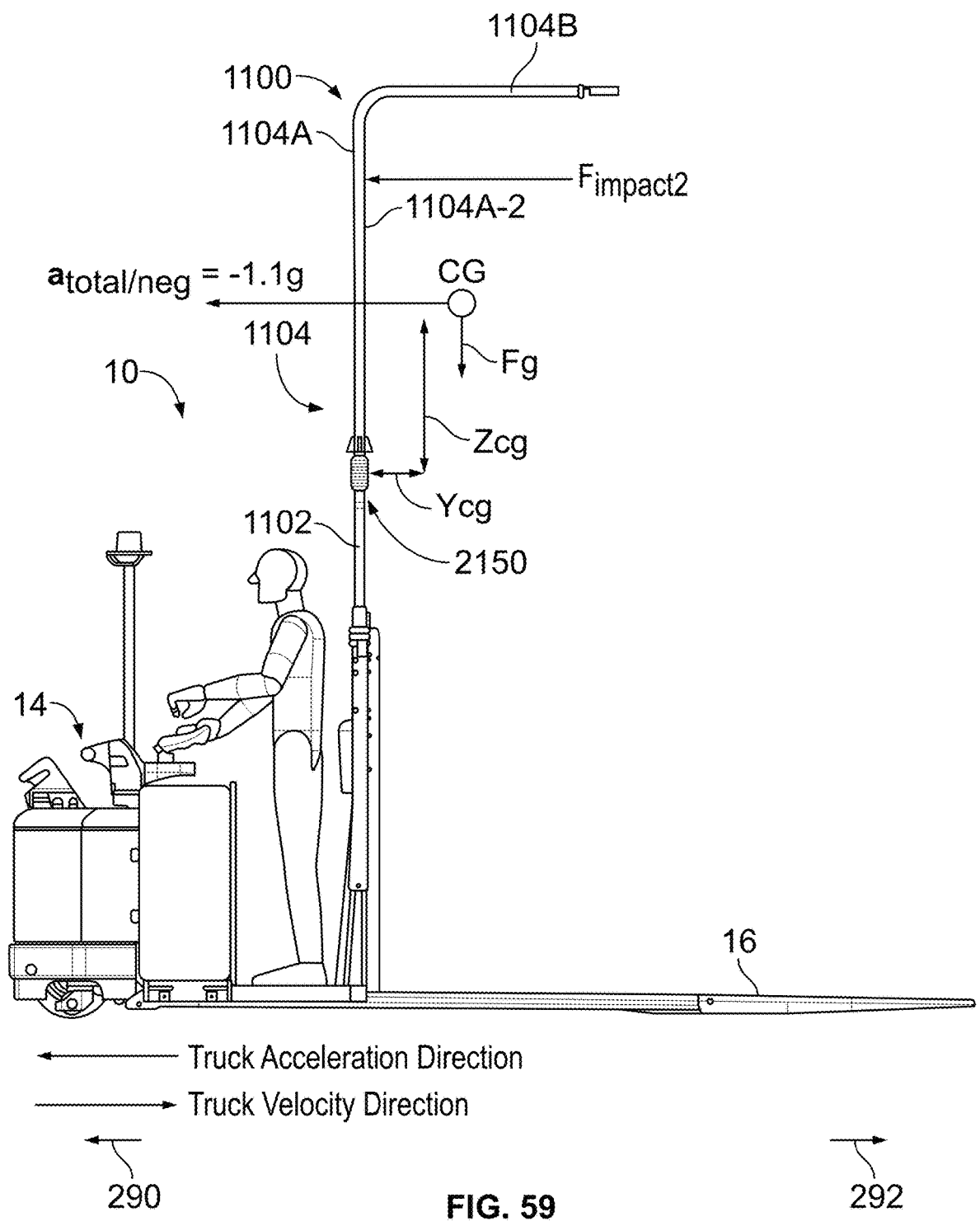

In an example, in FIG. 59, the truck 10 is decelerating in the forks first direction 292 (i.e., accelerating in the power unit first direction 290). An impact force $F_{impact2}$ strikes the second wall 1104A-2 of the first section 1104A of the upper boom portion 1104 and accelerates the upper boom portion 1104 in the direction toward the power unit 14. The total deceleration on the upper boom portion 1104 is sensed by the accelerometer 403 to be an acceleration in the opposite direction to vehicle velocity having a value of −1.1 g (the acceleration is negative since acceleration in the power unit first direction 290 is defined as negative). Since the total acceleration sensed by the accelerometer 403 is negative, the processor compares the magnitude of the total acceleration value to the magnitude of the first threshold total acceleration $a_{TotalNeg}$, which, in this example, is 1.1 g. Since the magnitude of the sensed total acceleration of the upper boom portion 1104 equals 1.1 g, which equals the magnitude of the first threshold total acceleration $a_{TotaNeg}$, namely, 1.1 g, the processor indicates that the adapter 2150 has yielded or failed.

Figure 60:
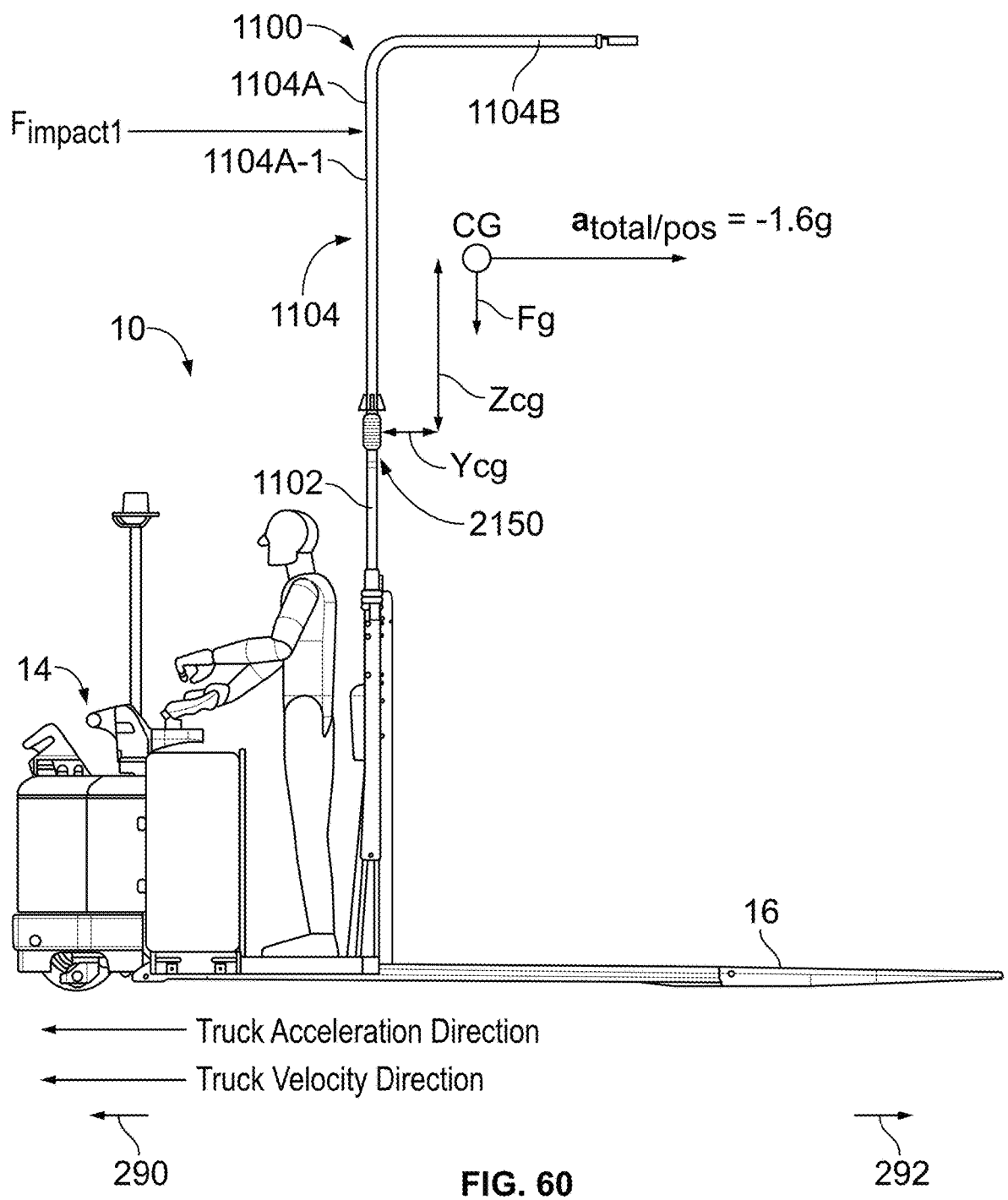

In another example, in FIG. 60, the truck 10 is accelerating in the power unit first direction 290. An impact force $F_{impact1}$ strikes the first wall 1104A-1 of the first section 1104A of the upper boom portion 1104 and accelerates the upper boom portion 1104 in the direction toward the forks 16. The accelerometer 403 senses a total acceleration of the upper boom portion 1104, which is 1.6 g (in the forks first direction 292). Since the total acceleration sensed by the accelerometer 403 is positive, the processor compares the magnitude of the total acceleration value to the magnitude of the second threshold total acceleration $a_{Totalpos}$, which, in this example, is 1.6 g. Since the magnitude of the sensed total acceleration of the upper boom portion 1104 equals 1.6 g, which equals the magnitude of the second threshold total acceleration $a_{Totalpos}$, namely, 1.6 g, the processor determines that the adapter 2150 has yielded or failed.

It is also contemplated that acceleration values along the c and v axes (see FIGS. 1A and 1B) may be monitored and thresholds corresponding to yielding or failure of the adapter 2150 may similarly be determined.

Figure 61:
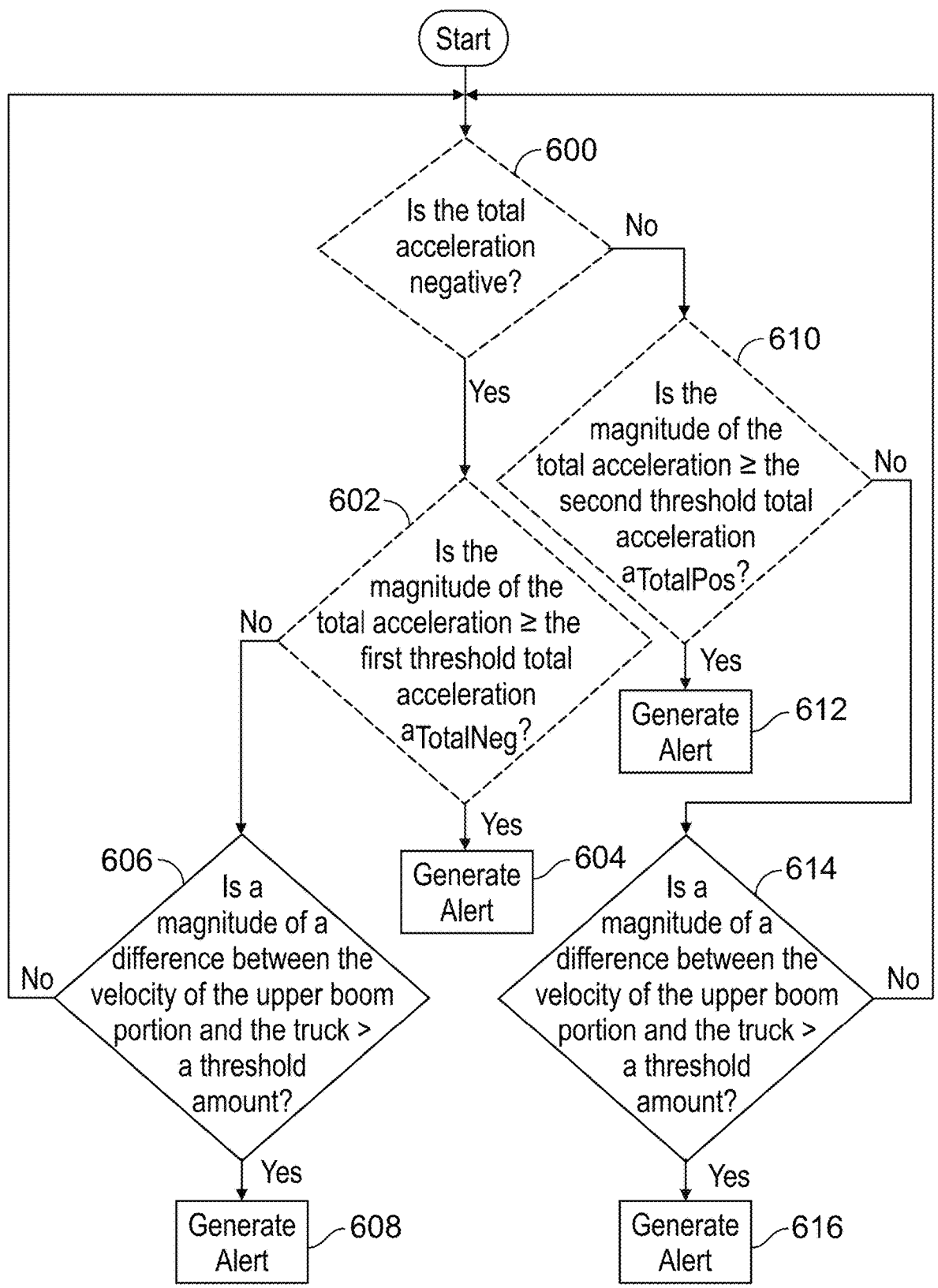
FIG. 61 is a flowchart illustrating an exemplary process for determining whether an adapter has failed in accordance with the present disclosure.

As indicated in the flowchart illustrated in FIG. 61, the processor, at 600, determines if a total acceleration of the upper boom portion 1104 as sensed by the accelerometer 403 is negative. If yes, the processor determines at 602 if the magnitude of the total acceleration of the upper boom portion 1104 is greater than or equal to the first threshold total acceleration $a_{Totalneg}$. If yes, the processor at 604 generates an alert indicating that the adapter 2150 has failed or yielded. If the total acceleration of the upper boom portion 1104 is less than the first threshold total acceleration $a_{TotalNeg}$, the processor at 606 compares the velocity of the upper boom portion 1104, which can be determined by integrating the acceleration values determined from the acceleration signals generated by the accelerometer 403, with the truck velocity, which truck velocity the processor may access from a traction control module 428 (see FIG. 47B) on the truck 10. If a magnitude of a difference between the velocity of the upper boom portion 1104 and the velocity of the truck 10 is greater than a threshold amount to filter out noise or jitter, the processor generates at 608 an alert indicating that the adapter 2150 has failed or yielded. If the magnitude of the difference between the velocity of the upper boom portion 1104 and the velocity of the truck 10 is not greater than the threshold amount, the processor returns to 600.

If the processor determines at 600 that the total acceleration of the upper boom portion 1104 as sensed by the accelerometer 403 is not negative, then the processor at 610 determines if the magnitude of the total acceleration of the upper boom portion is greater than or equal to the second threshold total acceleration $a_{TotalPos}$. If yes, the processor at 612 generates an alert indicating that the adapter 2150 has failed or yielded. If the total acceleration of the upper boom portion 1104 is less than the second threshold total acceleration $a_{TotalPos}$, the processor at 614 compares the velocity of the upper boom portion 1104 with the truck velocity. If the magnitude of the difference between the velocity of the upper boom portion 1104 and the velocity of the truck 10 is greater than a threshold amount to filter out noise/jitter, the processor generates at 616 an alert indicating that the adapter 2150 has failed or yielded. If the magnitude of the difference between the velocity of the upper boom portion 1104 and the velocity of the truck 10 is not greater than the threshold amount, the processor returns to 600.

It may be possible to implement a process in which the processor uses only the magnitude of the difference between the velocity of the upper boom portion 1104 and the velocity of the truck 10, e.g., using only 606 and 614 without 600, 602, and 610. However, it may be advantageous to use the entire process shown in FIG. 61, including 600, 602, and 610, as these steps may provide a faster response time. It is further contemplated that the processor may use only the comparison between the magnitude of the total acceleration of the upper boom portion 1104 and the first or second threshold total accelerations, e.g., using only 600, 602, and 610, which may be advantageous because these steps may provide a faster response time and use fewer computational resources. However, it is possible that an impact force on a truck 10 occurring over a long period of time may not be detected with a process using only 600, 602, and 610.

In all examples of the sensors 420A-420E described herein, the sensors 420A-420E each detect the corresponding parameter(s) and generate one or more signals based on detecting the corresponding parameter(s). The IMS 420 comprises one or more controllers that are configured to receive the signals, e.g., via the network bus 432 depicted in FIG. 47B. In some examples, the one or more controllers may include the computer system 500 that implements one or more of the modules 424, 426, 428, 430 depicted in FIG. 47B.

The one or more controllers are configured to determine, based on the at least one signal, that the upper boom portion 104, 1104 has deflected relative to the base mount 102, which deflection results from one or more external forces causing the adapter 150, 1150, 2150 to yield. For example, as described herein, each parameter detected by the sensors 420A-420E may be associated with a corresponding predetermined threshold, and determining that the upper boom portion 104, 1104 has deflected relative to the base mount 102, 1102 may comprise comparing a current value for the parameter to the corresponding predetermined threshold for the parameter. In the case of the limit switch 407, the signal may also include an indication that the lever 407-2 has moved from the upright, closed position shown in FIG. 50 to the deflected, open position shown in FIG. 51.

In response to determining that the upper boom portion 104, 1104 is subjected to one or more external forces sufficient to cause the adapter 150, 1150, 2150 to yield, the one or more controllers may generate an alert. In some examples, the alert may be transmitted to the remote sever, e.g., via the transceiver 402 shown in FIG. 47A. Alternatively, or in addition to, the alert, the one or more controllers may generate an error code in response to determining that the upper boom portion 104, 1104 is subjected to one or more external forces sufficient to cause the adapter 150, 1150, 2150 to yield.

Following a determination that the upper boom portion 104, 1104 is subjected to one or more external forces sufficient to cause the adapter 150, 1150, 2150 to yield, it may be desirable to limit operation of the truck 10 to prevent or minimize damage to the truck 10, the base mount 102 and the upper boom portion 104, the accessory 300, and/or adjacent personnel or objects caused by the upper boom portion 104, 1104 potentially being in the deformed position. As shown in FIG. 39, the operator generally faces away from the boom assembly 100, 1100 and may be unaware that the upper boom portion 104, 1104 has deflected. In one example, based on the error code, the IMS 420 may transmit one or more signals, e.g., to the steer control module 424, the traction control module 428, and/or the lift control module 430 shown in FIG. 47B, that cause the brake 436 to activate and/or causes operation of at least one of the steer motor 434, the traction motor 440, or the lift motor 444 to be altered. Activation of the brake 436 stops rotation of the drive wheel 22 (see FIG. 39) to reduce the speed of the truck 10. Altering operation of the steer motor 434 may include limiting a maximum steer angle and/or a rate of turning to prevent the truck 10 from making a sharp turn with the upper boom portion 104, 1104 in the deformed position. Altering operation of the lift motor 444 may include disabling lift functions, such that the load handling assembly 12 can only be lowered to prevent interference with the upper boom portion 104, 1104 in the deformed position. Alternatively, altering operation of the steer motor 434, the traction motor 440, and/or the lift motor 444 may include opening the main contactor 438, which shuts off power to the steer motor 434, the traction motor 440, and the lift motor 444.

The one or more controllers may also be configured to transmit a signal that causes the user interface 442 to display an indication of the error code. The indication may include one or more of a symbol or graphic, a light, an audible tone, etc. and may notify the operator that a potential failure has been detected and that the upper boom portion 104, 1104 may be in the deformed position.

Figure 62:
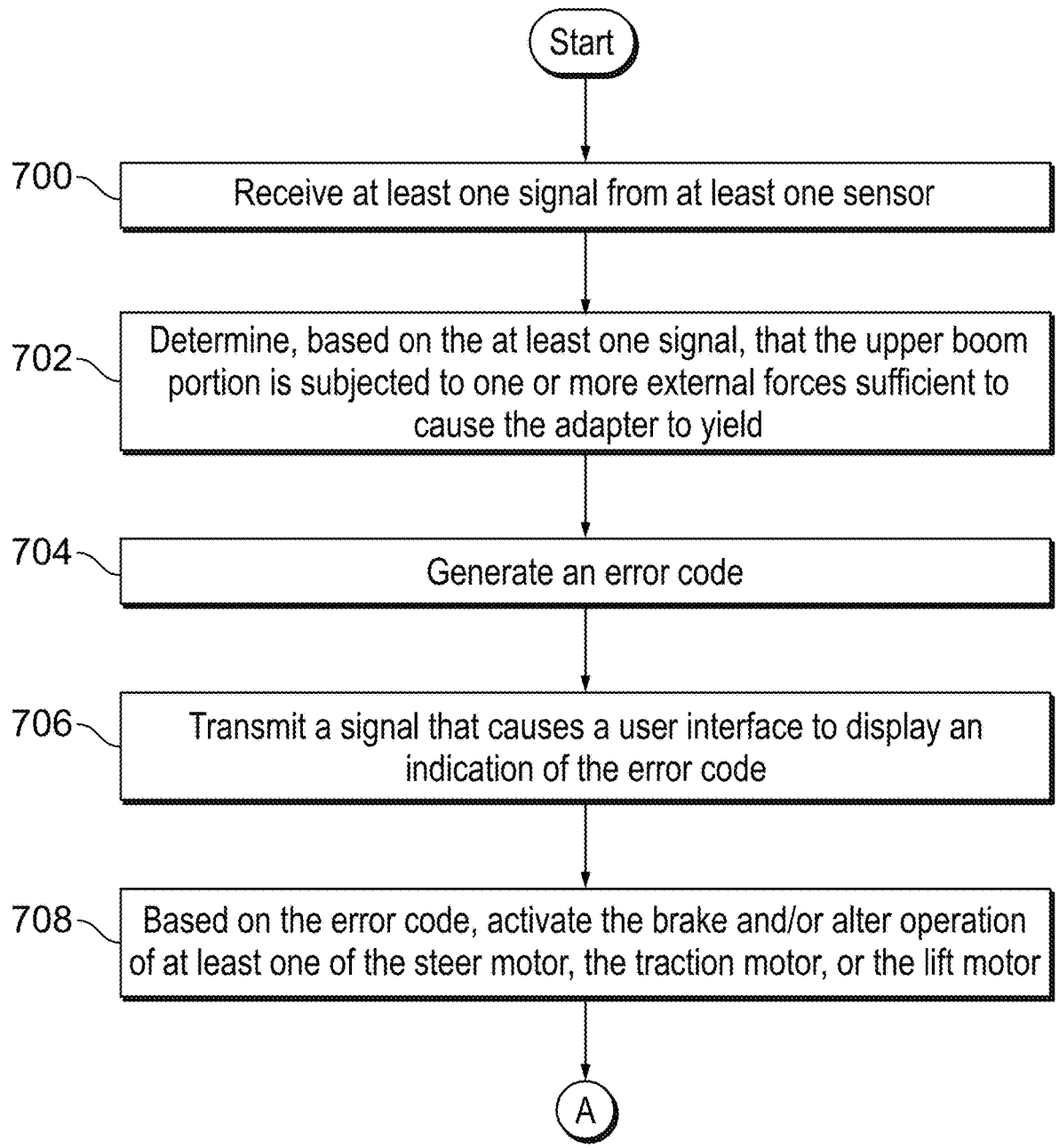
FIGS. 62-64 are flowcharts illustrating exemplary processes of controlling a materials handling vehicle in accordance with the present disclosure.

With reference to FIG. 62, at 700, the at least one controller receives at least one signal from at least one sensor 420A-420E (see FIGS. 1A and 1), and at 702, the at least one controller, determines, based on the at least one signal, that the upper boom portion 104, 1104 is subjected to one or more external forces sufficient to cause the adapter 150, 1150, 2150 to yield. At 704, the at least one controller may generate an error code. In one example, at 706, the at least one controller may transmit a signal that causes a user interface of the truck 10 to display an indication of the error code. In another example in which the truck 10 comprises a brake 436, a steer motor 434, a traction motor 440, and a lift motor 444 as described herein, the brake 436 may be activated and/or operation of at least one of the steer motor 434, the traction motor 440, or the lift motor 444 may be altered based on the error code, at 708.

Figure 63:
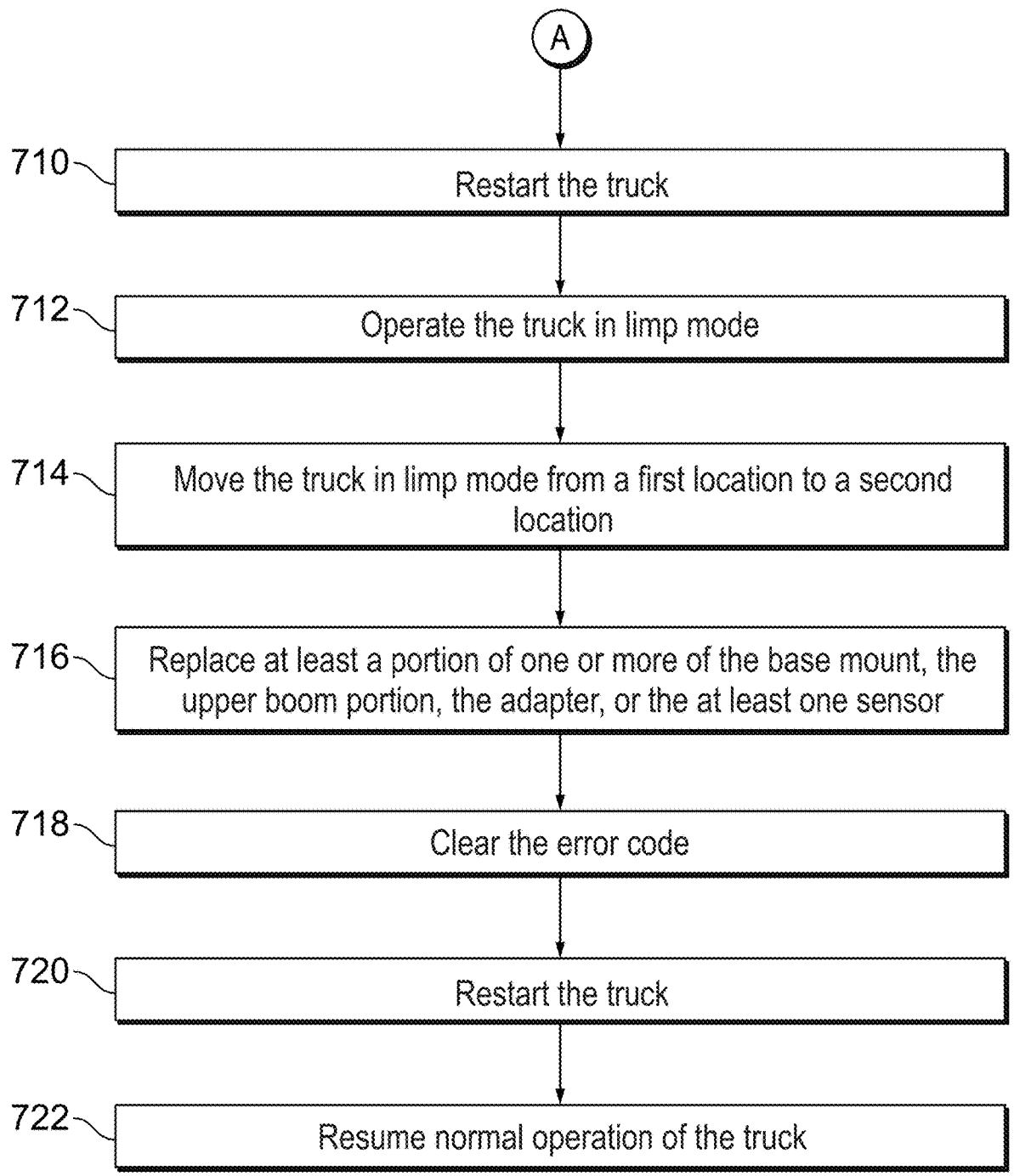

In one example, as shown in FIG. 63, following the truck 10 being shut off, the truck 10 may be restarted immediately (i.e., prior to clearing the error code) at 710. The truck 10 is then operated in a "limp mode" at 712, where the speed of the truck 10 is limited, e.g., <1 mph. At 714, the truck 10 is moved in limp mode from a first location, e.g., a location near where the impact occurred and the traction motor 440 was shut off, to a second location, a location that is out of a path of travel of other trucks or a service location. The boom assembly 100, 1100 and/or the truck 10 may be inspected for damage, and at 716, at least a portion of the base mount 102, 1102, the upper boom portion 104, 1104, the adapter 150, 1150, 2150, and/or the sensor(s) 420A-420E may be replaced. Following installation of the upper boom portion 104, 1104, the error code may be cleared at 718. In some examples, the error code may be cleared automatically upon replacement or installation of the upper boom portion 104, 1104 and restarting of the truck 10. In other examples, the error code may be cleared by resetting the sensor 420A-420E, e.g., moving the lever 407-2 of the limit switch 407 back to the upright position (see FIGS. 50 and 51). Following clearing of the error code, the truck 10 is restarted at 720, and normal operation of the truck 10 may be resumed at 722, after which the process may terminate.

Figure 64:
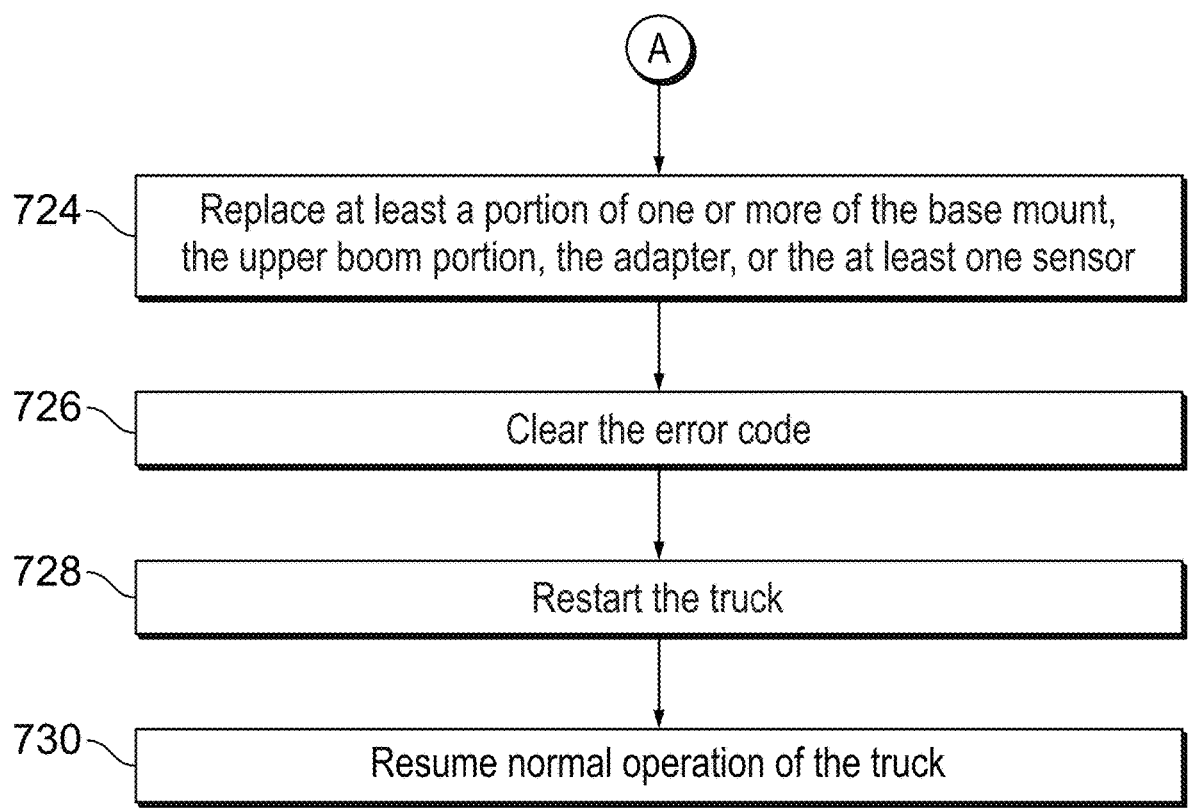

In another example, as shown in FIG. 64, following the truck 10 being shut off, the boom assembly 100, 1100 and/or the truck 10 may be inspected for damage, and at least a portion of the base mount 102, 1102, the upper boom portion 104, 1104, the adapter 150, 1150, 2150, and/or the sensor(s) 420A-420E may be replaced at 724 prior to attempting to restart the truck 10. As described above, the error code is then cleared at 726, the truck 10 is restarted at 728, and normal operation of the truck 10 may be resumed at 730, after which the process may terminate.

The terminology used herein is for the purpose of describing particular examples only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While particular examples of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of the present disclosure.

What is claimed is:

1. A boom assembly comprising:
    an upper boom portion, a base mount, and an adapter coupling the base mount to the upper boom portion, the upper boom portion being aligned with the base mount when the boom assembly is in a normal operating position; and
    an integrity monitoring system comprising at least one sensor associated with the boom assembly,
    wherein the adapter is configured to (i) maintain the boom assembly in the normal operating position when the upper boom portion is subjected to one or more external forces insufficient to cause the adapter to yield; and (ii) yield when the upper boom portion is subjected to one or more external forces sufficient to cause the adapter to yield such that the upper boom portion moves to a deformed angular position relative to the base mount, and
    wherein the at least one sensor is configured to detect a parameter related to the upper boom portion to indicate that the upper boom portion has deflected such that the upper boom portion is no longer aligned with the base mount.

2. The boom assembly of claim 1, wherein the sensor detects an acceleration of the upper boom portion, wherein the acceleration of the upper boom portion exceeding a corresponding predetermined threshold is indicative of the upper boom portion no longer being aligned with the base mount.

3. The boom assembly of claim 2, wherein the predetermined threshold is calculated to correspond to yielding of the adapter which occurs at the predetermined threshold.

4. The boom assembly of claim 1, wherein the sensor detects an angular velocity of the upper boom portion, wherein the angular velocity of the upper boom portion exceeding a corresponding predetermined threshold is indicative of the upper boom portion no longer being aligned with the base mount.

5. The boom assembly of claim 1, wherein the sensor comprises a strain gauge that detects a strain level in the adapter, wherein the strain level in the adapter exceeding a corresponding predetermined threshold is indicative of the upper boom portion no longer being aligned with the base mount.

6. The boom assembly of claim 1, wherein the sensor detects a change in a position of the upper boom portion relative to a predetermined reference, wherein the change in position exceeding a corresponding predetermined threshold is indicative of the upper boom portion no longer being aligned with the base mount.

7. The boom assembly of claim 1, wherein the at least one sensor is configured to generate at least one signal based on sensing the parameter, the boom assembly further comprising at least one controller configured to:

receive the at least one signal; and
determine, based on the at least one signal, that the upper boom portion is subjected to one or more external forces sufficient to cause the adapter to yield.

8. The boom assembly of claim 7, wherein the at least one controller is further configured to:
generate an alert in response to determining that the upper boom portion is subjected to one or more external forces sufficient to cause the adapter to yield.

9. A materials handling vehicle comprising:
a power unit;
a load handling assembly extending from the power unit and comprising a pair of forks;
an operator's station comprising an operator's backrest and an operator's platform;
a boom assembly associated with the materials handling vehicle; and
an integrity monitoring system comprising at least one sensor mounted to at least one of the boom assembly, the power unit, the load handling assembly, or the operator's station,
wherein the boom assembly comprises a base mount, an upper boom portion, and an adapter coupling the base mount to the upper boom portion, the upper boom portion being aligned with the base mount when the boom assembly is in a normal operating position,
wherein the adapter is configured to (i) maintain the boom assembly in the normal operating position when the upper boom portion is subjected to one or more external forces insufficient to cause the adapter to yield; and (ii) yield when the upper boom portion is subjected to one or more external forces sufficient to cause the adapter to yield such that the upper boom portion moves to a deformed position relative to the base mount, and
wherein the at least one sensor is configured to detect a parameter related to the upper boom portion to indicate when the upper boom portion has deflected such that the upper boom portion is no longer aligned with the base mount.

10. The materials handling vehicle of claim 9, wherein the at least one sensor is configured to generate at least one signal based on sensing the parameter, the materials handling vehicle further comprising at least one controller configured to:
receive the at least one signal; and
determine, based on the at least one signal, that the upper boom portion is subjected to one or more external forces sufficient to cause the adapter to yield.

11. The materials handling vehicle of claim 10, further comprising a brake, a steer motor, a traction motor, and a lift motor, and wherein in response to determining that the upper boom portion is subjected to one or more external forces sufficient to cause the adapter to yield, the at least one controller is configured to generate an error code that activates the brake and/or alters operation of at least one of the steer motor, the traction motor, or the lift motor.

12. The materials handling vehicle of claim 10, wherein in response to determining that the upper boom portion is subjected to one or more external forces sufficient to cause the adapter to yield, the at least one controller is configured to:
generate an error code; and
transmit a signal that causes a user interface to display an indication of the error code.

13. The materials handling vehicle of claim 9, wherein the sensor detects an acceleration of the upper boom portion, wherein the acceleration of the upper boom portion exceeding a corresponding predetermined threshold is indicative of the upper boom portion no longer being aligned with the base mount.

14. The materials handling vehicle of claim 13, wherein the predetermined threshold is calculated to correspond to yielding of the adapter which occurs at the predetermined threshold.

15. The materials handling vehicle of claim 9, wherein the sensor detects an angular velocity of the upper boom portion, wherein the angular velocity of the upper boom portion exceeding a corresponding predetermined threshold is indicative of the upper boom portion no longer being aligned with the base mount.

16. The materials handling vehicle of claim 9, wherein the sensor comprises a strain gauge that detects a strain level in the adapter, wherein the strain level in the adapter exceeding a corresponding predetermined threshold is indicative of the upper boom portion no longer being aligned with the base mount.

17. The materials handling vehicle of claim 9, wherein the sensor detects a change in a position of the upper boom portion relative to a predetermined reference, wherein the change in position exceeding a corresponding predetermined threshold is indicative of the upper boom portion no longer being aligned with the base mount.

18. A method of controlling a materials handling vehicle, wherein the materials handling vehicle comprises:
a power unit, a load handling assembly, an operator's station, a boom assembly, and an integrity monitoring system,
wherein the boom assembly is associated with the materials handling vehicle and comprises a base mount, an upper boom portion, and an adapter coupling the base mount to the upper boom portion, the upper boom portion being aligned with the base mount when the boom assembly is in a normal operating position and the adapter being configured to (i) maintain the boom assembly in the normal operating position when the upper boom portion is subjected to one or more external forces insufficient to cause the adapter to yield; and (ii) yield when the upper boom portion is subjected to one or more external forces sufficient to cause the adapter to yield such that the upper boom portion moves to a deformed position relative to the base mount,
wherein the integrity monitoring system comprises at least one controller and at least one sensor mounted to one or more of the boom assembly, the power unit, the load handling assembly, or the operator's station,
the method comprising:
receiving, by the at least one controller, at least one signal from the at least one sensor; and
determining, by the at least one controller, based on the at least one signal, that the upper boom portion has moved to the deformed position relative to the base mount.

19. The method of claim 18, further comprising:
in response to determining that the upper boom portion has moved to the deformed position relative to the base mount, generating, by the at least one controller, an error code; and
transmitting, by the at least one controller, a signal that causes a user interface of the materials handling vehicle to display an indication of the error code.

20. The method of claim 18, wherein the materials handling vehicle further comprises a brake, a steer motor, a traction motor, and a lift motor, the method further comprising:
- in response to determining that the upper boom portion has moved to the deformed position relative to the base mount, generating, by the at least one controller, an error code; and
- based on the error code, activating the brake and/or altering operation of at least one of the steer motor, the traction motor, or the lift motor.

21. The method of claim 20, further comprising:
- restarting the materials handling vehicle;
- operating the material handling vehicle in limp mode, wherein a speed of the materials handling vehicle is limited;
- moving the materials handling vehicle in limp mode from a first location to a second location;
- replacing at least a portion of one or more of the base mount, the upper boom portion, the adapter, or the at least one sensor;
- clearing the error code;
- restarting the materials handling vehicle; and
- resuming normal operation of the materials handling vehicle.

22. The method of claim 20, further comprising:
- replacing at least a portion of one or more of the base mount, the upper boom portion, the adapter, or the at least one sensor;
- clearing the error code;
- restarting the materials handling vehicle; and
- resuming normal operation of the materials handling vehicle.

* * * * *